US011210491B2

(12) United States Patent
He et al.

(10) Patent No.: US 11,210,491 B2
(45) Date of Patent: Dec. 28, 2021

(54) FINGERPRINT SENSOR UNDER A DISPLAY MODULE WITH TILTED RECEIVING OPTICS

(71) Applicant: Shenzhen Goodix Technology Co., Ltd., Shenzhen (CN)

(72) Inventors: Yi He, San Diego, CA (US); Bo Pi, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 77 days.

(21) Appl. No.: 16/427,269

(22) Filed: May 30, 2019

(65) Prior Publication Data

US 2020/0380236 A1    Dec. 3, 2020

(51) Int. Cl.
*G06K 9/00* (2006.01)
*G06F 3/044* (2006.01)

(52) U.S. Cl.
CPC ........... *G06K 9/0004* (2013.01); *G06F 3/044* (2013.01); *G06K 9/00013* (2013.01)

(58) Field of Classification Search
CPC .. G06K 9/0004; G06K 9/00013; G06F 3/044; G06F 3/0443; G06F 2203/04106; G06F 3/042; G06F 3/0412
See application file for complete search history.

(56) References Cited

U.S. PATENT DOCUMENTS

| 9,891,746 B2 | 2/2018 | Bae et al. | |
| 2016/0224816 A1* | 8/2016 | Smith | G06K 9/0004 |
| 2016/0266695 A1* | 9/2016 | Bae | G06K 9/00053 |
| 2017/0316248 A1* | 11/2017 | He | G06K 9/036 |
| 2018/0121703 A1* | 5/2018 | Jung | G06K 9/00046 |

FOREIGN PATENT DOCUMENTS

| CN | 106409209 A | 2/2017 |
| CN | 108604296 A | 9/2018 |
| CN | 109791599 A | 5/2019 |
| CN | 109815915 A | 5/2019 |
| KR | 20150131944 A | 11/2015 |

OTHER PUBLICATIONS

International Search Report dated Feb. 20, 2020 in the corresponding international application(application No. PCT/CN2019/110471).

* cited by examiner

*Primary Examiner* — Jonathan A Boyd
(74) *Attorney, Agent, or Firm* — Kilpatrick Townsend & Stockton LLP

(57) ABSTRACT

An optical fingerprint sensing module is configured to be disposed under a display screen that includes an array of LEDs. The optical fingerprint sensing module includes a light coupler disposed under the display screen, an array of light collimators coupled to the light coupler, a photodetector array, electronic circuitry coupled to the photodetector array, and a processor. The processor is configured to cause the electronic circuitry to capture a first frame while a first plurality of LEDs in the display screen are turned on and a second plurality of LEDs are turned off, and capture a second frame while the first plurality of LEDs are turned off and the second plurality of LEDs are turned on. The processor is further configured to construct a first fingerprint image and a second fingerprint image by combining the first frame and the second frame.

20 Claims, 31 Drawing Sheets

423- Display assembly
431- Enhanced cover glass
433- OLED display module
445, 447- Touching finger
613- Viewing zone
615- Effective Fingerprint sensing zone

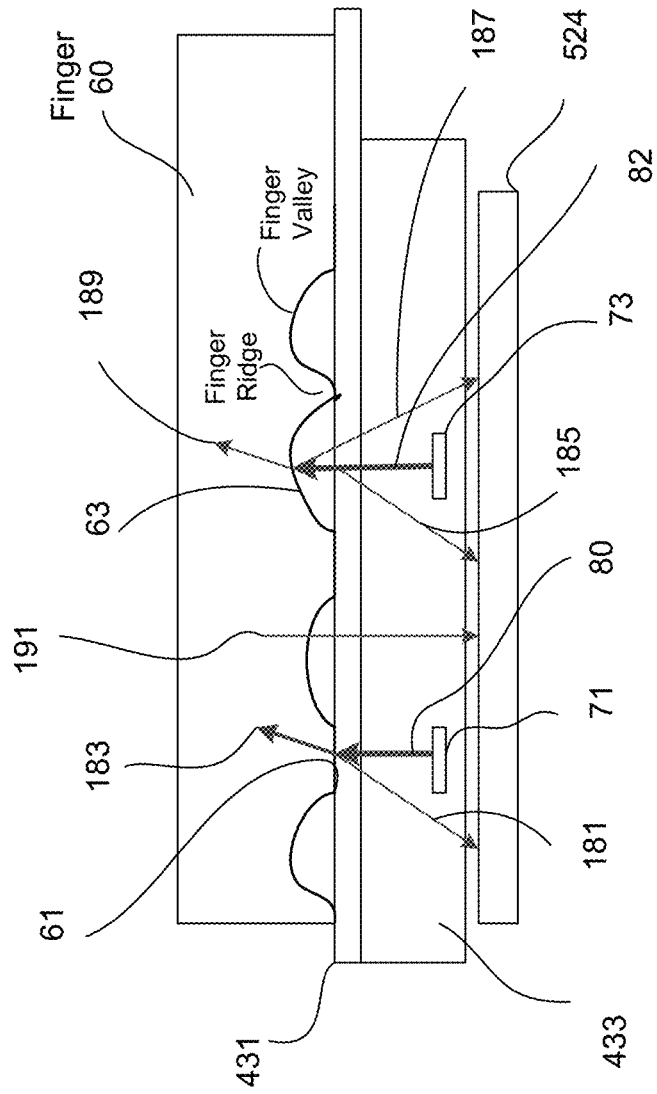

FIG. 5A

524- Bottom layers
431- Cover glass
445- Touching finger
433- Display module
60- Finger tissues
61- Finger skin ridge
63- Finger skin valley
71, 73- Display OLEDs 80- Light beam from one OLED
181- Cover glass reflected light
82- Light beam from another OLED
183- Light coupled into finger tissues
185- Cover glass reflected light
187- Finger skin reflected light
189- Light coupled into finger tissues
191- Light scattered into the bottom layers 524- Bottom layers
431- Cover glass
433- Display module
60- Finger tissues
61- Finger skin ridge
63- Finger skin valley
73- Display OLED
181- Cover glass reflected light
82, 201, 202, 211, 212- Cover glass reflected light
185, 205, 206- Light beams from an OLEDs group
187- Finger skin reflected light
189, 203, 204- Light coupled into finger tissues
191- Light scattered into the bottom layers
213, 214- Cover glass total reflected light

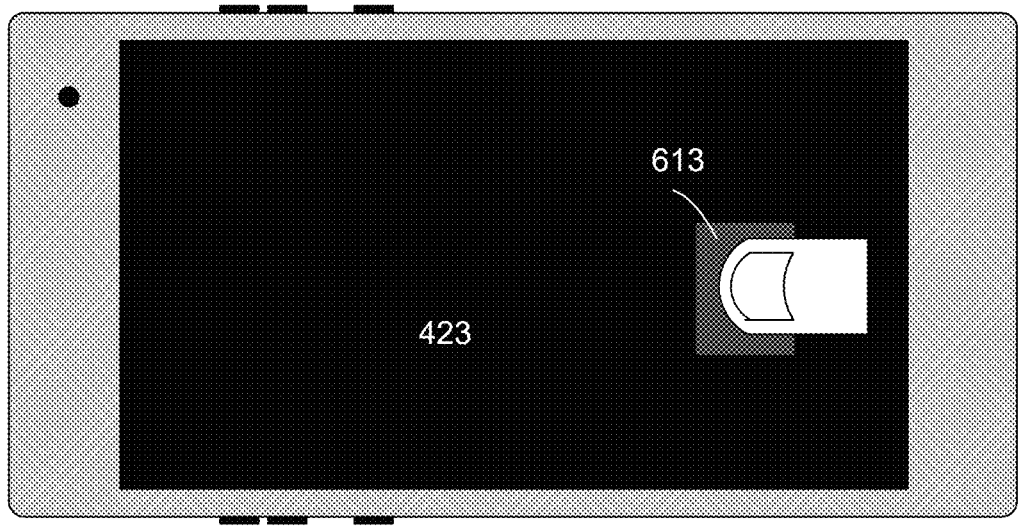

FIG. 10A

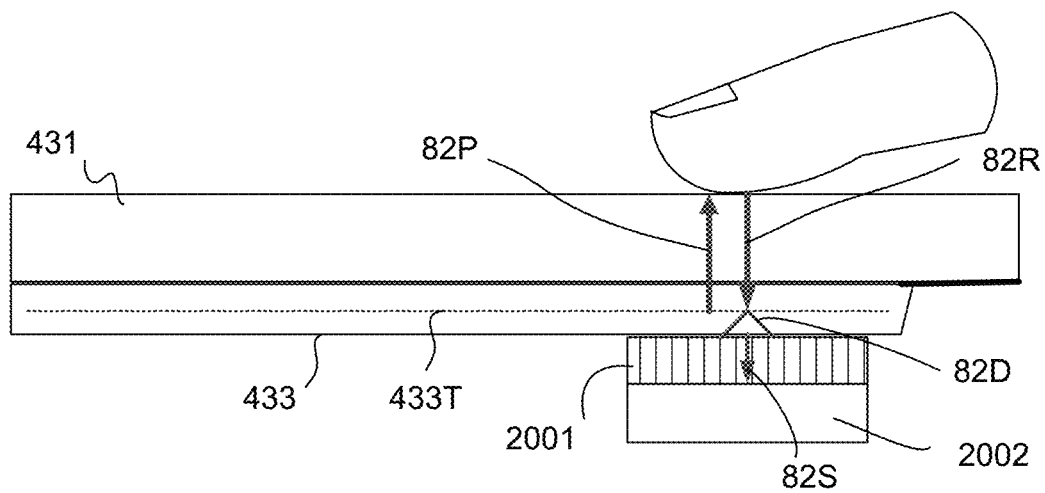

FIG. 10B

423- Display screen area
431- Cover glass
433- OLED display module
433T- TFT layer of the OLED display module
445, 447- Finger
613- Fingerprint sensing window within the display screen area
2001- Optical Collimators
2002- Photo detector array
82P- Light incident to the fingerprint sensing surface
82R- Light reflected from the fingerprint sensing surface
82D- Small hole arrays on TFT substrate
82S- Light that goes through the optical collimator array

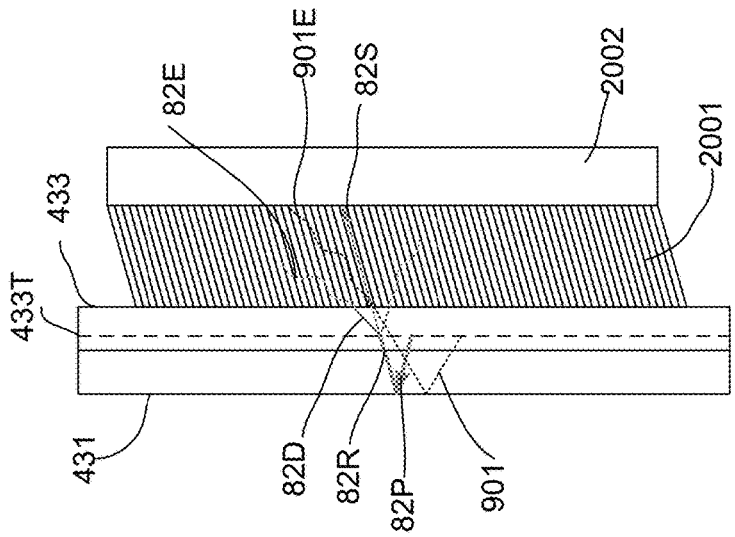

FIG. 11B

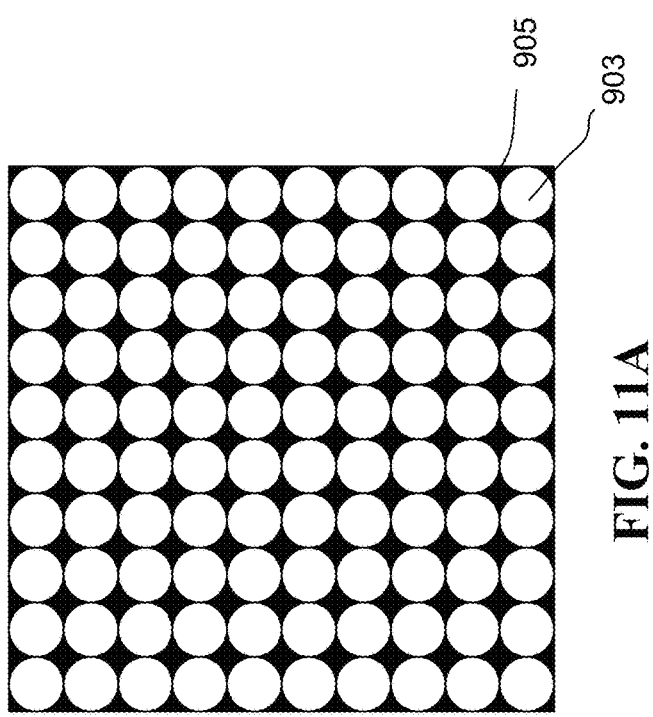

FIG. 11A

431- Cover glass
433- OLED display module
433T- TFT layer of OLED display module
2001- Optical Collimators
2002- Photo detector array
82P- Light incident to the fingerprint sensing surface
82R- Light reflected from the fingerprint sensing surface
82D- Light diffracted from TFT small holes of the OLED display module
82S- Light that goes through the optical collimator array
82E- Light absorbed by the optical collimator array
901- Other lights
901E- Light absorbed by the optical collimator array
903- Optical collimator array
905- Absorption materials 431- Cover glass
433T- TFT layer of display module
618- One collimator Unit
681a- Filter films for the collimator unit
618b- FOV of a collimator unit
621- Photo detector array
621a- Pinhole image by a collimator unit 423- Display system
425- other sensor
427, 429- Side buttons
431- Cover glass
433- OLED display module
435- Electronics module
439- OLED pixel
617- Collimator
619- Color layer under cover glass
621- Photo detector array
623- Circuit board
450- small light transmitting holes in OLED display substrate
917- Spacer
919- Protection material

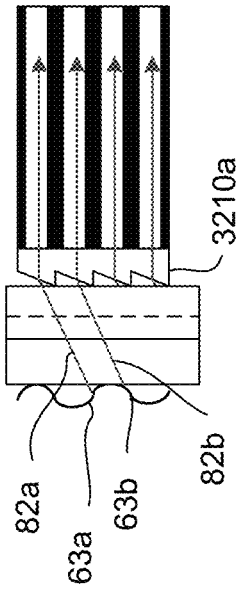

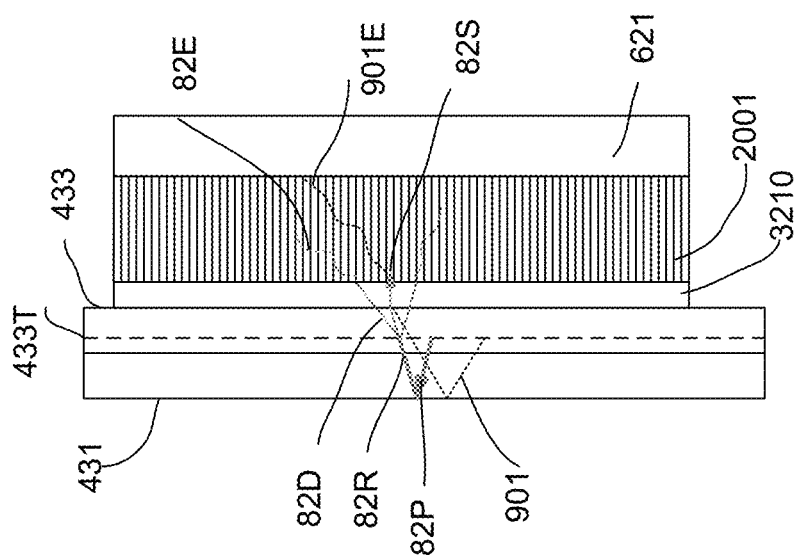

431- Cover glass
433- OLED display module
433T- TFT layer of OLED display module
3210- Viewing angle adaptor optical layer
3210a- Detail of the viewing angle adaptor layer
2001- Light Collimator
621- Photo detector array
63a, 63b- Different positions in fingerprint valley
82a, 82b- Light from different fingerprint valley positions
82P- Light shine to finger
82R- Light reflected from finger surface
82D- Light diffracted from TFT small holes
82S- Light goes through collimator
82E- Light absorbed by collimator
901- Other lights
901E- Light absorbed by collimator

FINGERPRINT SENSOR UNDER A DISPLAY MODULE WITH TILTED RECEIVING OPTICS

TECHNICAL FIELD

This patent document relates to sensing of fingerprints in electronic devices or systems, including portable devices such as a mobile device or a wearable device and larger systems.

BACKGROUND

Various sensors can be implemented in electronic devices or systems to provide certain desired functions. There is an increasing need for securing access to computers and computer-controlled devices or systems where only authorized users be identified and be distinguished from non-authorized users.

For example, mobile phones, digital cameras, tablet PCs, notebook computers and other portable electronic devices have become more and more popular in personal, commercial and governmental uses. Portable electronic devices for personal use may be equipped with one or more security mechanisms to protect the user's privacy.

For another example, a computer or a computer-controlled device or system for an organization or enterprise may be secured to allow only authorized personnel to access to protect the information or the use of the device or system for the organization or enterprise.

The information stored in portable devices and computer-controlled databases, devices or systems, may be of certain characteristics that should be secured. For example, the stored information may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, the data may be accessed by others that are not authorized to gain the access, causing loss of privacy of individuals or loss of valuable confidential information. Beyond security of information, securing access to computers and computer-controlled devices or systems also allow safeguard of the use of devices or systems that are controlled by computers or computer processors such as computer-controlled automobiles and other systems such as ATMs.

Security access to a device such as a mobile device or a system such as an electronic database and a computer-controlled system can be achieved in different ways such as using user passwords. A password, however, may be easily to be spread or obtained and this nature of passwords can reduce the level of the security. Moreover, a user needs to remember a password to use password-protected electronic devices or systems, and, if the user forgets the password, the user needs to undertake certain password recovery procedures to get authenticated or otherwise regain the access to the device. Unfortunately, in various circumstances, such password recovery processes may be burdensome to users and have various practical limitations and inconveniences.

The personal fingerprint identification can be utilized to achieve the user authentication for enhancing the data security while mitigating certain undesired effects associated with passwords.

Electronic devices or systems, including portable or mobile computing devices, may employ user authentication mechanisms to protect personal or other confidential data and prevent unauthorized access. User authentication on an electronic device or system may be carried out through one or multiple forms of biometric identifiers, which can be used alone or in addition to conventional password authentication methods. One form of biometric identifiers is a person's fingerprint pattern. A fingerprint sensor can be built into an electronic device or system to read a user's fingerprint pattern as part of the authentication process so that the device or system can only be unlocked by an authorized user through authentication of the authorized user's fingerprint pattern.

SUMMARY

According to some embodiments, an optical fingerprint sensing module is configured to be disposed under a display screen. The display screen includes a cover glass and an array of light-emitting diodes (LEDs) disposed under the cover glass. The optical fingerprint sensing module includes a light coupler disposed under a fingerprint sensing section of the display screen, and an array of light collimators disposed under the light coupler. An optical axis of each of the array of light collimators forms a tilting angle with respect to a normal of the display screen. The tilting angle is greater than zero degree and less than 90 degrees. The optical fingerprint sensing module further includes a photodetector array coupled to the array of light collimators. The photodetector array includes an array of pixels. Each pixel is configured to detect light transmitted through one or more corresponding light collimators among the array of light collimators. The optical fingerprint sensing module further includes electronic circuitry coupled to the photodetector array for capturing fingerprint frames formed by light intensities detected by the photodetector array, and a processor coupled to the electronic circuitry and the array of LEDs. The processor is configured to, in response to a trigger for detecting fingerprints of a finger placed adjacent the fingerprint sensing section of the display screen, control the array of LEDs such that, in a first frame, a first plurality of LEDs in the fingerprint sensing section of the display screen are turned on, and a second plurality of LEDs in the fingerprint sensing section are turned off, and in a second frame, the first plurality of LEDs are turned off, and the second plurality of LEDs are turned on. The processor is further configured to cause the electronic circuitry to capture the first frame and the second frame. The first frame includes a first plurality of pixels and a second plurality of pixels, in which the first plurality of pixels includes light emitted by the first plurality of LEDs and reflected off of a top surface of the cover glass. The second frame includes the first plurality of pixels and the second plurality of pixels, in which the second plurality of pixels includes light emitted by the second plurality of LEDs and reflected off of the top surface of the cover glass. The processor is further configured to construct a first fingerprint image and a second fingerprint image by combining the first frame and the second frame. The first fingerprint image includes the first plurality of pixels in the first frame and the second plurality of pixels in the second frame. The second fingerprint image includes the second plurality of pixels in the first frame and the first plurality of pixels in the second frame.

According to some embodiments, a method of fingerprint sensing uses an optical fingerprint sensing module disposed under a display screen. The display screen includes a cover glass and an array of light-emitting diodes (LEDs) disposed under the cover glass. The method includes providing the optical fingerprint sensing module. The optical fingerprint sensing module includes a light coupler disposed under a fingerprint sensing section of the display screen, and an array of light collimators disposed under the light coupler. An optical axis of each of the array of light collimators forms a tilting angle with respect to a normal of the display screen. The tilting angle is greater than zero degree and less than 90 degrees. The optical fingerprint sensing module further includes a photodetector array coupled to the array of light collimators. The photodetector array includes an array of pixels. Each pixel is configured to detect light transmitted through one or more corresponding light collimators among the array of light collimators. The optical fingerprint sensing module further includes electronic circuitry coupled to the photodetector array for capturing fingerprint frames formed by light intensities detected by the photodetector array. The method further includes capturing a first frame using the photodetector array and the electronic circuitry, while turning on a first plurality of LEDs and turning off a second plurality of LEDs in the fingerprint sensing section of the display screen. The first frame includes a first plurality of pixels and a second plurality of pixels, in which the first plurality of pixels includes light emitted by the first plurality of LEDs and reflected off of a top surface of the cover glass. The method further includes capturing a second frame using the photodetector array and the electronic circuitry, while turning off the first plurality of LEDs and turning on the second plurality of LED. The second frame includes the first plurality of pixels and the second plurality of pixels, in which the second plurality of pixels includes light emitted by the second plurality of LEDs and reflected off of the top surface of the cover glass. The method further includes constructing a first fingerprint image and a second fingerprint image by combining the first frame and the second frame. The first fingerprint image includes the first plurality of pixels in the first frame and the second plurality of pixels in the second frame. The second fingerprint image includes the second plurality of pixels in the first frame and the first plurality of pixels in the second frame.

BRIEF DESCRIPTION OF THE DRAWINGS

FIGS. 5A and 5B illustrate signal generation for the returned light from the sensing zone on the top sensing surface under two different optical conditions to facilitate the understanding of the operation of an under-screen optical fingerprint sensor module according to some embodiments.

FIGS. 9, 10A, 10B, 11A, and 11B illustrate examples of various designs for fingerprint sensing using an under-screen optical fingerprint sensor module with an array of optical collimators or pinholes for directing signal light carrying fingerprint information to the optical fingerprint sensor array according to some embodiments.

FIGS. 26A and 26B illustrate an example of an optical fingerprint sensor under an OLED display panel having an optical deflection or diffraction device or layer according to some embodiments.

DETAILED DESCRIPTION

Figure 1:
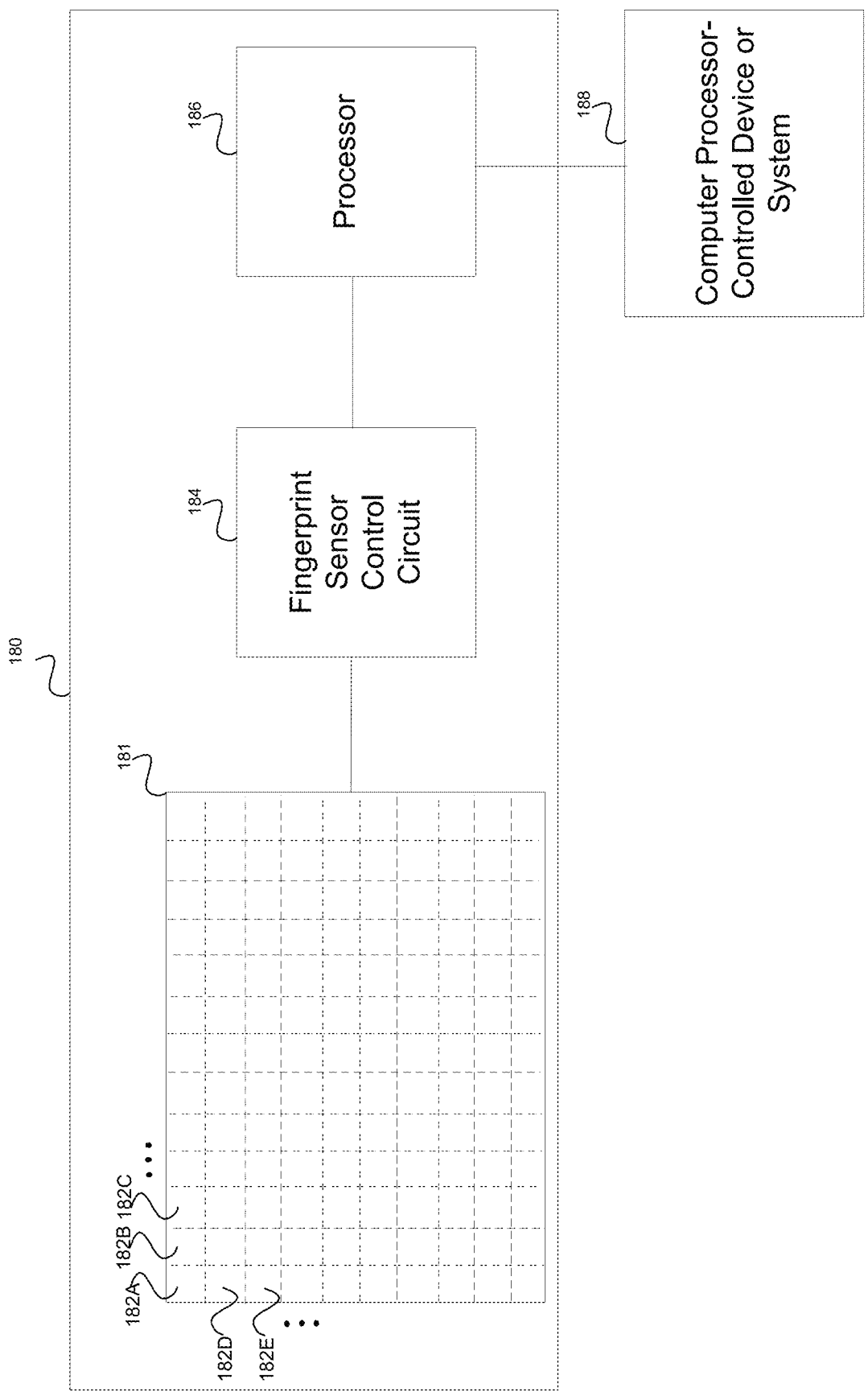
FIG. 1 shows a block diagram of an example of a system with a fingerprint sensing module which can be implemented to include an optical fingerprint sensor according to some embodiments.

Electronic devices or systems may be equipped with fingerprint authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

Fingerprint sensing is useful in mobile applications and other applications that use or require secure access. For example, fingerprint sensing can be used to provide secure access to a mobile device and secure financial transactions including online purchases. It is desirable to include robust and reliable fingerprint sensing suitable for mobile devices and other applications. In mobile, portable or wearable devices, it is desirable for fingerprint sensors to minimize or eliminate the footprint for fingerprint sensing given the limited space on those devices, especially considering the demands for a maximum display area on a given device.

The light produced by a display screen for displaying images can pass through the top surface of the display screen in order to be viewed by a user. A finger can touch the top surface and thus interacts with the light at the top surface to cause the reflected or scattered light at the surface area of the touch to carry spatial image information of the finger to return to the display panel underneath the top surface. In touch sensing display devices, the top surface is the touch sensing interface with the user and this interaction between the light for displaying images and the user finger or hand constantly occurs but such information-carrying light returning back to the display panel is largely wasted and is not used in most touch sensing devices. In various mobile or portable devices with touch sensing displays and fingerprint sensing functions, a fingerprint sensor tends to be a separate device from the display screen, either placed on the same surface of the display screen at a location outside the display screen area such as in the popular Apple iPhones and recent Samsung Galaxy smartphones, or placed on the backside of a smartphone, such as some new models of smart phones by Huawei, Lenovo, Xiaomi or Google, to avoid taking up valuable space for placing a large display screen on the front side. Those fingerprint sensors are separate devices from the display screens and thus need to be compact to save space for display and other functions while still providing reliable and fast fingerprint sensing with a spatial image resolution above a certain acceptable level. However, the need to be compact and small and the need to provide a high spatial image resolution in capturing a fingerprint pattern are in direct conflict with each other in many fingerprint sensors because a high spatial image resolution in capturing a fingerprint pattern in based on various suitable fingerprint sensing technologies (e.g., capacitive touch sensing or optical imaging) requires a large sensor area with a large number of sensing pixels.

The optical fingerprint sensor technology disclosed herein uses the light for displaying images in a display screen that is returned from the top surface of the device display assembly for fingerprint sensing and other sensing operations. The returned light carries information of an object in touch with the top surface (e.g., a finger) and the capturing and detecting this returned light constitute part of the design considerations in implementing a particular optical fingerprint sensor module located underneath the display screen. Because the top surface of the touch screen assembly is used as a fingerprint sensing area, the optical image of this touched area should be captured by an optical imaging sensor array inside the optical fingerprint sensor module with a high image fidelity to the original fingerprint for robust fingerprint sensing. The optical fingerprint sensor module can be designed to achieve this desired optical imaging by properly configuring optical elements for capturing and detecting the returned light.

The disclosed technology can be implemented to provide devices, systems, and techniques that perform optical sensing of human fingerprints and authentication for authenticating an access attempt to a locked computer-controlled device such as a mobile device or a computer-controlled system, that is equipped with a fingerprint detection module. The disclosed technology can be used for secure access to various electronic devices and systems, including portable or mobile computing devices such as laptops, tablets, smartphones, and gaming devices, and other electronic devices or systems such as electronic databases, automobiles, bank ATMs, etc.

The optical fingerprint sensor technology disclosed here can be implemented to detect a portion of the light that is used for displaying images in a display screen where such a portion of the light for the display screen may be the scattered light, reflected light or some stray light. For example, in some implementations of the disclosed optical fingerprint sensor technology for an OLED display screen or another display screen having light emitting display pixels without using backlight, the image light produced by the OLED display screen, at or near the OLED display screen's top surface, may be reflected or scattered back into the OLED display screen as returned light when encountering an object such as a user finger or palm, or a user pointer device like a stylus. Such returned light can be captured for performing one or more optical sensing operations using the disclosed optical fingerprint sensor technology. Due to the use of the light from OLED display screen's own OLED pixels for optical sensing, an optical fingerprint sensor module based on the disclosed optical fingerprint sensor technology can be, in some implementations, specially designed to be integrated to the OLED display screen in a way that maintains the display operations and functions of the OLED display screen without interference while providing optical sensing operations and functions to enhance overall functionality, device integration and user experience of the electronic device such as a smart phone or other mobile/wearable device or other forms of electronic devices or systems.

For example, an optical fingerprint sensor module based on the disclosed optical fingerprint sensor technology can be coupled to a display screen having light emitting display pixels without using backlight (e.g., an OLED display screen) to sense a fingerprint of a person by using the above described returned light from the light produced by OLED display screen. In operation, a person's finger, either in direct touch with the OLED display screen or in a near proximity of the OLED display screen, can produce the returned light back into the OLED display screen while carrying information of a portion of the finger illuminated by the light output by the OLED display screen. Such information may include, e.g., the spatial pattern and locations of the ridges and valleys of the illuminated portion of the finger. Accordingly, the optical fingerprint sensor module can be integrated to capture at least a portion of such returned light to detect the spatial pattern and locations of the ridges and valleys of the illuminated portion of the finger by optical imaging and optical detection operations. The detected spatial pattern and locations of the ridges and valleys of the illuminated portion of the finger can then be processed to construct a fingerprint pattern and to perform fingerprint identification, e.g., comparing with a stored authorized user fingerprint pattern to determine whether the detected fingerprint is a match as part of a user authentication and device access process. This optical sensing based fingerprint detection by using the disclosed optical fingerprint sensor technology uses the OLED display screens as an optical sensing platform and can be used to replace existing capacitive fingerprint sensors or other fingerprint sensors that are basically self-contained sensors as "add-on" components without using light from display screens or using the display screens for fingerprint sensing for mobile phones, tablets and other electronic devices.

The disclosed optical fingerprint sensor technology can be implemented in ways that use a display screen having light emitting display pixels (e.g., an OLED display screen) as an optical sensing platform by using the light emitted from the display pixels of the OLED display screens for performing fingerprint sensing or other optical sensing functions after such emitted light interacts with an area on the top touch surface touched by a finger. This intimate relationship between the disclosed optical fingerprint sensor technology and the OLED display screen provides an unique opportunity for using an optical fingerprint sensor module based on the disclosed optical fingerprint sensor technology to provide both (1) additional optical sensing functions and (2) useful operations or control features in connection with the touch sensing aspect of the OLED display screen.

Notably, in some implementations, an optical fingerprint sensor module based on the disclosed optical fingerprint sensor technology can be coupled to the backside of the OLED display screen without requiring a designated area on the display surface side of the OLED display screen that would occupy a valuable device surface real estate in some electronic devices such as a smartphone, a tablet or a wearable device where the exterior surface area is limited. Such an optical fingerprint sensor module can be placed under the OLED display screen that vertically overlaps with the display screen area, and, from the user's perspective, the optical fingerprint sensor module is hidden behind the display screen area. In addition, because the optical sensing of such an optical fingerprint sensor module is by detecting the light that is emitted by the OLED display screen and is returned from the top surface of the display area, the disclosed optical fingerprint sensor module does not require a special sensing port or sensing area that is separate from the display screen area. Accordingly, different from fingerprint sensors in other designs, including, e.g., Apple's iPhone/iPad devices or Samsung Galaxy smartphone models where the fingerprint sensor is located at a particular fingerprint sensor area or port (e.g., the home button) on the same surface of the display screen but located in a designated non-displaying zone that is outside the display screen area, the optical fingerprint sensor module based on the disclosed optical fingerprint sensor technology can be implemented in ways that would allow fingerprint sensing to be performed at a location on the OLED display screen by using unique optical sensing designs to route the returned light from the finger into an optical fingerprint sensor and by providing proper optical imaging mechanism to achieve high resolution optical imaging sensing. In this regard, the disclosed optical fingerprint sensor technology can be implemented to provide a unique on-screen fingerprint sensing configuration by using the same top touch sensing surface that displays images and provides the touch sensing operations without a separate fingerprint sensing area or port outside the display screen area.

Regarding the additional optical sensing functions beyond fingerprint detection, the optical sensing may be used to measure other parameters. For example, the disclosed optical sensor technology can measure a pattern of a palm of a person given the large touch area available over the entire OLED display screen (in contrast, some designated fingerprint sensors such as the fingerprint sensor in the home button of Apple's iPhone/iPad devices have a rather small and designated off-screen fingerprint sensing area that is highly limited in the sensing area size that may not be suitable for sensing large patterns).

As discussed above, an optical fingerprint sensor module based on the disclosed optical fingerprint sensor technology can be coupled to the backside of the OLED display screen without requiring creation of a designated area on the surface side of the OLED display screen that would occupy a valuable device surface real estate in some electronic devices such as a smartphone, a tablet or a wearable device. This aspect of the disclosed technology can be used to provide certain advantages or benefits in both device designs and product integration or manufacturing.

In some implementations, an optical fingerprint sensor module based on the disclosed optical fingerprint sensor technology can be configured as a non-invasive module that can be easily integrated to a display screen having light emitting display pixels (e.g., an OLED display screen) without requiring changing the design of the OLED display screen for providing a desired optical sensing function such as fingerprint sensing. In this regard, an optical fingerprint sensor module based on the disclosed optical fingerprint sensor technology can be independent from the design of a particular OLED display screen design due to the nature of the optical fingerprint sensor module: the optical sensing of such an optical fingerprint sensor module is by detecting the light that is emitted by the OLED display screen and is returned from the top surface of the display area, and the disclosed optical fingerprint sensor module is coupled to the backside of the OLED display screen as a under-screen optical fingerprint sensor module for receiving the returned light from the top surface of the display area and thus does not require a special sensing port or sensing area that is separate from the display screen area. Accordingly, such a under-screen optical fingerprint sensor module can be used to combine with OLED display screens to provide optical fingerprint sensing and other sensor functions on an OLED display screen without using a specially designed OLED display screen with hardware especially designed for providing such optical sensing. This aspect of the disclosed optical fingerprint sensor technology enables a wide range of OLED display screens in smartphones, tablets or other electronic devices with enhanced functions from the optical sensing of the disclosed optical fingerprint sensor technology.

For example, for an existing phone assembly design that does not provide a separate fingerprint sensor as in certain Apple iPhones or Samsung Galaxy models, such an existing phone assembly design can integrate the under-screen optical fingerprint sensor module as disclosed herein without changing the touch sensing-display screen assembly to provide an added on-screen fingerprint sensing function. Because the disclosed optical sensing does not require a separate designated sensing area or port as in the case of certain Apple iPhones/Samsung Galaxy phones with a front fingerprint sensor outside the display screen area, or some smartphones with a designated rear fingerprint sensor on the backside like in some models by Huawei, Xiaomi, Google or Lenovo, the integration of the on-screen fingerprint sensing disclosed herein does not require a substantial change to the existing phone assembly design or the touch sensing display module that has both the touch sensing layers and the display layers. Based on the disclosed optical sensing technology in this document, no external sensing port and no extern hardware button are needed on the exterior of a device are needed for adding the disclosed optical fingerprint sensor module for fingerprint sensing. The added optical fingerprint sensor module and the related circuitry are under the display screen inside the phone housing and the fingerprint sensing can be conveniently performed on the same touch sensing surface for the touch screen.

For another example, due to the above described nature of the optical fingerprint sensor module for fingerprint sensing, a smartphone that integrates such an optical fingerprint sensor module can be updated with improved designs, functions and integration mechanism without affecting or burdening the design or manufacturing of the OLED display screens to provide desired flexibility to device manufacturing and improvements/upgrades in product cycles while maintaining the availability of newer versions of optical sensing functions to smartphones, tablets or other electronic devices using OLED display screens. Specifically, the touch sensing layers or the OLED display layers may be updated in the next product release without adding any significant hardware change for the fingerprint sensing feature using the disclosed under-screen optical fingerprint sensor module. Also, improved on-screen optical sensing for fingerprint sensing or other optical sensing functions by such an optical fingerprint sensor module can be added to a new product release by using a new version of the under-screen optical fingerprint sensor module without requiring significant changes to the phone assembly designs, including adding additional optical sensing functions.

The above and other features of the disclosed optical fingerprint sensor technology can be implemented to provide a new generation of electronic devices with improved fingerprint sensing and other sensing functions, especially for smartphones, tablets and other electronic devices with display screens having light emitting display pixels without using backlight (e.g., an OLED display screen) to provide various touch sensing operations and functions and to enhance the user experience in such devices.

In implementations of the disclosed technical features, additional sensing functions or sensing modules, such as a biomedical sensor, e.g., a heartbeat sensor in wearable devices like wrist band devices or watches, may be provided. In general, different sensors can be provided in electronic devices or systems to achieve different sensing operations and functions.

FIG. 1 is a block diagram of an example of a system 180 with a fingerprint sensing module 180 including a fingerprint sensor 181 which can be implemented to include an optical fingerprint sensor based on the optical sensing of fingerprints as disclosed in this document. The system 180 includes a fingerprint sensor control circuit 184, and a digital processor 186 which may include one or more processors for processing fingerprint patterns and determining whether an input fingerprint pattern is one for an authorized user. The fingerprint sensing system 180 uses the fingerprint sensor 181 to obtain a fingerprint and compares the obtained fingerprint to a stored fingerprint to enable or disable functionality in a device or system 188 that is secured by the fingerprint sensing system 180. In operation, the access to the device 188 is controlled by the fingerprint processing processor 186 based on whether the captured user fingerprint is from an authorized user. As illustrated, the fingerprint sensor 181 may include multiple fingerprint sensing pixels such as pixels 182A-182E that collectively represent at least a portion of a fingerprint. For example, the fingerprint sensing system 180 may be implemented at an ATM as the system 188 to determine the fingerprint of a customer requesting to access funds or other transactions. Based on a comparison of the customer's fingerprint obtained from the fingerprint sensor 181 to one or more stored fingerprints, the fingerprint sensing system 180 may, upon a positive identification, cause the ATM system 188 to grant the requested access to the user account, or, upon a negative identification, may deny the access. For another example, the device or system 188 may be a smartphone or a portable device and the fingerprint sensing system 180 is a module integrated to the device 188. For another example, the device or system 188 may be a gate or secured entrance to a facility or home that uses the fingerprint sensor 181 to grant or deny entrance. For yet another example, the device or system 188 may be an automobile or other vehicle that uses the fingerprint sensor 181 to link to the start of the engine and to identify whether a person is authorized to operate the automobile or vehicle.

Figure 2A:
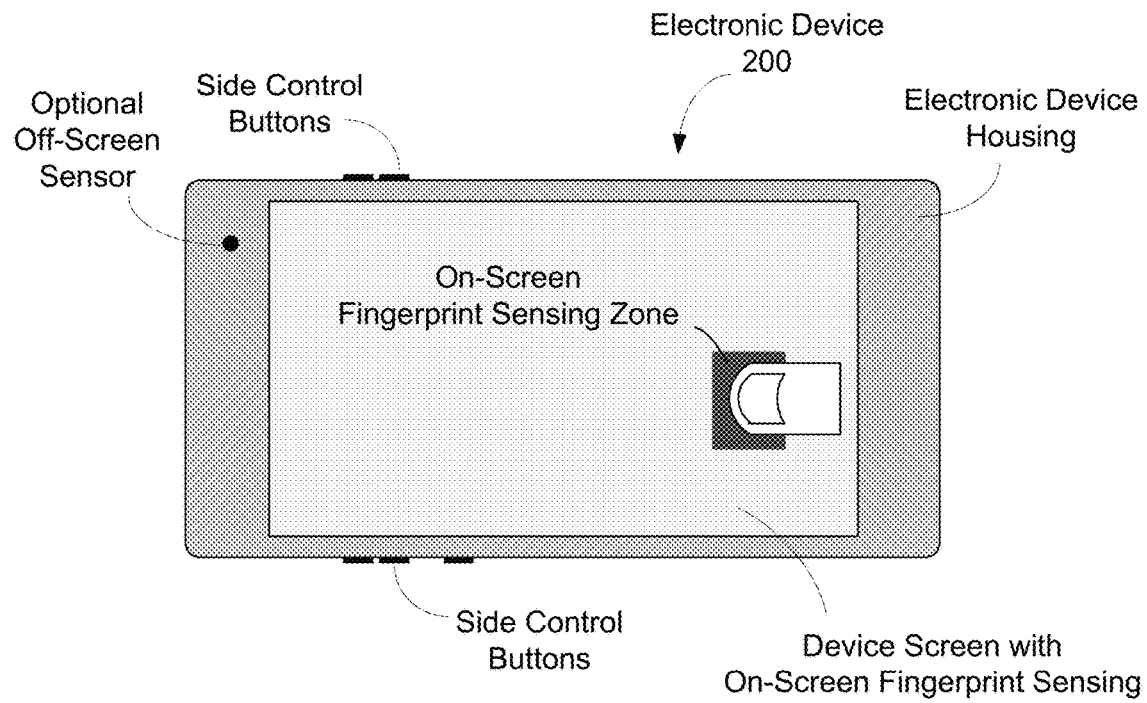
FIGS. 2A and 2B illustrate one exemplary implementation of an electronic device having a touch sensing display screen assembly and an optical fingerprint sensor module positioned underneath the touch sensing display screen assembly according to some embodiments.
Figure 2B:
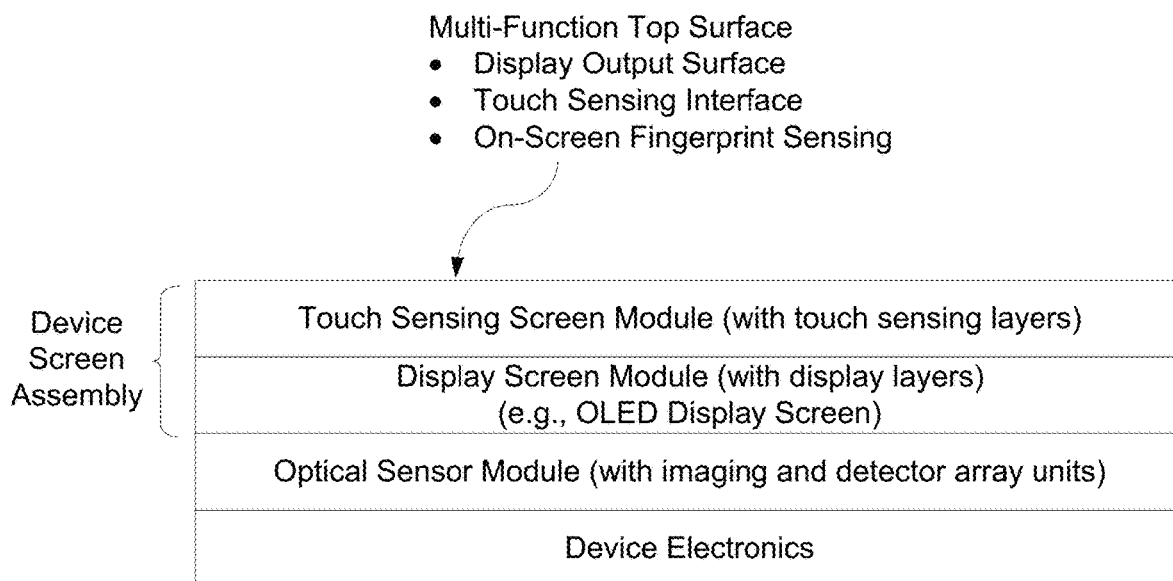

As a specific example, FIGS. 2A and 2B illustrate one exemplary implementation of an electronic device 200 having a touch sensing display screen assembly and an optical fingerprint sensor module positioned underneath the touch sensing display screen assembly. In this particular example, the display technology can be implemented by an OLED display screen or another display screen having light emitting display pixels without using backlight. The electronic device 200 can be a portable device such as a smartphone or a tablet and can be the device 188 as shown in FIG. 1.

FIG. 2A shows the front side of the device 200 which may resemble some features in some existing smartphones or tablets. The device screen is on the front side of the device 200 occupying either entirety, a majority or a significant portion of the front side space and the fingerprint sensing function is provided on the device screen, e.g., one or more sensing areas for receiving a finger on the device screen. As an example, FIG. 2A shows a fingerprint sensing zone in the device screen for a finger to touch which may be illuminated as a visibly identifiable zone or area for a user to place a finger for fingerprint sensing. Such a fingerprint sensing zone can function like the rest of the device screen for displaying images. As illustrated, the device housing of the device 200 may have, in various implementations, side facets that support side control buttons that are common in various smartphones on the market today. Also, one or more optional sensors may be provided on the front side of the device 200 outside the device screen as illustrated by one example on the left upper corner of the device housing in FIG. 2A.

FIG. 2B shows an example of the structural construction of the modules in the device 200 relevant to the optical fingerprint sensing disclosed in this document. The device screen assembly shown in FIG. 2B includes, e.g., the touch sensing screen module with touch sensing layers on the top, and a display screen module with display layers located underneath the touch sensing screen module. An optical fingerprint sensor module is coupled to, and located underneath, the display screen assembly module to receive and capture the returned light from the top surface of the touch sensing screen module and to guide and image the returned light onto an optical fingerprint sensor array of optical sensing pixels or photodetectors which convert the optical image in the returned light into pixel signals for further processing. Underneath the optical fingerprint sensor module is the device electronics structure containing certain electronic circuits for the optical fingerprint sensor module and other parts in the device 200. The device electronics may be arranged inside the device housing and may include a part that is under the optical fingerprint sensor module as shown in FIG. 2B.

In implementations, the top surface of the device screen assembly can be a surface of an optically transparent layer serving as a user touch sensing surface to provide multiple functions, such as (1) a display output surface through which the light carrying the display images passes through to reach a viewer's eyes, (2) a touch sensing interface to receive a user's touches for the touch sensing operations by the touch sensing screen module, and (3) an optical interface for on-screen fingerprint sensing (and possibly one or more other optical sensing functions). This optically transparent layer can be a rigid layer such as a glass or crystal layer or a flexible layer.

One example of a display screen having light emitting display pixels without using backlight is an OLED display having an array of individual emitting pixels, and a thin film transistor (TFT) structure or substrate which may include arrays of small holes and may be optically transparent and a cover substrate to protect the OLED pixels. Referring to FIG. 2B, the optical fingerprint sensor module in this example is placed under the OLED display panel to capture the returned light from the top touch sensing surface and to acquire high resolution images of fingerprint patterns when user's finger is in touch with a sensing area on the top surface. In other implementations, the disclosed under-screen optical fingerprint sensor module for fingerprint sensing may be implemented on a device without the touch sensing feature. In addition, a suitable display panel may be in various screen designs different from OLED displays.

Figure 2C:
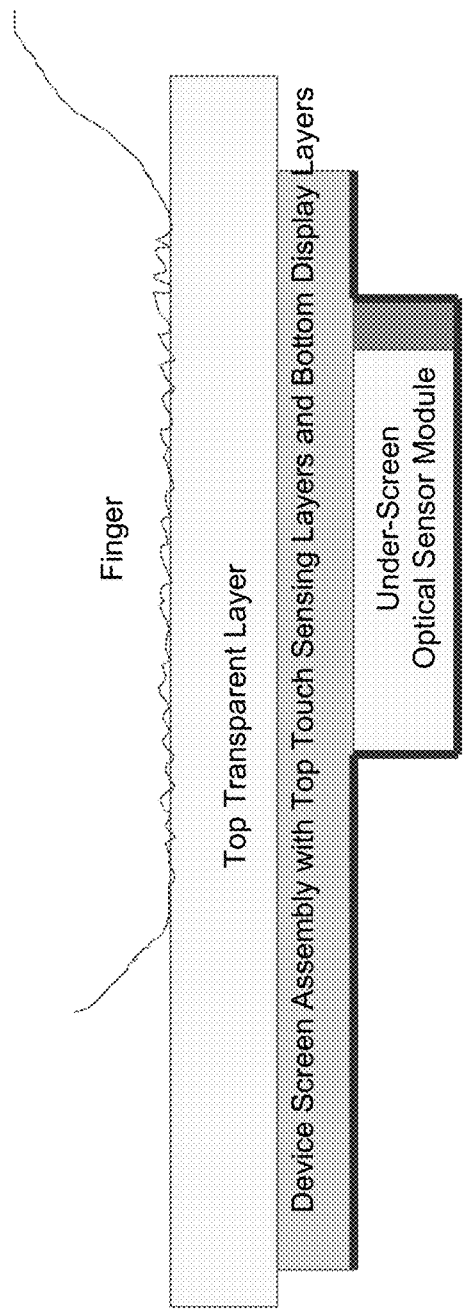
FIGS. 2C and 2D illustrate an example of a device that implements the optical fingerprint sensor module illustrated in FIGS. 2A and 2B according to some embodiments.
Figure 2D:
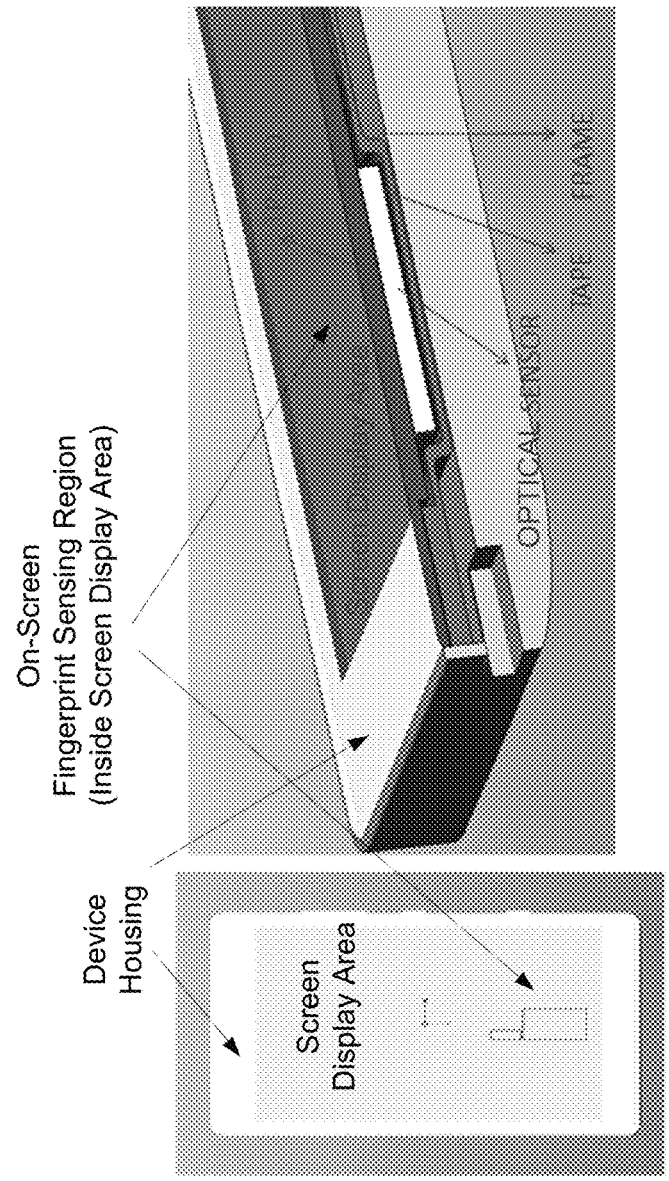

FIGS. 2C and 2D illustrate an example of a device that implements the optical fingerprint sensor module in FIGS. 2A and 2B. FIG. 2C shows a cross sectional view of a portion of the device containing the under-screen optical fingerprint sensor module. FIG. 2D shows, on the left, a view of the front side of the device with the touch sensing display indicating a fingerprint sensing area on the lower part of the display screen, and on the right, a perspective view of a part of the device containing the optical fingerprint sensor module that is under the device display screen assembly. FIG. 2D also shows an example of the layout of the flexible tape with circuit elements.

In the design examples in FIGS. 2A, 2B, 2C and 2D, the optical fingerprint sensor design is different from some other fingerprint sensor designs using a separate fingerprint sensor structure from the display screen with a physical demarcation between the display screen and the fingerprint sensor (e.g., a button like structure in an opening of the top glass cover in some mobile phone designs) on the surface of the mobile device. In the illustrated designs here, the optical fingerprint sensor for detecting fingerprint sensing and other optical signals are located under the top cover glass or layer (e.g., FIG. 2C) so that the top surface of the cover glass serves as the top surface of the mobile device as a contiguous and uniform glass surface across both the display screen layers and the optical detector sensor that are vertically stacked and vertically overlap. This design for integrating optical fingerprint sensing and the touch sensitive display screen under a common and uniform surface provides benefits, including improved device integration, enhanced device packaging, enhanced device resistance to exterior elements, failure and wear and tear, and enhanced user experience over the ownership period of the device.

Figure 3:
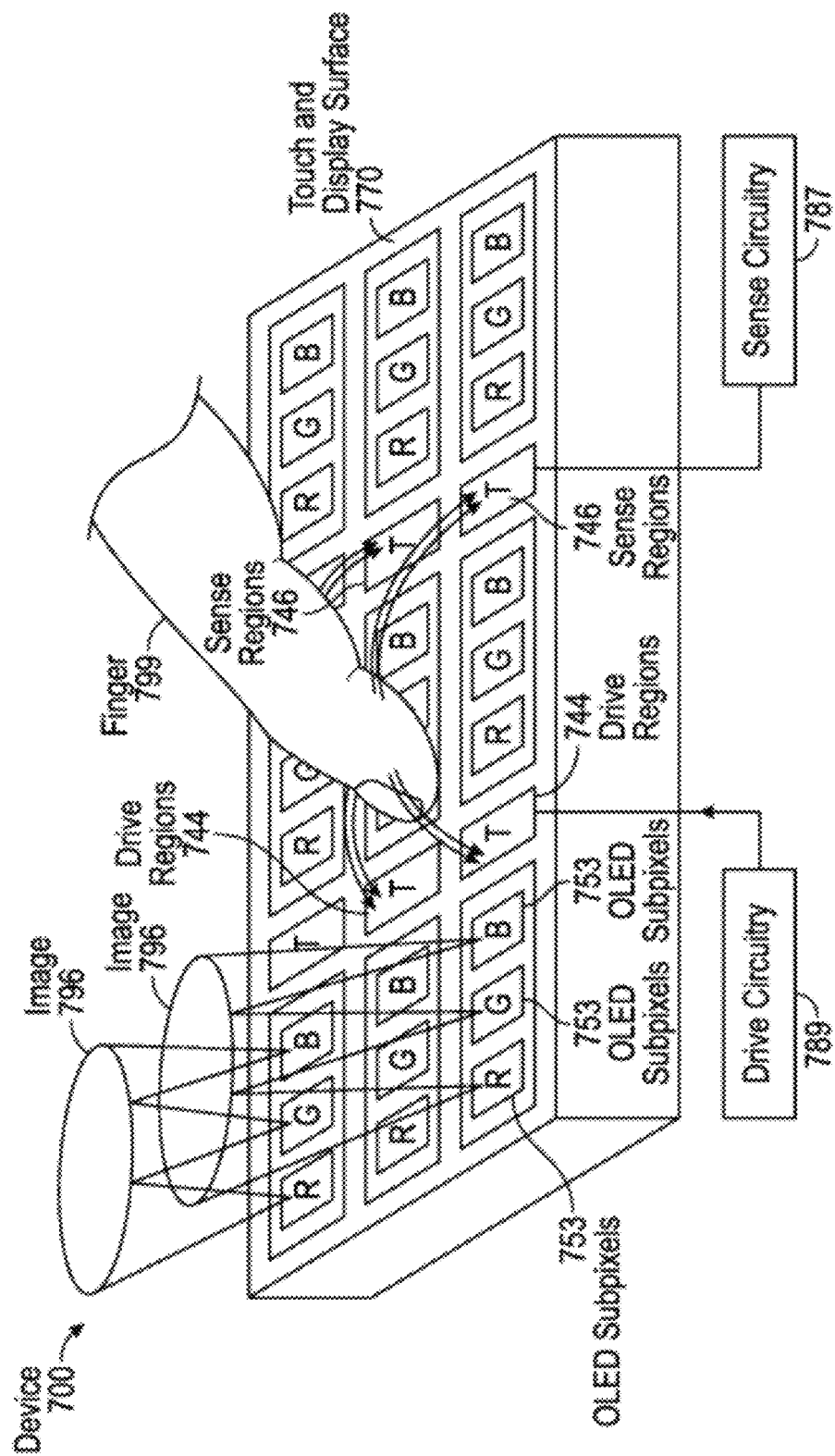
FIG. 3 illustrates one example of an OLED display and touch sensing assembly suitable for implementing an optical fingerprint sensing module according to some embodiments.

Various OLED display designs and touch sensing designs can be used for the device screen assembly above the optical fingerprint sensor module in FIGS. 2A, 2B, 2C and 2D. FIG. 3 illustrates one example of an OLED display and touch sensing assembly, which is FIG. 7B of U.S. Patent Application Publication No. US2015/0331508A1 published on Nov. 19, 2015, a patent application entitled "Integrated Silicon-OLED Display and Touch Sensor Panel" by Apple, Inc., which is incorporated by reference as part of the disclosure of this patent document. OLEDs can be implemented in various types or configurations, including, but not limited to, passive-matrix OLEDs (PMOLEDs), active-matrix OLEDs (AMOLEDs), transparent OLEDs, cathode-common OLEDs, anode-common OLEDs, White OLEDs (WOLEDs), and RGB-OLEDs. The different types of OLEDs can have different uses, configurations, and advantages. In the example of a system having an integrated Silicon-OLED display and touch sensor panel, the system can include a Silicon substrate, an array of transistors, one or more metallization layers, one or more vias, an OLED stack, color filters, touch sensors, and additional components and circuitry. Additional components and circuitry can include an electrostatic discharge device, a light shielding, a switching matrix, one or more photodiodes, a near-infrared detector and near-infrared color filters. The integrated Silicon-OLED display and touch sensor panel can be further configured for near-field imaging, optically-assisted touch, and fingerprint detection. In some examples, a plurality of touch sensors and/or display pixels can be grouped into clusters, and the clusters can be coupled to a switching matrix for dynamic change of touch and/or display granularity. In the OLED example in FIG. 3 and other implementations, touch sensors and touch sensing circuitry can include, for example, touch signal lines, such as drive lines and sense lines, grounding regions, and other circuitry. One way to reduce the size of an integrated touch screen can be to include multi-function circuit elements that can form part of the display circuitry designed to operate as circuitry of the display system to generate an image on the display. The multi-function circuit elements can also form part of the touch sensing circuitry of a touch sensing system that can sense one or more touches on or near the display. The multi-function circuit elements can be, for example, capacitors in display pixels of an LCD that can be configured to operate as storage capacitors/electrodes, common electrodes, conductive wires/pathways, etc., of the display circuitry in the display system, and that can also be configured to operate as circuit elements of the touch sensing circuitry. The OLED display example in FIG. 3 can be implemented to include multi-touch functionality to an OLED display without the need of a separate multi-touch panel or layer overlaying the OLED display. The OLED display, display circuitry, touch sensors, and touch circuitry can be formed on a Silicon substrate. By fabricating the integrated OLED display and touch sensor panel on a Silicon substrate, extremely high pixels per inch (PPI) can be achieved. Other arrangements different from FIG. 3 for the OLED and touch sensing structures are also possible. For example, the touch sensing layers can be an assembly that is located on top of the OLED display assembly.

Referring back to FIGS. 2A and 2B, the illustrated under-screen optical fingerprint sensor module for on-screen fingerprint sensing may be implemented in various configurations.

In one implementation, a device based on the above design can be structured to include a device screen a that provides touch sensing operations and includes a display panel structure having light emitting display pixels each operable to emit light for forming a display image, a top transparent layer formed over the device screen as an interface for being touched by a user for the touch sensing operations and for transmitting the light from the display structure to display images to a user, and an optical fingerprint sensor module located below the display panel structure to receive light that is emitted by at least a portion of the light emitting display pixels of the display structure and is returned from the top transparent layer to detect a fingerprint.

This device can be further configured with various features.

For example, a device electronic control module can be included in the device to grant a user's access to the device if a detected fingerprint matches a fingerprint an authorized user. In addition, the optical fingerprint sensor module is configured to, in addition to detecting fingerprints, also detect a biometric parameter different form a fingerprint by optical sensing to indicate whether a touch at the top transparent layer associated with a detected fingerprint is from a live person, and the device electronic control module is configured to grant a user's access to the device if both (1) a detected fingerprint matches a fingerprint an authorized user and (2) the detected biometric parameter indicates the detected fingerprint is from a live person. The biometric parameter can include, e.g., whether the finger contains a blood flow, or a heartbeat of a person.

For example, the device can include a device electronic control module coupled to the display panel structure to supply power to the light emitting display pixels and to control image display by the display panel structure, and, in a fingerprint sensing operation, the device electronic control module operates to turn off the light emitting display pixels in one frame to and turn on the light emitting display pixels in a next frame to allow the optical fingerprint sensor array to capture two fingerprint images with and without the illumination by the light emitting display pixels to reduce background light in fingerprint sensing.

For another example, a device electronic control module may be coupled to the display panel structure to supply power to the light emitting display pixels and to turn off power to the light emitting display pixels in a sleep mode, and the device electronic control module may be configured to wake up the display panel structure from the sleep mode when the optical fingerprint sensor module detects the presence of a person's skin at the designated fingerprint sensing region of the top transparent layer. More specifically, in some implementations, the device electronic control module can be configured to operate one or more selected light emitting display pixels to intermittently emit light, while turning off power to other light emitting display pixels, when the display panel structure is in the sleep mode, to direct the intermittently emitted light to the designated fingerprint sensing region of the top transparent layer for monitoring whether there is a person's skin in contact with the designated fingerprint sensing region for waking up the device from the sleep mode. Also, the display panel structure may be designed to include one or more LED lights in addition to the light emitting display pixels, and the device electronic control module may be configured to operate the one or more LED lights to intermittently emit light, while turning off power to light emitting display pixels when the display panel structure is in the sleep mode, to direct the intermittently emitted light to the designated fingerprint sensing region of the top transparent layer for monitoring whether there is a person's skin in contact with the designated fingerprint sensing region for waking up the device from the sleep mode.

For another example, the device can include a device electronic control module coupled to the optical fingerprint sensor module to receive information on multiple detected fingerprints obtained from sensing a touch of a finger and the device electronic control module is operated to measure a change in the multiple detected fingerprints and determines a touch force that causes the measured change. For instance, the change may include a change in the fingerprint image due to the touch force, a change in the touch area due to the touch force, or a change in spacing of fingerprint ridges.

For another example, the top transparent layer can include a designated fingerprint sensing region for a user to touch with a finger for fingerprint sensing and the optical fingerprint sensor module below the display panel structure can include a transparent block in contact with the display panel substrate to receive light that is emitted from the display panel structure and returned from the top transparent layer, an optical fingerprint sensor array that receives the light and an optical imaging module that images the received light in the transparent block onto the optical fingerprint sensor array. The optical fingerprint sensor module can be positioned relative to the designated fingerprint sensing region and structured to selectively receive returned light via total internal reflection at the top surface of the top transparent layer when in contact with a person's skin while not receiving the returned light from the designated fingerprint sensing region in absence of a contact by a person's skin.

For yet another example, the optical fingerprint sensor module can be structured to include an optical wedge located below the display panel structure to modify a total reflection condition on a bottom surface of the display panel structure that interfaces with the optical wedge to permit extraction of light out of the display panel structure through the bottom surface, an optical fingerprint sensor array that receives the light from the optical wedge extracted from the display panel structure, and an optical imaging module located between the optical wedge and the optical fingerprint sensor array to image the light from the optical wedge onto the optical fingerprint sensor array.

Specific examples of under-screen optical fingerprint sensor modules for on-screen fingerprint sensing are provided below.

Figure 4A:
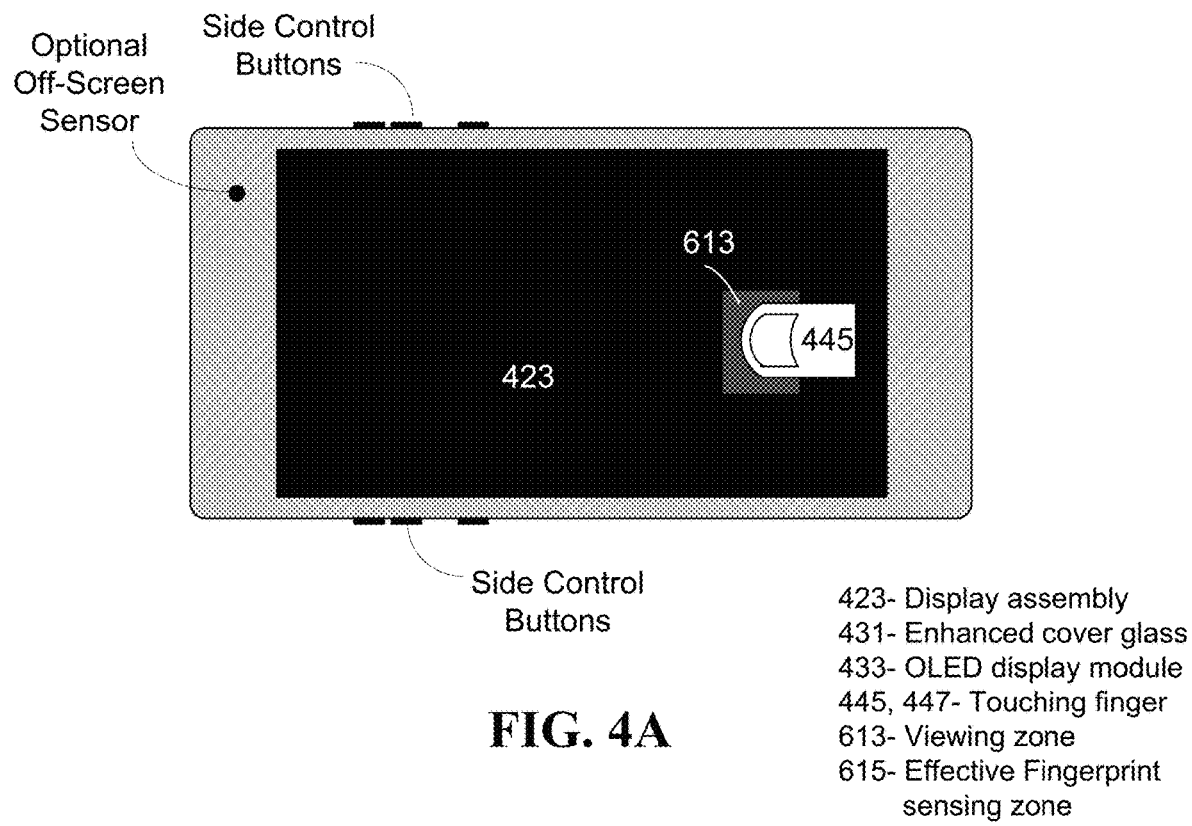
FIGS. 4A and 4B show an example of one implementation of an optical fingerprint sensor module under the display screen assembly for implementing the design illustrated in FIGS. 2A and 2B according to some embodiments.
Figure 4B:
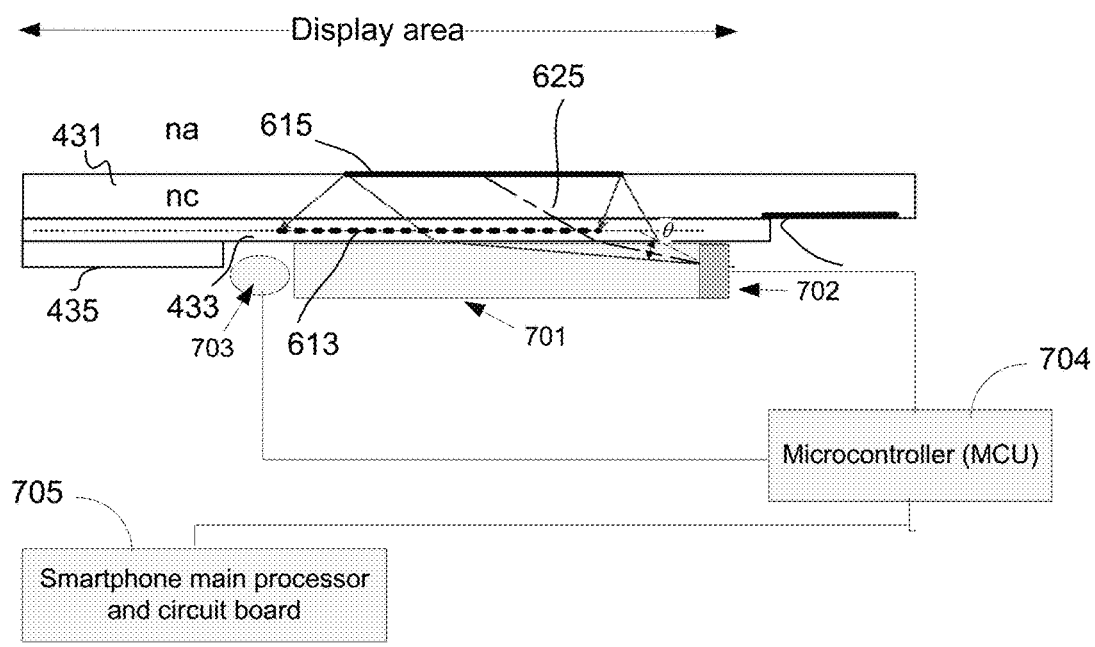

FIG. 4A and FIG. 4B show an example of one implementation of an optical fingerprint sensor module under the display screen assembly for implementing the design in FIGS. 2A and 2B. The device in FIGS. 4A-4B includes a display assembly 423 with a top transparent layer 431 formed over the device screen assembly 423 as an interface for being touched by a user for the touch sensing operations and for transmitting the light from the display structure to display images to a user. This top transparent layer 431 can be a cover glass or a crystal material in some implementations. The device screen assembly 423 can include an OLED display module 433 under the top transparent layer 431. The OLED display module 433 includes, among others, OLED layers including an array of OLED pixels that emit light for displaying images. The OLED layers have electrodes and wiring structure optically acting as an array of holes and light scattering objects. The array of holes in the OLED layers allows transmission of light from the top transparent layer 431 through the OLED layers to reach the optical fingerprint sensor module under the OLED layers and the light scattering caused by the OLED layers affects the optical detection by the under-screen optical fingerprint sensor module for fingerprint sensing. A device circuit module 435 may be provided under the OLED display panel to control operations of the device and perform functions for the user to operate the device.

The optical fingerprint sensor module in this particular implementation example is placed under OLED display module 433. The OLED pixels in a fingerprint illumination zone 613 can be controlled to emit light to illuminate the fingerprint sensing zone 615 on the top transparent layer 431 within the device screen area for a user to place a finger therein for fingerprint identification. As illustrated, a finger 445 is placed in the illuminated fingerprint sensing zone 615 as the effective sensing zone for fingerprint sensing. A portion of the reflected or scattered light in the zone 615 illuminated by the OLED pixels in the fingerprint illumination zone 613 is directed into the optical fingerprint sensor module underneath the OLED display module 433 and a photodetector sensing array inside the optical fingerprint sensor module receives such light and captures the fingerprint pattern information carried by the received light.

In this design of using the OLED pixels in the fingerprint illumination zone 613 within the OLED display panel to provide the illumination light for optical fingerprint sensing, the OLED pixels in the fingerprint illumination zone 613 can be controlled to turn on intermittently with a relatively low cycle to reduce the optical power used for the optical sensing operations. For example, while the rest of the OLED pixels in the OLED panel are turned off (e.g., in a sleep mode), the OLED pixels in the fingerprint illumination zone 613 can be turned on intermittently to emit illumination light for optical sensing operations, including performing optical fingerprint sensing and waking up the OLED panel. The fingerprint sensing operation can be implemented in a 2-step process in some implementations: first, a few of the OLED pixels in the fingerprint illumination zone 613 within the OLED display panel are turned on in a flashing mode without turning on other OLED pixels in the fingerprint illumination zone 613 to use the flashing light to sense whether a finger touches the sensing zone 615 and, once a touch in the zone 615 is detected, the OLED pixels in the fingerprint illumination zone 613 are turned on to activate the optical sensing module to perform the fingerprint sensing. Also, upon activating the optical sensing module to perform the fingerprint sensing, the OLED pixels in the fingerprint illumination zone 613 may be operated at a brightness level to improve the optical detection performance for fingerprint sensing, e.g., at a higher brightness level than their bright level in displaying images.

In the example in FIG. 4B, the under-screen optical fingerprint sensor module includes a transparent block 701 that is coupled to the display panel to receive the returned light from the top surface of the device assembly that is initially emitted by the OLED pixels in the fingerprint sensing zone 613, and an optical imaging block 702 that performs the optical imaging and imaging capturing. Light from OLED pixels in the fingerprint illumination zone 613, after reaching the cover top surface, e.g., the cover top surface at the sensing area 615 where a user finger touches, is reflected or scattered back from the cover top surface. When fingerprint ridges in close contact of the cover top surface in the sensing area 615, the light reflection under the fingerprint ridges is different, due to the presence of the skin or tissue of the finger in contact at that location, from the light reflection at another location under the fingerprint valley, where the skin or tissue of the finger is absent. This difference in light reflection conditions at the locations of the ridges and valleys in the touched finger area on the cover top surface forms an image representing an image or spatial distribution of the ridges and valleys of the touched section of the finger. The reflection light is directed back towards the OLED pixels, and, after passing through the small holes of the OLED display module 433, reaches the interface with the low index optically transparent block 701 of the optical fingerprint sensor module. The low index optically transparent block 701 is constructed to have a refractive index less than a refractive index of the OLED display panel so that the returned light can be extracted out of the OLED display panel into the optically transparent block 701. Once the returned light is received inside the optically transparent block 701, such received light enters the optical imaging unit as part of the imaging sensing block 702 and is imaged onto the photodetector sensing array or optical sensing array inside the block 702. The light reflection differences between fingerprint ridges and valleys create the contrast of the fingerprint image. As shown in FIG. 4B is a control circuit 704 (e.g., a microcontroller or MCU) which is coupled to the imaging sensing block 702 and to other circuitry such as the device main processor 705 on a main circuit board.

In this particular example, the optical light path design is such the light ray enters the cover top surface within the total reflect angles on the top surface between the substrate and air interface will get collected most effectively by the imaging optics and imaging sensor array in the block 702. In this design the image of the fingerprint ridge/valley area exhibits a maximum contrast. Such an imaging system may have undesired optical distortions that would adversely affect the fingerprint sensing. Accordingly, the acquired image may be further corrected by a distortion correction during the imaging reconstruction in processing the output signals of the optical fingerprint sensor array in the block 702 based on the optical distortion profile along the light paths of the returned light at the optical fingerprint sensor array. The distortion correction coefficients can be generated by images captured at each photodetector pixel by scanning a test image pattern one line pixel at a time, through the whole sensing area in both X direction lines and Y direction lines. This correction process can also use images from tuning each individual pixel on one at a time, and scanning through the whole image area of the photodetector array. This correction coefficients only need to be generated one time after assembly of the sensor.

The background light from environment (e.g., sun light or room light) may enter the image sensor through OLED panel top surface, through TFT substrate holes in the OLED display assembly 433. Such background light can create a background baseline in the interested images from fingers and is undesirable. Different methods can be used to reduce this baseline intensity. One example is to tune on and off the OLED pixels in the fingerprint illumination zone 613 at a certain frequency F and the image sensor accordingly acquires the received images at the same frequency by phase synchronizing the pixel driving pulse and image sensor frame. Under this operation, only one of the image phases has the lights emitted from pixels. By subtracting even and odd frames, it is possible to obtain an image which most consists of light emitted from the modulated OLED pixels in the fingerprint illumination zone 613. Based on this design, each display scan frame generates a frame of fingerprint signals. If two sequential frames of signals by turning on the OLED pixels in the fingerprint illumination zone 613 in one frame and off in the other frame are subtracted, the ambient background light influence can be minimized or substantially eliminated. In implementations, the fingerprint sensing frame rate can be one half of the display frame rate.

A portion of the light from the OLED pixels in the fingerprint illumination zone 613 may also go through the cover top surface, and enter the finger tissues. This part of light power is scattered around and a part of this scattered light may go through the small holes on the OLED panel substrate, and is eventually collected by the imaging sensor array in the optical fingerprint sensor module. The light intensity of this scattered light depends on the finger's skin color, the blood concentration in the finger tissue and this information carried by this scattered light on the finger is useful for fingerprint sensing and can be detected as part of the fingerprint sensing operation. For example, by integrating the intensity of a region of user's finger image, it is possible to observe the blood concentration increase/decrease depends on the phase of the user's heart-beat. This signature can be used to determine the user's heart beat rate, to determine if the user's finger is a live finger, or to provide a spoof device with a fabricated fingerprint pattern.

Referring to the OLED display example in FIG. 3, an OLED display usually has different color pixels, e.g., adjacent red, green and blue pixels form one color OLED pixels. By controlling which color of pixels within each color pixel to turn on and recording corresponding measured intensity, the user's skin color may be determined. As an example, when a user registers a finger for fingerprint authentication operation, the optical fingerprint sensor also measures intensity of the scatter light from finger at color A, and B, as intensity Ia, Ib. The ratio of Ia/Ib could be recorded to compare with later measurement when user's finger is placed on the sensing area to measure fingerprint. This method can help reject the spoof device which may not match user's skin color.

In some implementations, to provide a fingerprint sensing operation using the above described optical fingerprint sensor module when the OLED display panel is not turn on, one or more extra LED light sources 703 designated for providing fingerprint sensing illumination can be placed on the side of the transparent block 701 as shown in FIG. 4B. This designated LED light 703 can be controlled by the same electronics 704 (e.g., MCU) for controlling the image sensor array in the block 702. The designated LED light 703 can be pulsed for a short time, at a low duty cycle, to emit light intermittently and to provide pulse light for image sensing. The image sensor array can be operated to monitor the light pattern reflected off the OLED panel cover substrate at the same pulse duty cycle. If there is a human finger touching the sensing area 615 on the screen, the image that is captured at the imaging sensing array in the block 702 can be used to detect the touching event. The control electronics or MCU 704 connected to the image sensor array in the block 702 can be operated to determine if the touch is by a human finger touch. If it is confirmed that it is a human finger touch event, the MCU 704 can be operated to wake up the smartphone system, turn on the OLED display panel (or at least the off the OLED pixels in the fingerprint illumination zone 613 for performing the optical fingerprint sensing), and use the normal mode to acquire a full fingerprint image. The image sensor array in the block 702 will send the acquired fingerprint image to the smartphone main processor 705 which can be operated to match the captured fingerprint image to the registered fingerprint database. If there is a match, the smartphone will unlock the phone, and start the normal operation. If the captured image is not matched, the smartphone will feedback to user that the authentication is failed. User may try again, or input passcode.

In the example in FIG. 4B, the under-screen optical fingerprint sensor module uses the optically transparent block 701 and the imaging sensing block 702 with the photodetector sensing array to optically image the fingerprint pattern of a touching finger in contact with the top surface of the display screen onto the photodetector sensing array. The optical imaging axis or detection axis 625 from the sensing zone 615 to the photodetector array in the block 702 is illustrated in FIG. 4B. The optically transparent block 701 and the front end of the imaging sensing block 702 before the photodetector sensing array forma a bulk imaging module to achieve proper imaging for the optical fingerprint sensing. Due to the optical distortions in this imaging process, a distortion correction can be used, as explained above, to achieve the desired imaging operation.

Figure 5B:
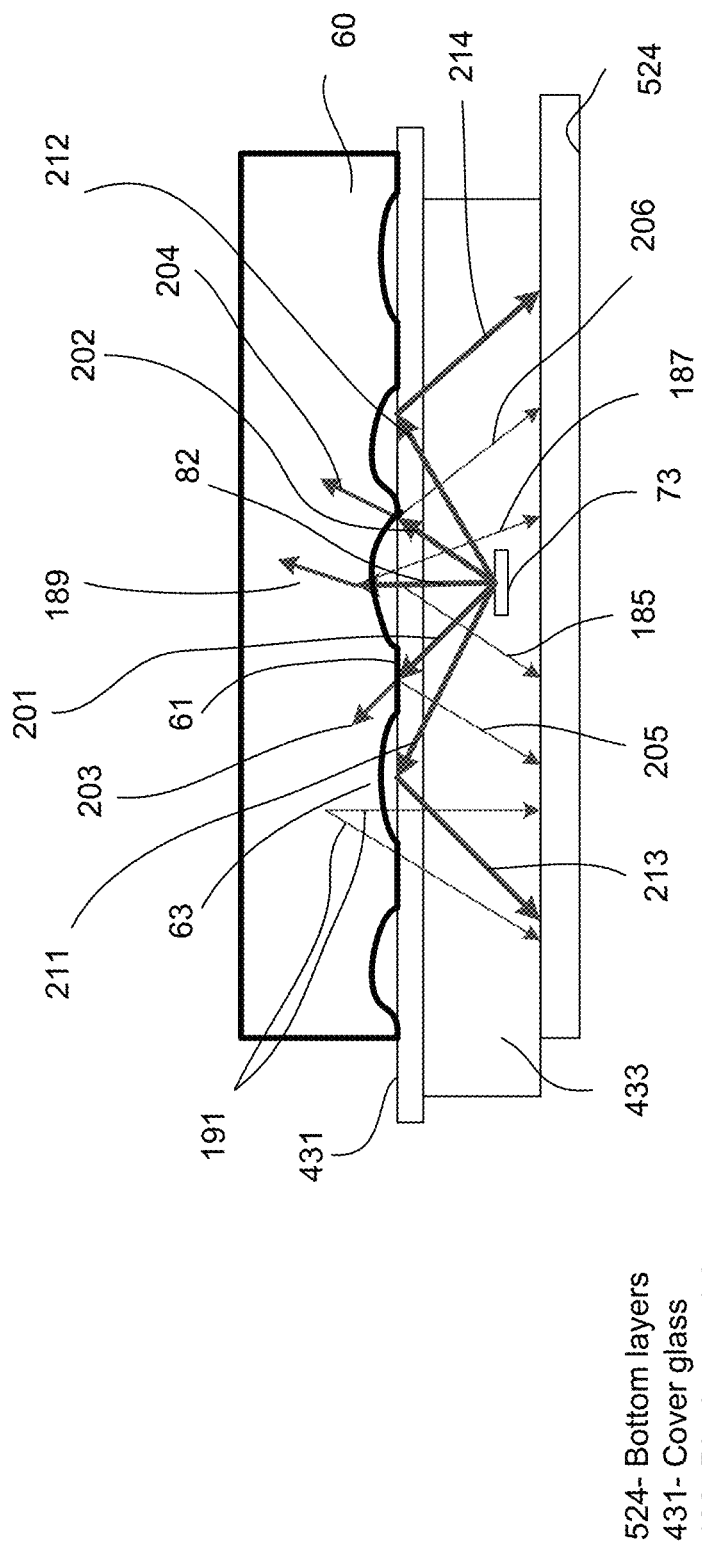

In the optical sensing by the under-screen optical fingerprint sensor module in FIGS. 4A-4B and other designs disclosed herein, the optical signal from the sensing zone 615 on the top transparent layer 431 to the under-screen optical fingerprint sensor module include different light components. FIGS. 5A and 5B illustrate signal generation for the returned light from the sensing zone 615 under two different optical conditions to facilitate the understanding of the operation of the under-screen optical fingerprint sensor module.

FIG. 5A shows how OLED-emitted light from the OLED display module 433, after transmitting through the top transparent layer 431, generates different returned light signals including light signals that carry fingerprint pattern information to the under-screen optical fingerprint sensor module. Two OLED pixels 71 and 73 at two different locations are shown to emit OLED output light beams 80 and 82 that are directed to the top transparent layer 431 without experiencing total reflection at the interfaces of the top transparent layer 431. A finger 60 is in contact with the sensing zone 615 on the top transparent layer 431. As illustrated, the OLED light beam 80 reaches to a finger ridge in contact with the top transparent layer 431 after transmitting through the top transparent layer 431 to generate the light beam 183 in the finger tissue and another light beam 181 back towards the OLED display module 433. The OLED light beam 82 reaches to a finger valley located above the top transparent layer 431 after transmitting through the top transparent layer 431 to generate the reflected light beam 185 from the interface with the top transparent layer 431 back towards the OLED display module 433, a second light beam 189 that enters the finger tissue and a third light beam 187 reflected by the finger valley.

In the example in FIG. 5A, it is assumed that the finger skin's equivalent index of refraction is about 1.44 at 550 nm and the cover glass index of refraction is about 1.51 for the top transparent layer 431. Under those assumptions, the display OLED pixel 71 is turned on at the finger skin ridge location 61 to produce the beam 80. The finger ridge-cover glass interface reflects part of the beam 80 as reflected light 181 to bottom layers 524 below the OLED display module 433. The reflectance is low, about 0.1%. The majority of the light beam 80 becomes the beam 183 that transmits into the finger tissue 60 which causes scattering of the light 183 to produce the returned scattered light 191 towards the OLED display module 433 and the bottom layers 524. The scattering of the transmitted light beam 189 from the OLED pixel 73 in the finger tissue also contributes to the returned scattered light 191.

The beam 82 from the display OLED group 73 at the finger skin valley location 63, the cover glass surface reflects about 3.5% of the incident light 82 power (light 185) to bottom layers 524, and the finger valley surface reflects about 3.3% of the incident light power (light 187) to bottom layers 524. The total reflection is about 6.8%. The majority light 189 is transmitted into the finger tissues 60. Part of the light power in the transmitted light 189 in the figure tissue is scattered by the tissue to contribute to the scattered light 191 towards and into the bottom layers 524.

Therefore, the light reflections from various interface or surfaces at finger valleys and finger ridges of a touching finger are different and the reflection ratio difference carries the fingerprint map information and can be measured to extract the fingerprint pattern of the portion that is in contact with the top transparent layer 431 and is illuminated the OLED light.

FIG. 5B shows how OLED-emitted light from the OLED display module 433, under a total reflection condition at the interface with the top transparent layer 431, generates different returned light signals including light signals that carry fingerprint pattern information to the under-screen optical fingerprint sensor module. It is assumed that the cover glass 431 and the OLED display module 433 are glued together without any air gap in between so that an OLED light beam emitted by an OLED pixel 73 with a large incident angle to the cover glass 431 will be totally reflected at the cover glass-air interface. When the display OLED pixel 73 is turned on, the divergent light beams can be divided into three groups: (1) central beams 82 with small incident angles to the cover glass 431 without the total reflection, (2) high contrast beams 201, 202, 211, 212 that are totally reflected at the cover glass 431 when nothing touches the cover glass surface and can be coupled into finger tissues when a finger touches the cover glass 431, and (3) escaping beams having very large incident angles that are totally reflected at the cover glass 431 even at a location where the finger issue is in contact.

For the central light beams 82, the cover glass surface reflects about 0.1%~3.5% to light beam 185 that is transmitted into bottom layers 524, the finger skin reflects about 0.1%~3.3% to light beam 187 that is also transmitted into bottom layers 524. The reflection difference is dependent on whether the light beams 82 meet with finger skin ridge 61 or valley 63. The rest light beam 189 is coupled into the finger tissues 60.

For high contrast light beams 201 and 202, the cover glass surface reflects nearly 100% to light beams 205 and 206 respectively if nothing touches the cover glass surface. When the finger skin ridges touch the cover glass surface and at light beams 201 and 202 positions, most of the light power is coupled into the finger tissues 60 by light beams 203 and 204.

For high contrast light beams 211 and 212, the cover glass surface reflects nearly 100% to light beams 213 and 214 respectively if nothing touches the cover glass surface. When the finger touches the cover glass surface and the finger skin valleys happen to be at light beams 211 and 212 positions, no light power is coupled into finger tissues 60.

Similar to the situation in FIG. 5A, light beams that are coupled into finger tissues 60 will experience random scattering by the figure tissues to form low-contrast light 191.

Therefore, in high contrast light beams illuminated area, finger skin ridges and valleys cause different optical reflections and the reflection difference pattern carries the fingerprint pattern information. The high contrast fingerprint signals can be achieved by comparing the difference.

The disclosed under-screen optical sensing technology can be in various configurations to optically capture fingerprints based on the design in FIGS. 2A and 2B.

In various implementations of the under-screen optical fingerprint sensor module technology for fingerprint sensing disclosed herein, the optical imaging of the illuminated touched portion of a finger to the optical fingerprint sensor array in the under-screen optical fingerprint sensor module can be achieved without using an imagine module such as a lens by imaging the returned light from the touched portion of the finger under optical illumination. One technical challenge for optical fingerprint sensing without an imaging module is how to control the spreading of the returned light that may spatially scramble returned light from different locations on the touched portion of the finger at the optical fingerprint sensor array so that the spatial information of different locations may be lost when such returned light reaches the optical fingerprint sensor array. This challenge can be addressed by using optical collimators or an array of pinholes to replace the optical imaging module in the under-screen optical fingerprint sensor module for detecting a fingerprint by optical sensing. A device for implementing such optical fingerprint sending can include a device screen that provides touch sensing operations and includes a display panel structure having light emitting display pixels, each pixel operable to emit light for forming a portion of a display image; a top transparent layer formed over the device screen as an interface for being touched by a user for the touch sensing operations and for transmitting the light from the display structure to display images to a user; and an optical fingerprint sensor module located below the display panel structure to receive light that is emitted by at least a portion of the light emitting display pixels of the display structure and is returned from the top transparent layer to detect a fingerprint, the optical fingerprint sensor module including an optical fingerprint sensor array that receives the returned light and an array of optical collimators or pinholes located in a path of the returned light to the optical fingerprint sensor array. The array of optical collimators are used to collect the returned light from the display panel structure and to separate light from different locations in the top transparent layer while directing the collected returned light to the optical fingerprint sensor array.

The imaging by using collimators relies on using different collimators at different locations to spatially separate light from different regions of a fingerprint to different optical detectors in the optical detector array. The thickness or length of each collimator along the collimator can be designed to control the narrow field of optical view of each collimator, e.g., the light from only a small area on the illuminated finger is captured by each collimator and is projected onto a few adjacent optical detectors in the optical detector array. As an example, the thickness or length of each collimator along the collimator can be designed to be large, e.g., a few hundred microns, so that the field of optical view of each collimator may allow the collimator to deliver imaging light to a small area on the optical detector array, e.g., one optical detector or a few adjacent optical detectors in the optical detector array (e.g., an area of tens of microns on each side on the optical detector array in some cases).

The following sections explain how an array of optical collimators or pinholes can be used for under-screen optical fingerprint sensing by the examples for using optical collimators in optical fingerprint sensing in hybrid sensing pixels each having a capacitive sensor for capturing fingerprint information and an optical fingerprint sensor for capturing fingerprint information.

Figure 6A:
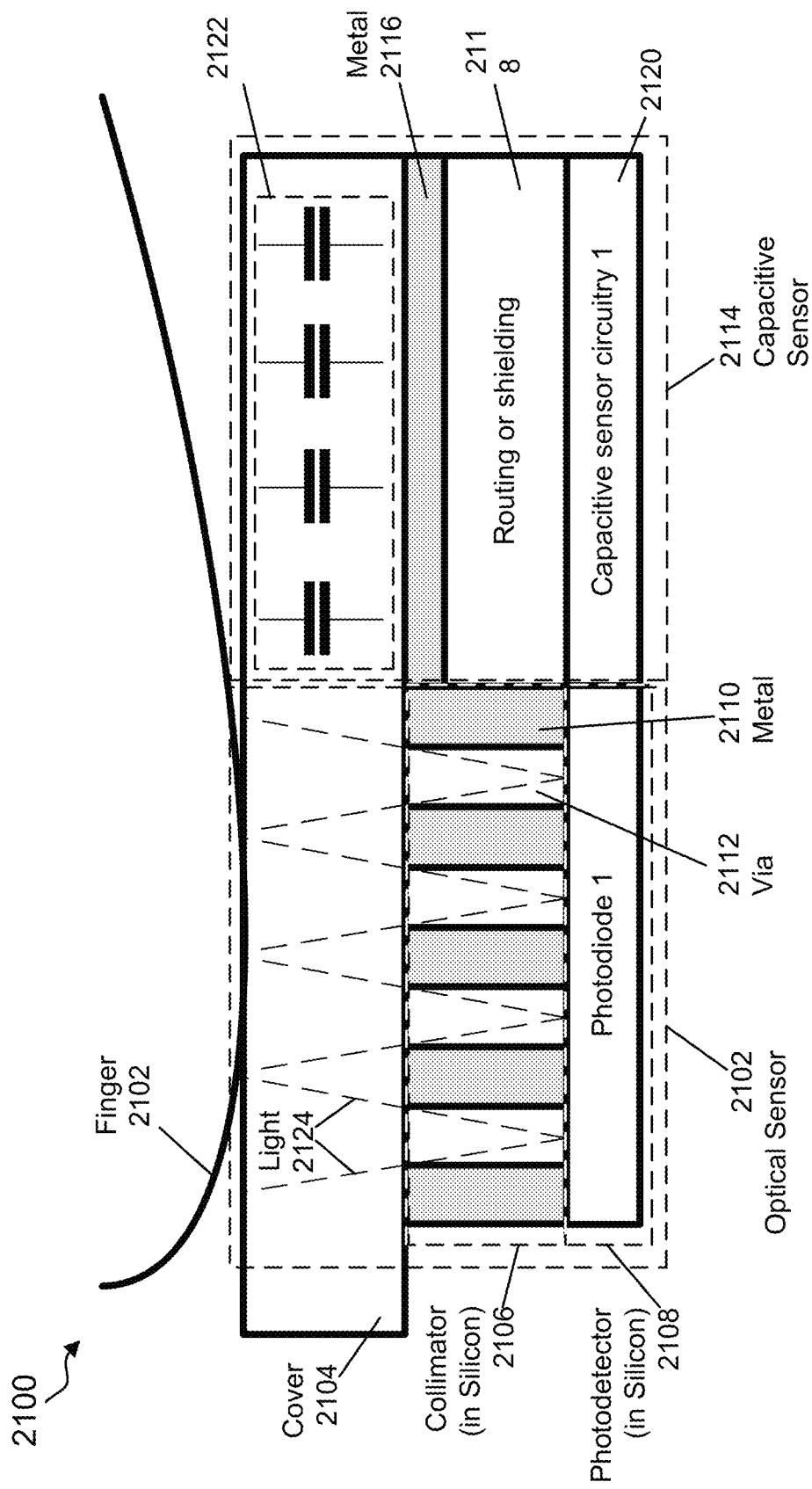
FIGS. 6A-6B, 7 and 8A-8C illustrate optical collimator designs for optical fingerprint sensing suitable for implementing an under-screen optical fingerprint sensor module according to some embodiments.
Figure 6B:
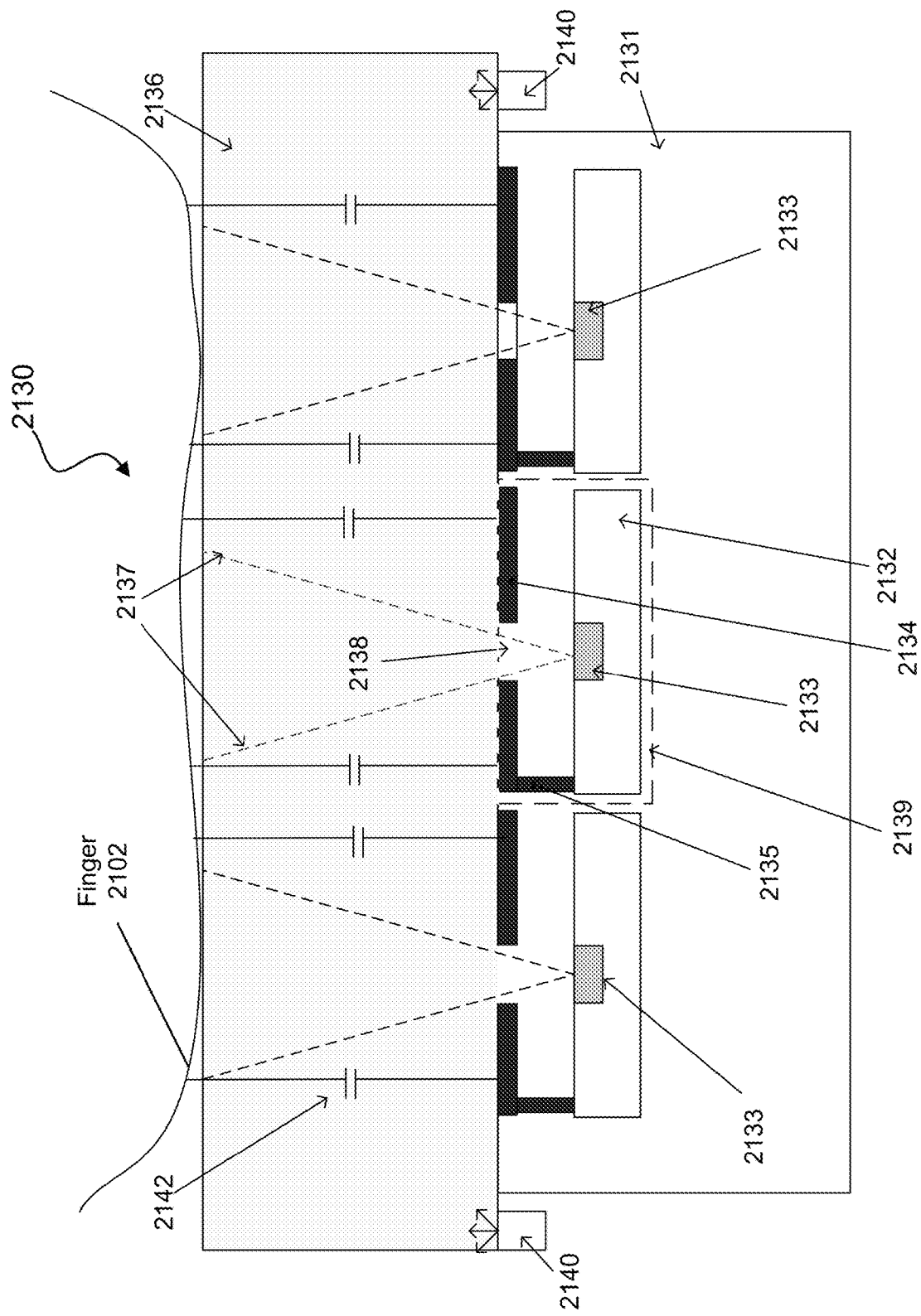

FIGS. 6A and 6B show two examples of hybrid sensing pixel designs that combine capacitive sensing and optical sensing within the same sensing pixel.

FIG. 6A shows an example of a fingerprint sensor device 2100 that incorporates a capacitive sensor in addition to an optical fingerprint sensor for each sensor pixel of an array of sensor pixels in capturing fingerprint information. By combining both capacitive sensors and optical fingerprint sensors, fingerprint images obtained with the optical fingerprint sensors can be used to better resolve the 3D fingerprint structure obtained with the capacitive sensors. For illustrative purposes, the structure shown in FIG. 6A represents one sensor pixel in an array of sensor pixels and each sensor pixel includes an optical fingerprint sensor 2102 and a capacitive sensor 2114 that are disposed next to each other within the same pixel.

The optical fingerprint sensor 2102 includes a photodetector 2108 and a collimator 2106 disposed over the photodetector 2108 to narrow or focus reflected light 2124 from finger 2102 toward the photodetector 2108. One or more light sources, such as LEDs (not shown) can be disposed around the collimator 2106 to emit light, which is reflected off the finger as reflected light 2124 and is directed or focused toward the corresponding photodetector 2108 to capture a part of the fingerprint image of the finger 2102. The collimator 2106 can be implemented using an optical fiber bundle or one or more metal layer(s) with holes or openings. This use of multiple optical collimators above the optical detector array may be used as a lensless optical design for capturing the fingerprint image with a desired spatial resolution for reliable optical fingerprints sensing. FIG. 6A shows the collimator 2106 implemented using one or more metal layers 2110 with holes or openings 2112. The collimator 2106 in the layer between the top structure or layer 2104 and the photodetectors 2108 in FIG. 6A includes multiple individual optical collimators formed by optical fibers or by holes or openings in one or more layers (e.g., silicon or metal) and each of such individual optical collimators receives light ray 2124 in a direction along the longitudinal direction of each optical collimator or within a small angle range that can be captured by the top opening of each opening or hole and by the tubular structure as shown so that light rays incident in large angles from the longitudinal direction of each optical collimator are rejected by each collimator from reaching the optical photodiode on the other end of the optical collimator.

In the capacitive sensing part of each sensing pixel, the capacitive sensor 2114 includes a capacitive sensor plate 2116 that is electromagnetically coupled to a portion of a finger that is either nearby or in contact with the sensing pixel to perform the capacitive sensing. More specifically, the capacitive sensor plate 2116 and the finger 2102 interact as two plates of one or more capacitive elements 2122 when the finger 2102 is in contact with or substantially near the optional cover 2104 or a cover on a mobile device that implements the fingerprint sensor device 2100. The number of capacitive sensor plates 2116 can vary based on the design of the capacitive sensor 2114. The capacitive sensor plate 2116 can be implemented using one or more metal layers. The capacitive sensor plate 2116 is communicatively coupled to capacitive sensor circuitry 2120 so that the capacitive sensor circuitry 2120 can process the signals from the capacitive sensor plate 2116 to obtain data representing the 3D fingerprint structure. A routing or shielding material can be disposed between the capacitive sensor plate 2116 and the capacitive sensor circuitry to electrically shield the metal plate 2116. The capacitive sensor circuitry 2120 can be communicatively coupled to both the capacitive sensor plate 2116 and the photodetector 2108 to process both the signal from the capacitive sensor plate 2116 and the signal from the photodetector 2108. In FIG. 6A, the capacitive sensor and the optical fingerprint sensor within each hybrid sensing pixel are adjacent to and displaced from each other without being spatially overlapped.

In implementations, the optical sensing features in the hybrid sensor design in FIG. 6A such as the optical collimator design can be used in a under-screen optical fingerprint sensor module. Therefore, the optical sensing with the optical collimator feature in FIG. 6A may be implemented in a mobile device or an electronic device is capable of detecting a fingerprint by optical sensing to include a display screen structure; a top transparent layer formed over the display screen structure as an interface for being touched by a user and for transmitting the light from the display screen structure to display images to a user; and an optical fingerprint sensor module located below the display screen structure to receive light that is returned from the top transparent layer to detect a fingerprint. The optical fingerprint sensor module includes an optical fingerprint sensor array of photodetectors that receive the returned light and an array of optical collimators to collect the returned light from the top transparent layer via the display screen structure and to separate light from different locations in the top transparent layer while directing the collected returned light through the optical collimators to the photodetectors of the optical fingerprint sensor array.

FIG. 6B illustrates another example of a fingerprint sensor device 2130 that structurally integrates an optical fingerprint sensor and a capacitive sensor in each hybrid sensor pixel in a spatially overlap configuration in an array of sensor pixels to reduce the footprint of each hybrid sensing pixel. The fingerprint sensor device 2130 includes a semiconductor substrate 2131, such as silicon. Over the substrate 2131, multiple sensing elements or sensing pixels 2139 are disposed. Each sensing element or sensing pixel 2139 includes active electronics circuitry area 2132 including CMOS switches, amplifier, resistors and capacitors for processing sensor signals. Each sensing pixel or sensing element 2139 includes a photodetector 2133 disposed or embedded in the active electronics circuitry area 2132. A capacitive sensor plate or a top electrode 2134 of the capacitive sensor for capacitive sensing is disposed over a photodetector 2133 and includes a hole or opening 2138 on the sensor plate 2134 to function also as a collimator of light for directing light onto the photodetector 2133. A via 2135 filled with conductive material is disposed to electrically connect the top electrode 2134 to the active circuit elements 2132. By adjusting the opening or the hole and the distance of the top electrode 2134 with the photodetector 2133, the light collecting angle 2137 of the photodetector (e.g., photodiode) 2133 can be adjusted. The fingerprint sensor device 2130 is covered by a protective cover 2136, which includes hard materials, such as sapphire, glass etc. Photodetector 2133 light collection angle 2137 can be designed to preserve the spatial resolution of the image collected by the photodiode arrays. A light source 2140, such as an LED, is placed under the cover, on the side of fingerprint sensor device 2130 to emit light, which is reflected off the finger and directed toward the photodetector 2133 to capture the fingerprint image. When a finger touches or comes substantially near the protective cover, the finger and the sensing top electrode 2134 in combination form a capacitive coupling (e.g., capacitor 2142) between the human body and sensing top electrode 2134. The fingerprint sensor device 2130 that includes both optical and capacitive sensors can acquire images of both a light reflection image of fingerprint and also a capacitive coupling image. The sensing top electrode 2134 serves dual purpose: 1) for capacitive sensing, and 2) as a collimator (by fabricating one or more holes on the sensing top electrode 2134) to direct, narrow or focus reflected light from the finger toward the photodetector 2133. Reusing the sensing top electrode 2134 eliminates the need for additional metal layer or optical fiber bundle, and thus reduces each pixel size and accordingly the overall size of the fingerprint sensor device 2130.

In FIG. 6B, the optical sensing design uses the holes or openings 2138 formed between the top layer 2136 and the bottom array of photodetectors 2133 as an optical collimators to select only light rays within certain angles 2137 to preserve the spatial resolution of the image collected by the photodetectors 2133 in the photodetector array as illustrated. Similar to the fiber or other tubular shaped optical collimators in FIG. 6A, the holes or openings 2138 formed between the top layer 2136 and the bottom array of photodetectors 2133 constitute optical collimators to collect the returned light from the top transparent layer via the display screen structure and to separate light from different locations in the top transparent layer while directing the collected returned light through the optical collimators to the photodetectors 2133.

Figure 7:
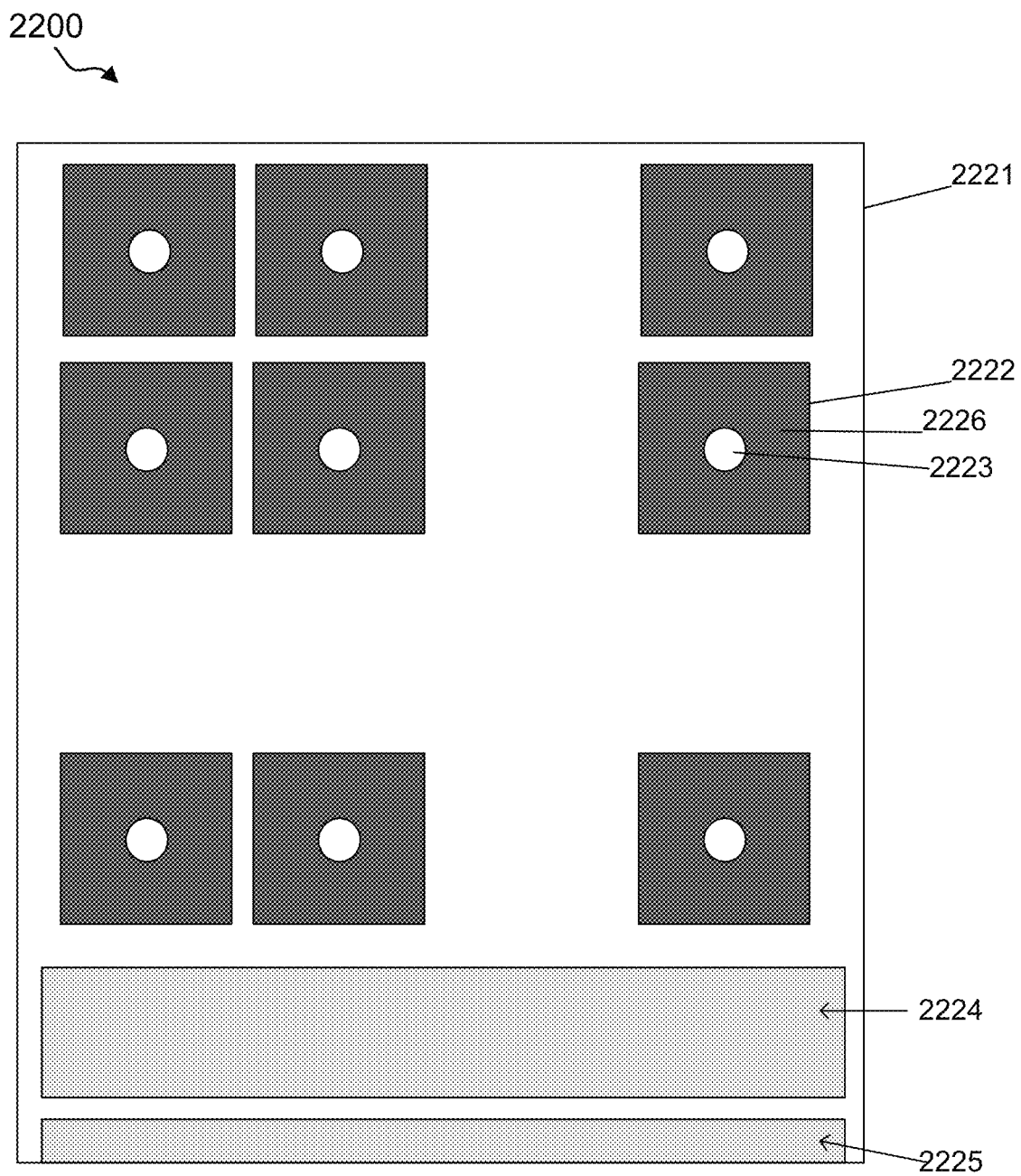

FIG. 7 is a top-down view of an exemplary hybrid fingerprint sensor device 2200 incorporating both an optical fingerprint sensor and a capacitive sensor in each hybrid sensing pixel. The fingerprint sensor device 2200 is implemented as a CMOS silicon chip 2221 that includes an array of hybrid (incorporating both an optical fingerprint sensor and a capacitive sensor) sensing elements or pixels 2222. Alternatively, the layout in FIGS. 11A-11B can also be for all optical sensing designs disclosed in this document where the openings or holes 2223 represent the optical collimators in FIG. 6A or 6B. The size or dimension of the sensing elements can be in the range of 25 μm to 250 μm, for example. The hybrid sensor device 2200 can include an array of support circuitry including amplifiers, ADCs, and buffer memory in a side region 2224. In addition, the hybrid sensor device 2200 can include an area for wire bonding or bump bonding 2225. A top layer 2226 of the hybrid sensor element 2222 can include a metal electrode for capacitive sensing. One or more openings or holes 2223 can be fabricated on each top metal electrode 23 to structurally serve as a collimator for directing light in a vertical direction to shine on a photodetector under the top electrode. Thus, the top layer 2226 structure can serve dual purposes of optical and capacitive sensing. A sensor device processor can be provided to process the pixel output signals from hybrid sensing pixels to extract the fingerprint information.

In addition to sharing the same structure for capacitive sensing and for focusing light in the vertical direction as a collimator, one instance of sensor signal detection circuitry can be shared between the optical and capacitive sensors to detect the sensor signals from both a photodetector and a capacitive sensor plate.

Figure 8A:
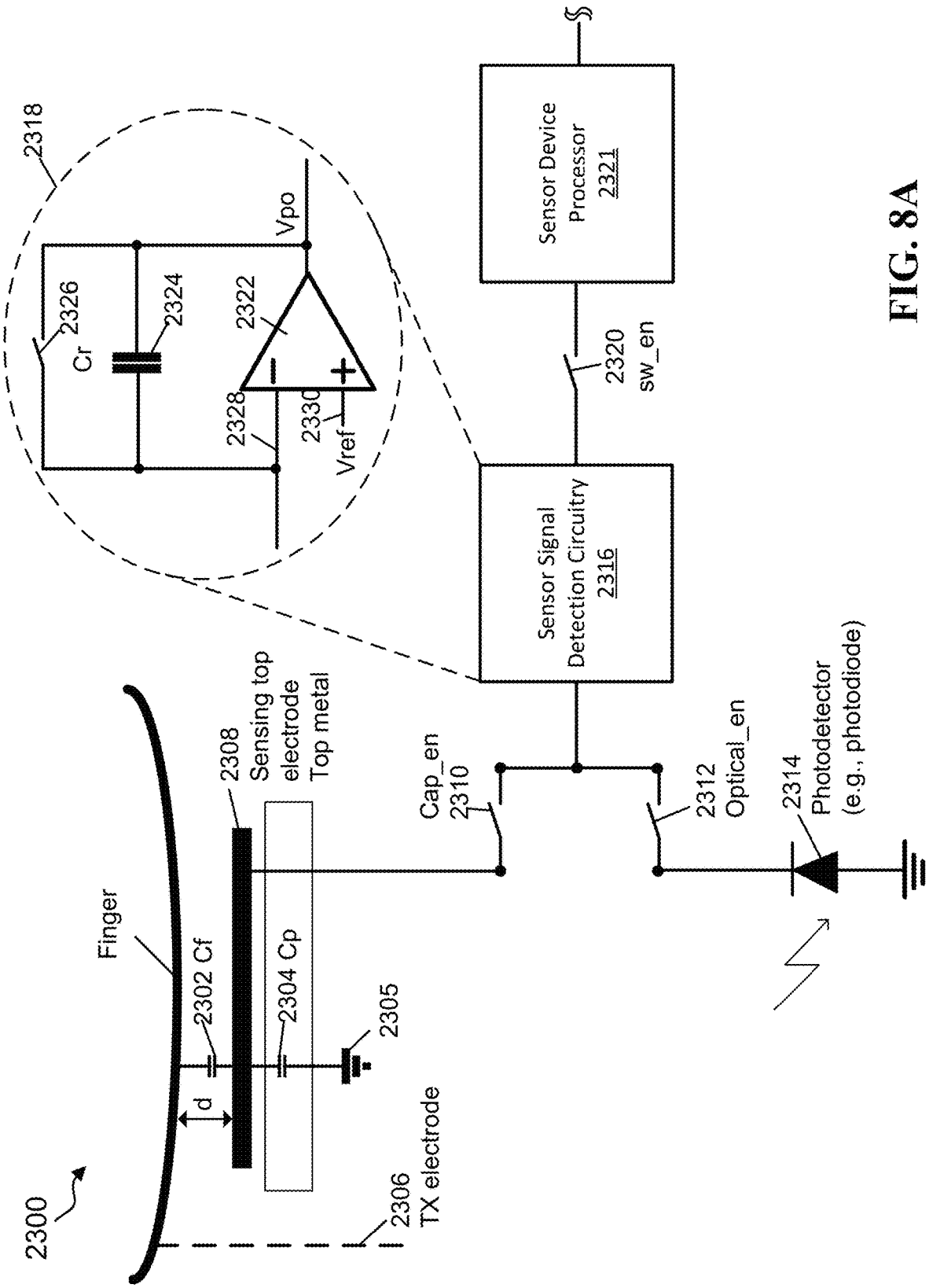

FIG. 8A illustrates a circuit diagram for an exemplary hybrid fingerprint sensing element or pixel 2300 having both capacitive sensing and optical sensing functions for fingerprints. The exemplary sensor pixel 2300 includes sensor signal detection circuitry 2316 to selectively switch between detecting or acquiring sensor signals from a sensing top electrode (e.g., a top metal layer) 2308 based on capacitive sensing and a photodetector (e.g., a photodiode) 2314 based on optical sensing to acquire both a reflective optical image from the photodetector 2314 and a capacitive coupled image from the capacitive sensor electrode 2308 from a finger. In some implementations, the two images from the two sensing mechanisms in each hybrid sensing pixel can be serially processed by the sensor signal detection circuitry. In the illustrated example, switches 2310 and 2312 have first terminals that are electrically coupled to the sensing top electrode 2308 and the photodetector 2314, respectively, and second terminals that are coupled to a common input terminal of the sensor signal detection circuitry 2316 to provide corresponding optical detector signal from the photodetector 2314 and the corresponding capacitive sensing signal from the sensing top electrode 2308 to the sensor signal detection circuitry 2316. When the switch 2310 is turned off (CAP_EN=0) and the switch 2312 is turned on (Optical_en=1), the sensor signal detection circuitry 2316 acquires the optical detector signal representing the optical image of the scanned fingerprint received at the particular hybrid sensing pixel. The sensor signal detection circuitry 2316 can acquire the capacitive sensing signal representing the capacitive image of the scanned fingerprint when switch 2310 CAP_EN=1 and Optical_en=0. After both the optical and capacitive images are acquired, both images can be processed in downstream circuitry separately and in combination to identify the fingerprint characteristics.

With the two modality of imaging by the above hybrid sensing pixels, the performance of the fingerprint identification can be enhanced by making use of the two types of the images in different ways. This enhanced fingerprint identification can be achieved by the sensor device processor, such as sensor device processor 2321, for processing the pixel output signals from the hybrid sensing pixels to extract the fingerprint information. For example, the capacitive image can provide a 3D image on the depth of the ridges and valleys of the fingerprint features. Complementing the 3D capacitive image, the optical image can provide a high resolution 2D information on the fingerprint characteristics. The optical 2D image having a higher spatial resolution can be used to recover the capacitive sensing image resolution because both images information on the same ridges of the fingerprint. In some implementations where the capacitive sensing method may be more sensitive and accurate on identifying the valleys of the fingerprint than the optical sensing method, the spatial resolution of images acquired using the capacitive sensing method can degrade based on the thickness of the cover. This aspect of the capacitive sensing can be supplemented by the optical sensing. In operation, the sensor response may be fixed and the point spread function of the capacitive sensor may be fixed for all sensor positions. The higher resolution optical sensing can be used as a resolution recovery method and can be applied on the capacitive sensing image to enhance the 3D image. A partial high resolution image from optical sensing can be available to help with the recovering method. Thus, the 3D capacitive image can be enhanced to provide more information on the valleys and ridges by interpolating or recovering based on the high resolution 2D image.

The enhanced 3D image can provide an improved fingerprint recognition and matching. In another example, the optical and capacitive images can be stored together to provide two comparisons each time a fingerprint recognition or matching is performed. The use of two types of images for comparison enhances the accuracy and security of the fingerprint sensing system.

The sensor signal detection circuitry 2316 can be implemented in various ways using a number different circuitry designs. In one example, integrator sensing circuitry 2318 can be implemented to store the electric charges caused by ridges and valleys touching or being substantially near the cover of the fingerprint sensor device of the cover of the mobile device. The inclusion of the integrator circuitry 2318 enhances the signal-to-noise ratio (SNR). The integrator sensing circuitry includes an operational amplifier 2322 to amplify a sensor signal, such as a capacitance related or optical related signal (e.g., voltage signal), detected by the sensing top electrode 2308 or the photodetector 2314 of the exemplary sensor pixel 2300. The sensing top electrode 2308 that include a conductive material, such as one of a variety of metals is electrically connected to a negative or inverting terminal 2328 of the amplifier 2322 through the switch 2310. The sensing top electrode 2108 and a local surface of the finger 2302 function as opposing plates of a capacitor Cf 2302. The capacitance of the capacitor Cf 2302 varies based on a distance 'd' between the local surface of the finger and the sensing top electrode 2308, the distance between the two plates of the capacitor Cf 2302. The capacitance of capacitor Cf 2302 is inversely proportional to the distance 'd' between the two plates of the capacitor Cf 2302. The capacitance of capacitor Cf 2302 is larger when the sensing top electrode 2308 is opposite a ridge of the finger than when opposite a valley of the finger.

In addition, various parasitic or other capacitors can be formed between different conductive elements in the exemplary sensor pixel 2300. For example, a parasitic capacitor CP 2304 can form between the sensing top electrode 2308 and a device ground terminal 2305. Device ground is coupled to earth ground closely. Another capacitor Cr 2324 can form between an output conductor of the amplifier 2322 and the negative or inverting terminal 2328 of the amplifier 2322 and functions as a feedback capacitor to the amplifier 2322. Also, a switch 2326 can be coupled between the output of the amplifier 2322 and the negative or inverting terminal 2328 of the amplifier 2322 to reset the integrator circuitry 2318.

The positive terminal of the amplifier 2322 is electrically connected to an excitation signal Vref. The excitation signal Vref can be directly provided to the positive terminal of a dedicated amplifier in each sensor pixel. By providing the excitation signal Vref directly to the positive terminal of the amplifier 2322, the exemplary sensor pixel 2100 becomes an active sensor pixel. In addition, providing the excitation signal Vref directly to the positive terminal of the amplifier 2322 eliminates the need to include an excitation electrode, common to all sensor pixels, which reduces a conductive (e.g., metal) layer from the semiconductor structure of the sensor chip. In some implementations, an optional excitation electrode 2306 can be implemented to enhance the SNR based on the design of the sensor pixel. In addition, by providing the excitation signal Vref 2330 directly to the amplifier 2322, the excitation signal Vref 2322 is not applied directly to the finger to avoid potentially irritating or injuring the finger. Moreover, when the excitation electrode for applying the excitation signal directly to the finger is not used, all components of the fingerprint sensor device can be integrated into a single packaged device, and the entire fingerprint sensor device can be disposed under the protective cover glass. With the entire fingerprint sensor device disposed under the protective cover glass, the fingerprint sensor device is protected from the finger and other external elements that can potentially damage the fingerprint sensor.

In FIG. 8A, the output signal (optical and capacitive) of the sensor signal detection circuitry 2316 (e.g., Vpo of the amplifiers 2322) in the sensor pixels 2300 is electrically coupled to a switch 2320 to selectively output the output signal Vpo from the sensor pixel 2300 to a signal processing circuitry including a filter. The switch 2320 can be implemented using a transistor or other switching mechanisms and electrically coupled to a controller to control the switching of the switch 2320. By controlling the switches 2320, 2310 and 2312, the sensor pixels in an array of sensor pixels can be selectively switched between acquiring the optical signals and the capacitive signals. In one implementation, the optical or capacitive signal can be acquired for each line, row or column of sensor pixels in the array and then switched to acquire the other type of signal for the line, row or column. The switching between the optical and capacitive signal acquisition can be performed line-by-line. In another implementation, one type of signal (capacitive or optical) can be acquired for all sensor pixels or elements in the array and then switched to acquire the other type of signal for all of the sensor pixels or elements. Thus, the switching between acquisition of different signal types can occur for the entire array. Other variations of switching between acquisition of the two types of sensor signals can be implemented.

Figure 8B:
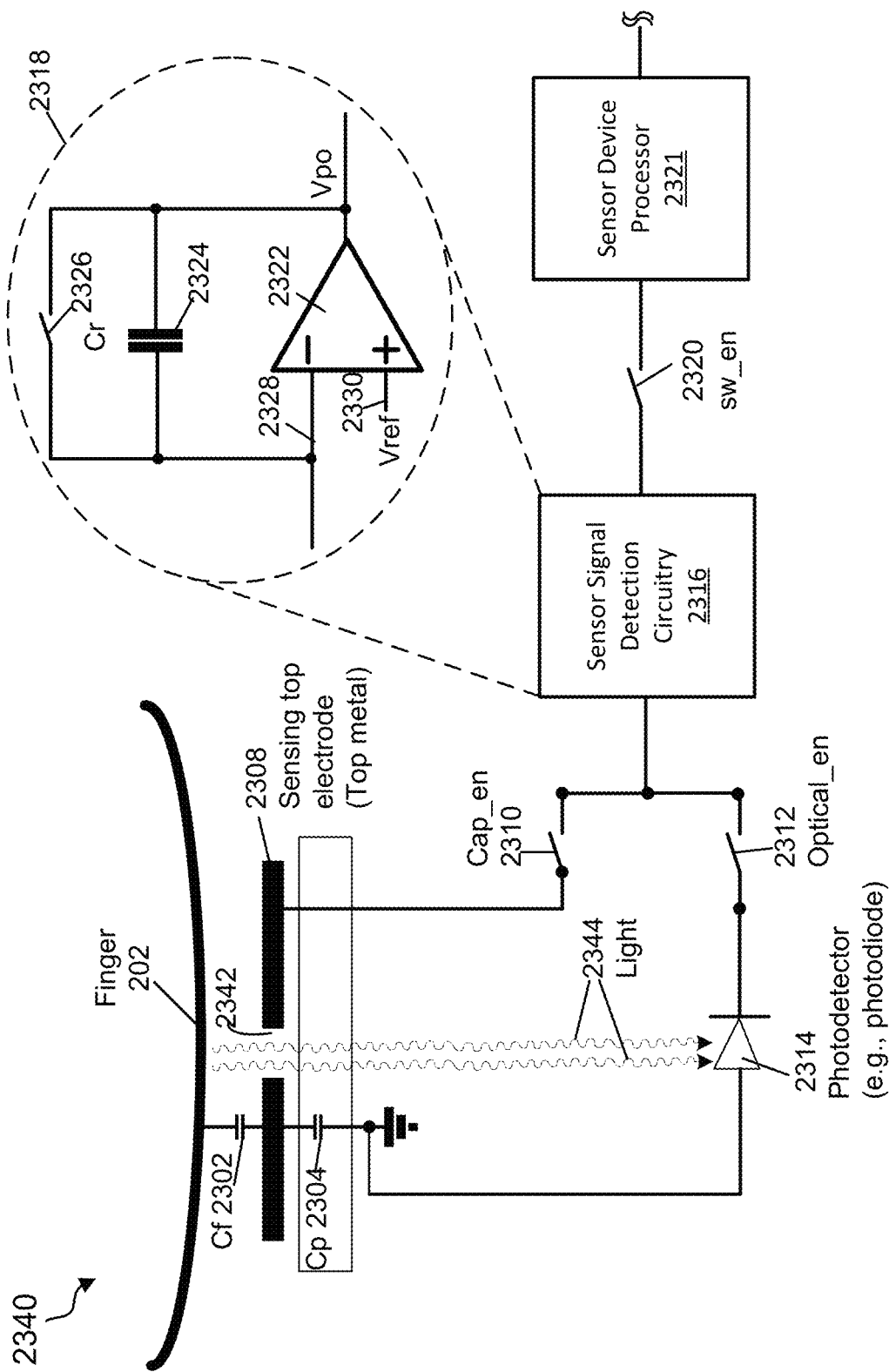

FIG. 8B illustrates a circuit diagram for another exemplary hybrid fingerprint sensing element or pixel 2340. The hybrid fingerprint sensing element or pixel 2340 is substantially the same as the hybrid fingerprint sensing element or pixel 2300 with respect to the components having the same reference number. For descriptions of the common components having the same reference number, refer to the description of FIG. 8A.

The hybrid fingerprint sensing element or pixel 2340 implements the sensing top electrode 2308 to include a hole or opening 2342 that functions as a collimator to focus or narrow the reflected light 2344 toward the photodetector 2314 (e.g., photodiode). The photodetector 2314 can be positioned or disposed below the collimator implemented using the sensing top electrode 2308 to capture the reflected light 2344 focused by the collimator 2308.

In some implementations, separate instances of sensor signal detection circuitry can be included for the optical and capacitive sensors to detect in parallel the sensor signals from both a photodetector and a capacitive sensor plate.

Figure 8C:
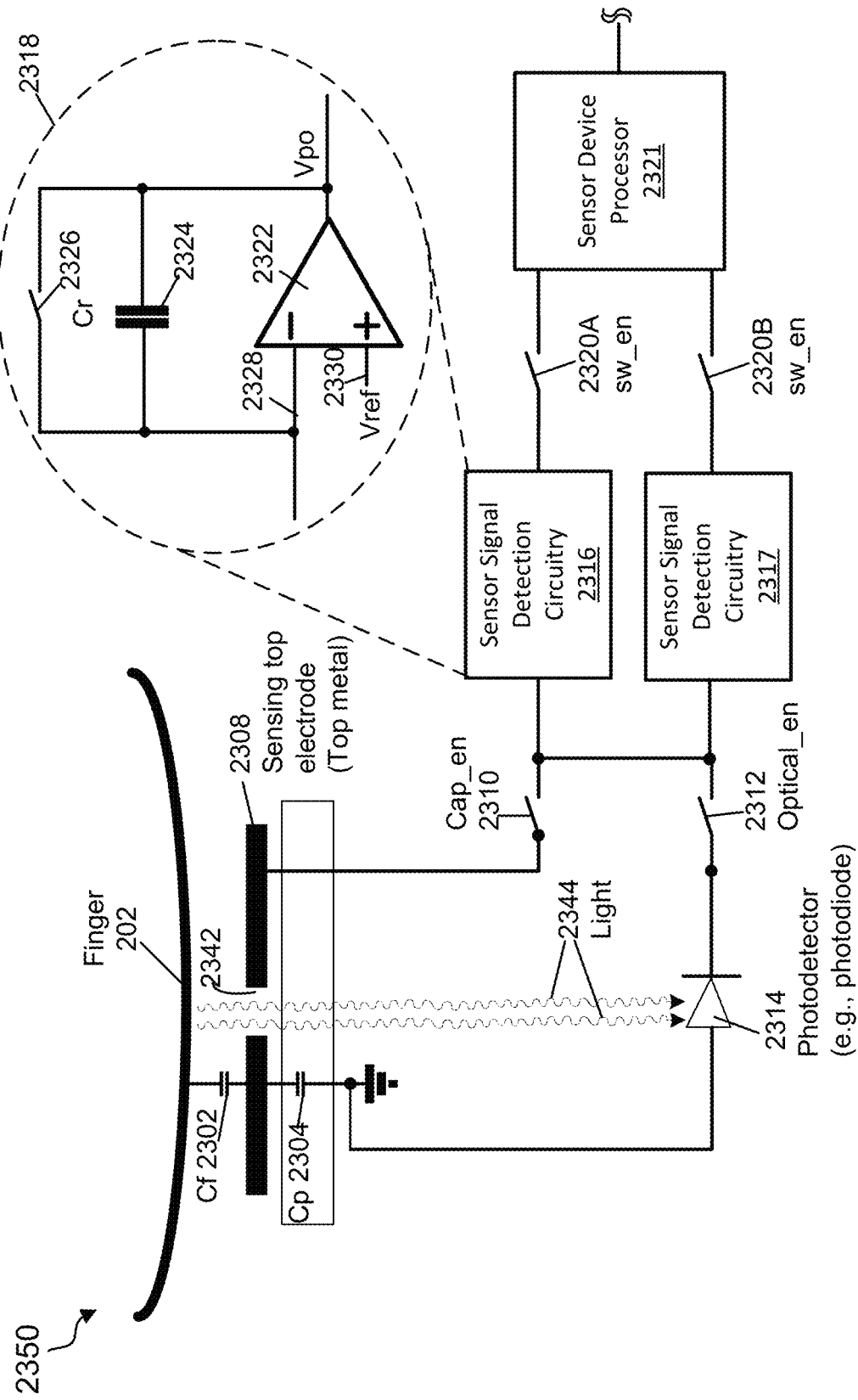

FIG. 8C illustrates a circuit diagram of an exemplary hybrid fingerprint sensing element or pixel 2350 for performing parallel detection of sensor signals from the photodetector and the capacitive sensor plate. The hybrid fingerprint sensing element or pixel 2350 is substantially the same as the hybrid fingerprint sensing element or pixel 2340 with respect to the components having the same reference number. For descriptions of the common components having the same reference number, refer to the description of FIG. 8A.

To perform sensor signal detection from both the capacitive plate and the photodetector in parallel, the hybrid fingerprint sensing element or pixel 2350 includes separate sensor signal detection circuitry 2316 and 2317 communicatively coupled to the sensing top electrode 2308 and the photodetector 2324 respectively. Sensor signal detection circuitry 2317 can be implemented to be substantially similar to sensor signal detection circuitry 2316. In some implementations, switches 2310 and 2312 can be disposed to have first terminals that are electrically coupled to the sensing top electrode 2308 and the photodetector 2314, respectively, and second terminals that are coupled to respective sensor signal detection circuitry 2316 and 2317 to provide the optical detector signal from the photodetector 2314 and the capacitive sensing signal from the sensing top electrode 2308 to the sensor signal detection circuitry 2316 and 2317 respectively When the switches 2310 and 2312 are turned on and off together, the sensor signal detection circuitry 2316 and 2317 can perform sensor signal detection from the capacitive plate 2308 and the photodetector 2314 in parallel. When the switches 2310 and 2312 are turned on and off out of phase with each other, the sensor signal detection circuitry 2316 and 2317 can perform sensor signal detection from the capacitive plate 2308 and the photodetector 2314 in series. In addition, the sensor device processor 2321 can be communicatively coupled to the sensor signal detection circuitry 2316 and 2317 either directly or indirectly through switches 2320A and 2320B to process the detected sensor signals from the capacitive plate 2308 and the photodetector 2314 in parallel or in series.

In another aspect of the disclosed technology, the optical fingerprint sensor described with respect to FIGS. 6A, 6B, 7, 8A and 8B can be used to measure human heart beat by measuring the reflected light intensity change with time caused by blood flow variations in fingers due to the heart beat and pumping actions of the heart. This information is contained in the received light that is reflected, scattered or diffused by the finger and is carried by the optical detector signal. Thus, the optical fingerprint sensor can serve multiple functions including acquiring an optical image of the fingerprint and to measure human heart beat. In implementations, a sensor device processor is used to process one or more optical detector signals to extract the heart beat information. This sensor device processor may be the same sensor device processor that processes the pixel output signals from optical sensing pixels or hybrid sensing pixels to extract the fingerprint information.

FIGS. 9, 10A-10B, and 11A-11B illustrate examples of various designs for fingerprint sensing using a under-screen optical fingerprint sensor module using an array of optical collimators or pinholes for directing signal light carrying fingerprint information to the optical fingerprint sensor array. Such optical collimators or pinholes are placed between the display screen and the optical fingerprint sensor array in the under-screen optical fingerprint sensor module to couple desired returned light from the display panel while filtering out background light in the optical detection by the optical fingerprint sensor array. Implementation of such optical collimators or pinholes can simplify the optical designs of the optical detection by the optical fingerprint sensor array, e.g., without using complex optical imaging designs. In addition, implementation of such optical collimators or pinholes can simplify the optical alignment of the overall optical layout to the optical fingerprint sensor array and improve reliability and performance of the optical detection by the optical fingerprint sensor array. Furthermore, such optical collimators or pinholes can significantly simplify the fabrication and reduce the overall cost of the under-screen optical fingerprint sensor module.

Figure 9:
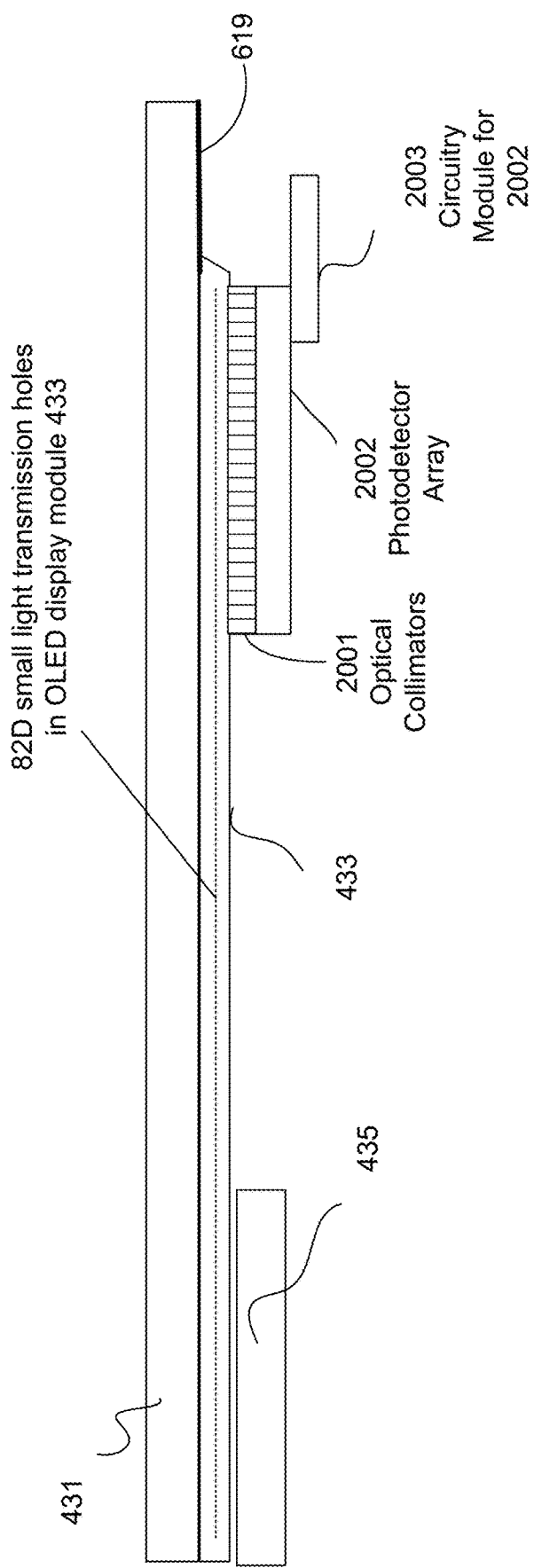

FIG. 9 shows an under-screen optical fingerprint sensor module that includes an optical collimator array 2001 of optical collimators placed on top of a photodetector array 2002 for directing signal light carrying fingerprint information into different photodetectors on the photodetector array 2002. A circuitry module 2003 is coupled to the photodetector array 2002 to operate the photodetector array 2002 and to receive the output signals from photodetectors on the photodetector array 2002. The OLED display module 433 includes small light transmission holes 82D, e.g., holes in the TFT layer of the OLED display module, to allow the light from the top surface of the top transparent layer 431 to pass through the OLED display module 433 to reach the under-screen optical fingerprint sensor module. The collimator array 2001 may use collimators in various designs, e.g., waveguide based image transmitters, an optical fiber array (with core or coreless), a micro lens array, a pinhole array and others. The collimators in the array 2001 are designed to limit the numerical aperture of the sampled image. Each pixel of the collimator array 2001 can be regarded as an optical detection needle. The photodiode array 2002 may be a CMOS sensor array, a CCD sensor array, a photodiode array or other photosensing array.

In operation, the OLED pixels illuminate the cover glass 431. The light reflected from the cover glass 431 is diffracted by the holes of the TFT structure in the OLED display module 433. The collimator array 2001 samples the useful part of the diffracted light and selects a portion of the light that fits the small numerical aperture of each collimator to transmit to the photodiode array 2002 to form the image of the sensing area.

FIGS. 10A-10B show the operation of the optical fingerprint sensor module in FIG. 9. The OLED pixels in the illumination zone 613 in the OLED display module 433 shine light beam 82P to the finger in contact with the sensing zone 615 on the cover glass 431. The finger and the cover glass 431 reflect a light beam 82R. The small holes in the TFT substrate diffract the light beam 82R to form light beam 82D. Proper collimator units in the collimator array 2001 select light 82S from the light beam 82D and guide it into the proper photodetector elements of photodetector array 2002. In some OLED displays, part of the light may be directly shined towards the sensor module and may be eliminated by calibration.

FIGS. 11A-11B show an exemplary implementation of the design in FIG. 9 and FIGS. 10A-10B. The optical collimator array 2001 in this example includes an array of optical collimators 903 and an optical absorption material 905 filled between the optical collimators 903 to absorb light to reduce cross talk between different optical collimators. Each collimator 903 of the collimator array 2001 may be channels that are extended or elongated along a direction perpendicular to the display panel and lets the light be transmitted along its axis with a low loss. The collimator array 2001 is designed to reduce optical crosstalk between different optical collimators and to maintain a desired spatial resolution in the optical sensing. In some implementations, one optical collimator may correspond to only one photodetector in the photodetector array 2002. In other implementations, one optical collimator may correspond to two or more photodetectors in the photodetector array 2002. As illustrated in FIG. 11B, the axis of each collimator unit may be perpendicular to the display screen surface in some designs and may be slanted with respect to the display surface. In operation, only the light that propagates along a collimator axis carries the image information. For example, the proper incident light 82P is reflected to form light 82R. Light 82R is then diffracted by the small holes of the TFT and expanded to light 82D. The light portion 82S is transmitted into the photodiode array 2002. The light portion 82E away from the axis is absorbed by the filling material. The reflectance on the cover glass surface 431 carries the fingerprint information. Other OLED pixels emit light 901 which is at an angle with respect to the collimator unit axis and thus may be blocked. A part of the reflected light, such as 901E, transmits into a corresponding optical collimator to reach the photodetector array 2002.

The optical collimator array can be made by different techniques, including, e.g., etching holes through a flat substrate, forming a light waveguide array, forming a micro lens array matching with optical filters, using coreless optical fiber bundle, or printing collimators on a transparent sheet. The desired features for such a collimator array include: (1) sufficient transmission contrast between the light component that propagates along the axis and the component that propagates off the axis so that the collimators ensures the desired spatial resolution in the optical sensing of the fingerprint pattern at the photodetector array; (2) the permitted transmission numerical aperture be sufficiently small to realize a desired high spatial resolution for the optical sensing.

Various optical collimator array designs may be used. Each optical collimator in the optical collimator array is structured to perform spatial filtering by transmitting light in directions along or close to an axis of the optical collimator while blocking light in other directions and to have a small optical transmission numerical aperture to achieve a high spatial resolution by the array of optical collimators. The small optical transmission numerical aperture also reduces the amount of the background light that enters the optical fingerprint sensor array. The collimator element aperture and the pitch (i.e., the distance between two nearby collimator elements) can be designed to achieve a desired spatial resolution for the optical fingerprint sensing.

Figure 12:
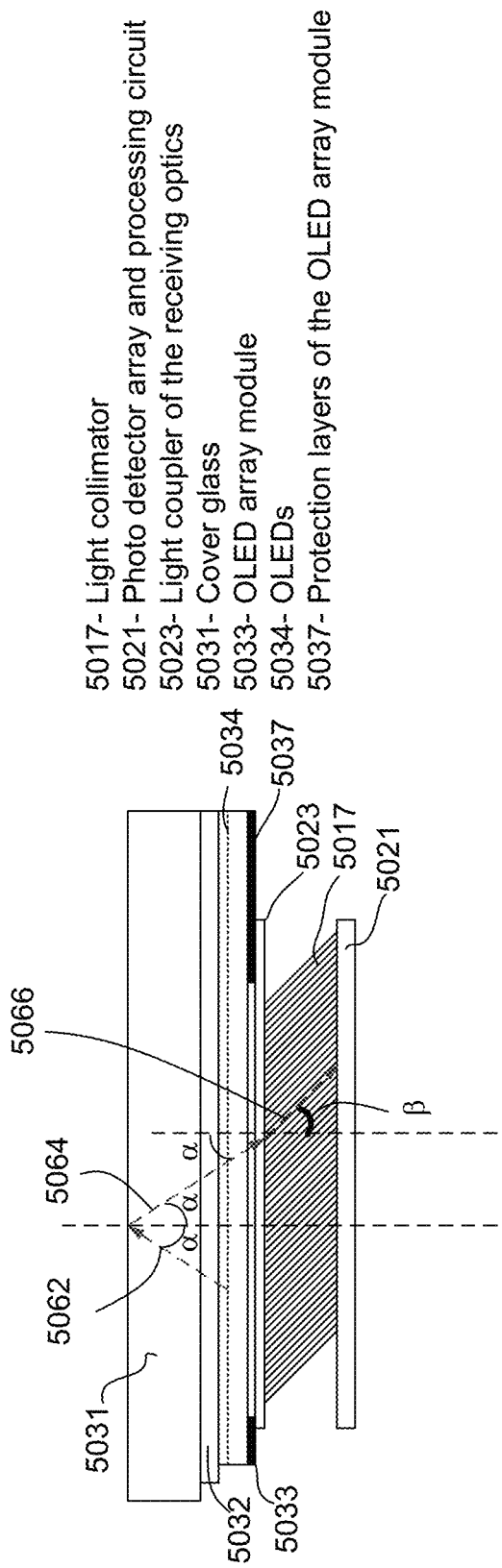
FIG. 12 shows a cross sectional view of an exemplary optical fingerprint sensing module with tilted light collimators according to some embodiments.

FIG. 12 shows a cross sectional view of an exemplary optical fingerprint sensing module with tilted light collimators according to some embodiments. The optical fingerprint sensing module is disposed under a fingerprint sensing section of a display screen. The display screen includes a cover glass 5031, a touch sensor layer 5032 disposed under the cover glass 5031, and an OLED array module 5033 disposed under the touch sensor layer 5032. The OLED array module 5033 includes a plurality of OLEDs 5034 that provide display light. A protection layer 5037 is disposed under the OLED array module 5033. The optical fingerprint sensing module includes an array of light collimators 5017 and a photodetector array and electronic circuitry 5021 coupled to the array of light collimators 5017. The array of light collimators 5017 may be of any type; for example, it may include a pinhole array, a micro lens array, a micro lens array plus corresponding pinhole array, and the like. The optical axis of the light collimators 5017 may be tilted with respect to the normal of the display screen.

The optical fingerprint sensing module may further include a light coupler 5023 disposed under the protection layer 5037 of the display screen and above the array of light collimators 5017. The light coupler 5023 may be configured to refract light rays carrying fingerprint information into proper directions so that they may be transmitted by the light collimators 5017 to be detected by the photodetector array 5021. For example, a light ray 5062 emitted by an OLED may be incident on a top surface of the cover glass 5031 at an angle of incidence $\alpha$. A light ray 5064 reflected by the top surface of the cover glass 5031 may be incident on the light coupler 5023 at an angle of incidence $\alpha$. A light ray 5066 refracted by the light coupler 5023 may propagate at an angle of incidence $\beta$. If the angle of incidence substantially matches with the tilting angle of the light collimators 5017, the refracted light ray 5066 may be transmitted through a light collimator 5017 to be detected by the photodetector array 5021.

Figure 13:
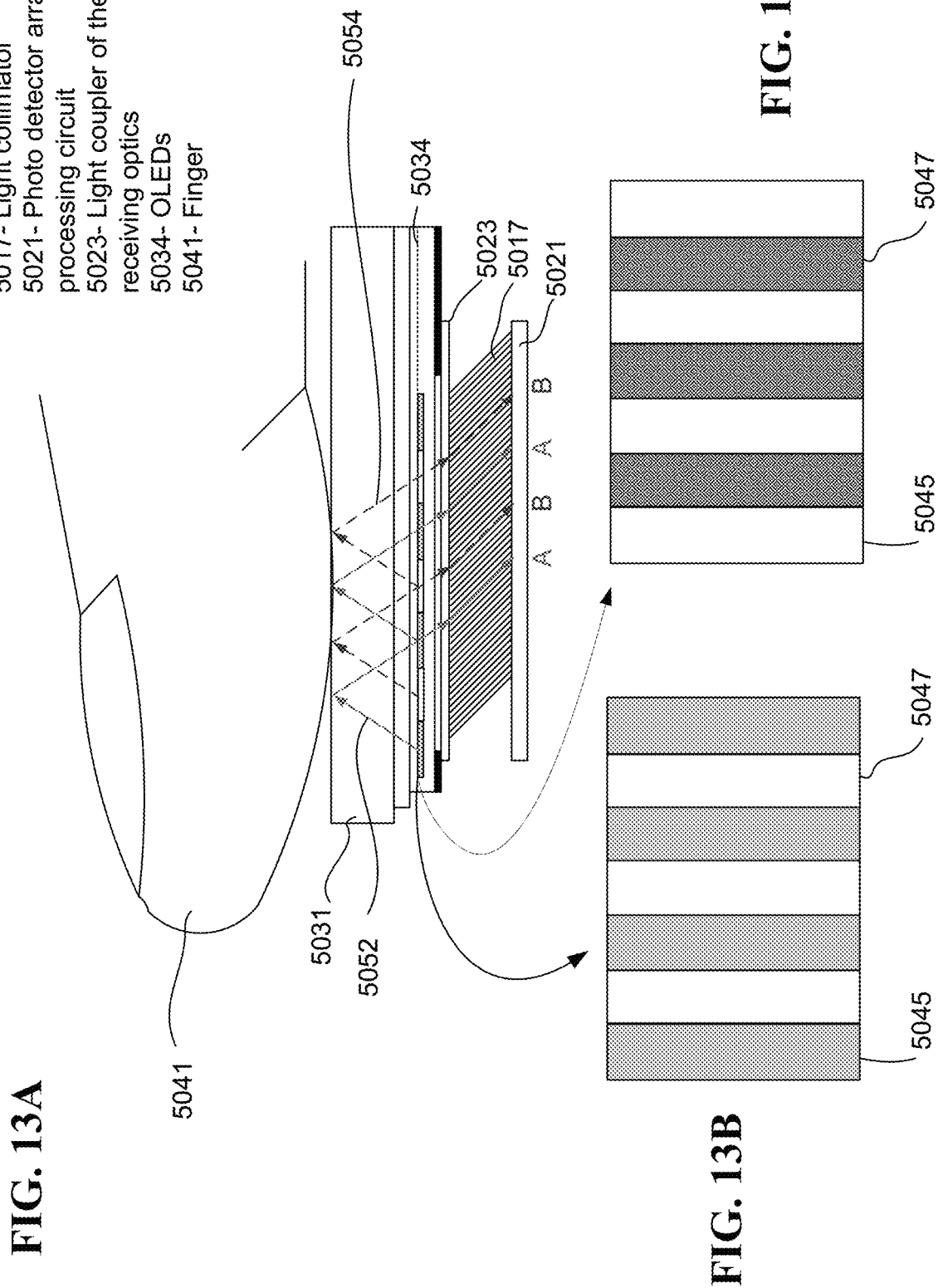
FIGS. 13A-13C illustrate a method of fingerprint sensing using an optical fingerprint sensing module with tilted light collimators according to some embodiments.

FIGS. 13A-13C illustrate a method of fingerprint sensing using an optical fingerprint sensing module with tilted light collimators according to some embodiments. As illustrated in a plan view of the OLED layer 5034 shown in FIG. 13B, the OLEDs in the fingerprint sensing section of the display screen may be controlled to form an illumination pattern. For example, the pattern may include columns 5047 of OLEDs that are turned on (represented by the white stripes, referred herein as on-columns), alternating with columns 5045 of OLEDs that are turned off (represented by the shaded stripes, referred herein as off-columns). Each column of LEDs 5045 or 5047 extends in a direction substantially perpendicular to an azimuthal plane of each light collimator (e.g., the azimuthal plane of a light collimator is the plane of the paper in FIG. 13A, and each column of LEDs 5045 or 5047 extends in a direction substantially perpendicular to the plane of the paper.) The off-columns 5045 and the off-columns 5047 may be arranged as a periodic array with a certain period as illustrated in FIG. 13B according to some embodiments.

FIG. 13A shows some exemplary ray paths for light rays emitted by the OLEDs. The solid arrows 5052 show the light paths for light rays that would have been emitted by the OLEDs in the off-columns if those OLEDs were turned on. The dashed arrows 5054 show the light paths for light rays that are emitted by the OLEDs in the on-columns. As illustrated, light rays 5052 and 5054 emitted by the OLEDs at certain angle of incidence may be reflected by the top surface of the cover glass 5031, and subsequently be transmitted through the light collimators 5017 to be detected by the photodetector array 5021.

As illustrated in FIG. 13A, with a properly selected period of the on-off pattern in the OLED layer 5034, the light rays 5052 originated from the OLEDs in the off-columns may pass through the off-stripes after being reflected by the top surface of the cover glass 5031. The corresponding positions on the photodetector array 5021 are denoted with "A." Thus, any light detected at "A" positions on the photodetector array 5021 may be from the target (e.g., a finger) illuminated by nearby OLEDs. This image is referred herein as an A-image. The A-image may have negligible or small influence from the microstructures of the OLED layer 5034, as the detected light passes through the off-columns of the OLED layer 5034, and does not include light emitted by the OLEDs and reflected off of the top surface of the cover glass 5031.

As illustrated in FIG. 13A, with the same period of the on-off pattern in the OLED layer 5034, the light rays 5054 originated from the OLEDs in the on-columns may pass through the on-columns after being reflected by the top surface of the cover glass 5031. The corresponding positions on the photodetector array 5021 are denoted with "B," and the image is referred herein as a B-image. The B-image may contain information of the microstructures of the OLED layer 5034, as the detected light passes through the on-columns of the OLED layer 5034. The B-image may also include light emitted by the OLEDs and reflected off of the top surface of the cover glass 5031.

In one frame, the A-image and the B-image are captured together, but each of the A-image and the B-image in the frame does not include a full image of the target. According to some embodiments, the illumination pattern of the OLED layer 5034 may be scanned from one frame to a next frame, and multiple frames are captured. A full A-image of the target and/or a full B-image of the target may be reconstructed from the multiple frames. For example, in one frame, the OLEDs in the OLED layer 5034 may be controlled to have the illumination pattern shown in FIG. 13B; and in a next frame, the OLEDs in the OLED layer 5034 may be controlled to have the illumination patter shown in FIG. 13C, in which those columns of OLEDs that are turned on in the frame shown in FIG. 13B are turned off and those columns of OLEDs that are turned off in the frame shown in FIG. 13B are turned on. Thus, by combining the "A" pixels in the two frames, a full A-image may be obtained. Similarly, by combining the "B" pixels in the two frames, a full B-image may be obtained.

Figure 14:
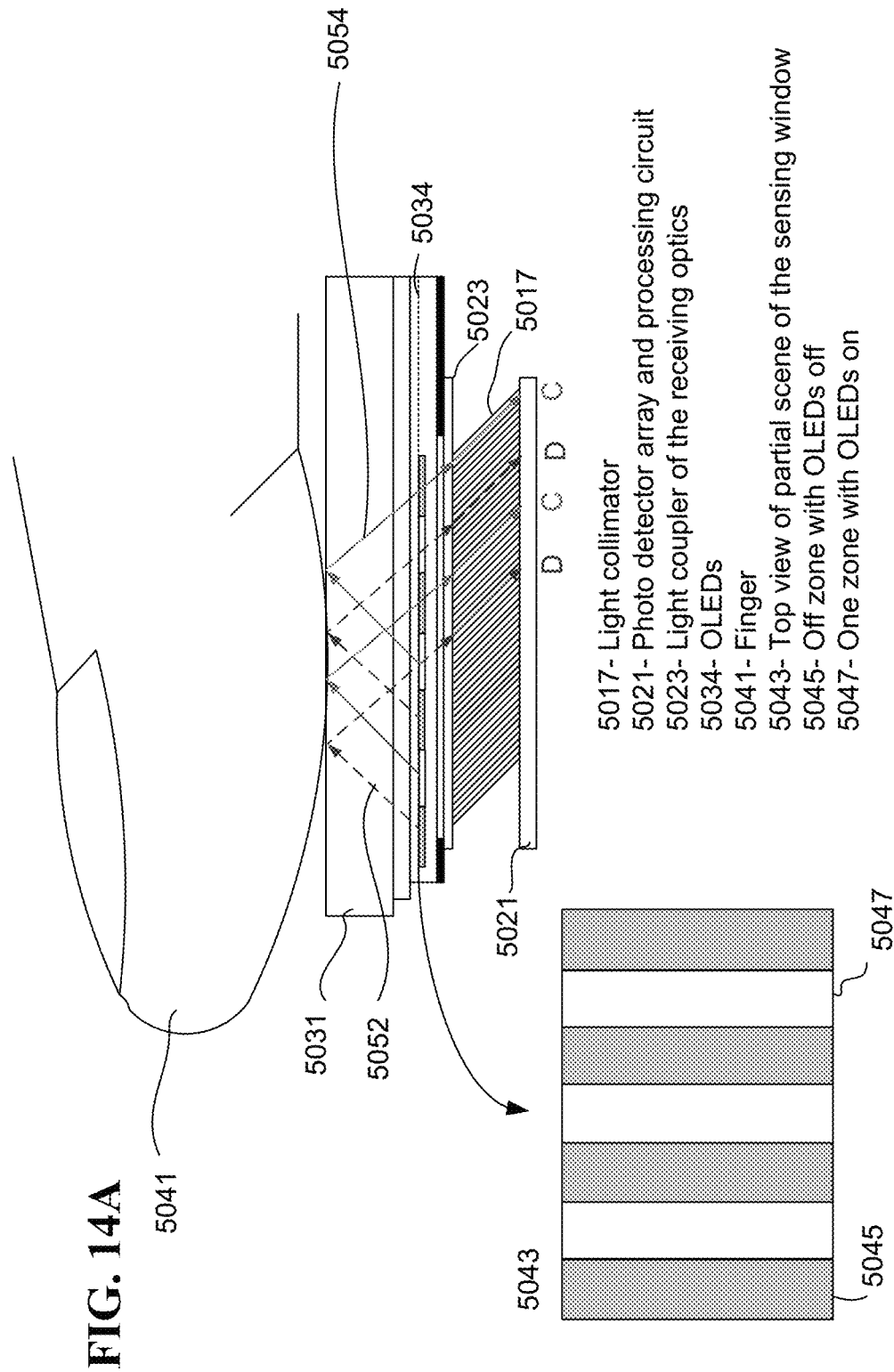
FIGS. 14A-14B illustrate a method of fingerprint sensing using an optical fingerprint sensing module with tilted light collimators according to some embodiments.

FIGS. 14A-14B illustrate a method of fingerprint sensing using an optical fingerprint sensing module with tilted light collimators according to some embodiments. Similar to the method illustrated in FIGS. 13A-13C, the OLEDs in the fingerprint sensing section of the display screen may be controlled to form an illumination pattern as illustrated in FIG. 14B. Here, the period of the on-off pattern in the OLED layer 5034 is selected so that the light rays 5052 originated from the OLEDs in the off-columns may pass through the on-columns after being reflected by the top surface of the cover glass 5031. The corresponding positions on the photodetector array 5021 are denoted with "D." Thus, any light detected at "D" positions on the photodetector array 5021 may be from the target illuminated by nearby OLEDs. This image is referred herein as an D-image. The D-image may contain information of the microstructures of the OLED layer 5034, as the detected light passes through the on-columns of the OLED layer 5034. But the D-image may not include light emitted by the OLEDs and reflected off of the top surface of the cover glass 5031.

As illustrated in FIG. 14A, with the same period of the on-off pattern in the OLED layer 5034, the light rays 5054 originated from the OLEDs in the on-columns may pass through the off-columns after being reflected by the top surface of the cover glass 5031. The corresponding positions on the photodetector array 5021 are denoted with "C," and the image is referred herein as a C-image. The C-image may have negligible or small influence from the microstructures of the OLED layer 5034, as the detected light passes through the off-columns of the OLED layer 5034. But the C-image may include light emitted by the OLEDs and reflected off of the top surface of the cover glass 5031.

Similar to the method illustrated in FIGS. 13A-13C, in one frame, the C-image and the D-image are captured together, but each of the C-image and the D-image in the frame does not include a full image of the target. According to some embodiments, the illumination pattern of the OLED layer 5034 may be scanned from one frame to a next frame, and multiple frames are captured. A full C-image of the target and/or a full D-image of the target may be reconstructed from the multiple frames.

Figure 15:
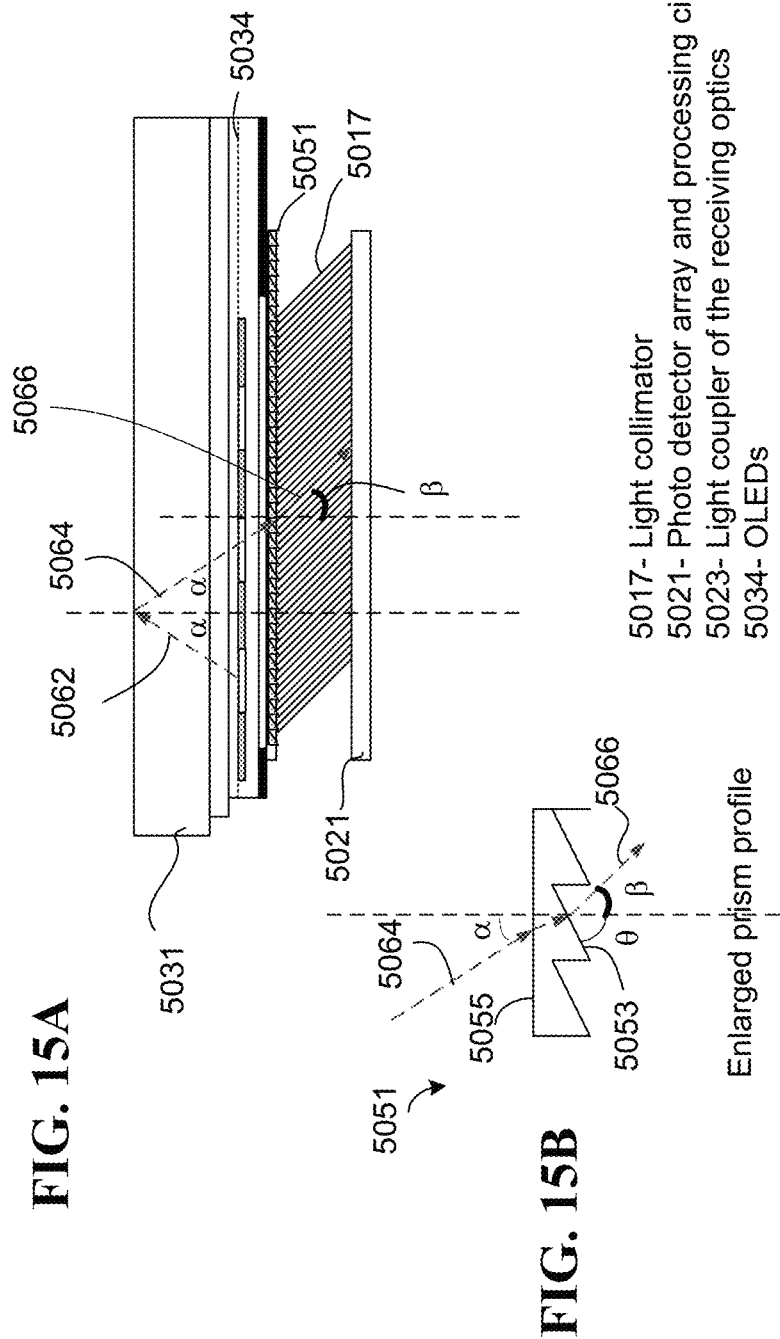
FIGS. 15A and 15B illustrate an optical fingerprint sensing module positioned under a display screen according to some embodiments.

FIGS. 15A and 15B illustrate an optical fingerprint sensing module positioned under a display screen according to some embodiments. The optical fingerprint sensing module includes an array of light collimators 5017, and a photodetector array and electronic circuitry 5021 coupled to the array of light collimators 5017, similar to the optical fingerprint sensing module illustrated in FIG. 12. The axis of the light collimators 5017 may be tilted with respect to the normal of the display screen.

The optical fingerprint sensor may further include a prism light coupler 5051 disposed under the protection layer 5037 of the display screen and above the array of light collimators 5017. FIG. 15B shows a partial cross-sectional view of the prim light coupler 5051. The prism light coupler 5051 includes a top surface 5055 that is substantially planar, and a bottom surface that comprises an array of slanted facets 5053. The top surface 5055 is coupled to the bottom surface of the display screen. Each slanted facet 5053 may be coupled to a respective column of light collimators 5017 (each column of light collimators 5017 extends in a direction perpendicular to the page of FIG. 15B). Each slanted facet 5053 may form a slanting angle θ with respect to the normal of the display screen.

According to some embodiments, the index of refraction of the light coupler 5051 and the slant angle θ may be selected so that the light ray 5064 reflected off of the top surface of the cover glass 5031, after undergoing refraction by the top surface 5055 of the light coupler 5051 and refraction by the slanted facet 5053, propagates substantially along the axis of the light collimators 5017. Therefore, the refracted light ray 5066 may be transmitted by the light collimators 5017 and be detected by the photodetector array 5021. If the light collimators 5017 are disposed in air without the prism light coupler 5051, the angle of incidence α of the light ray 5062 emitted by the OLEDs and incident on the top surface of the cover glass 5031 may be limited to a relatively small value, in order for the refracted light ray to propagate along the axis of the light collimators 5017.

Figure 16:
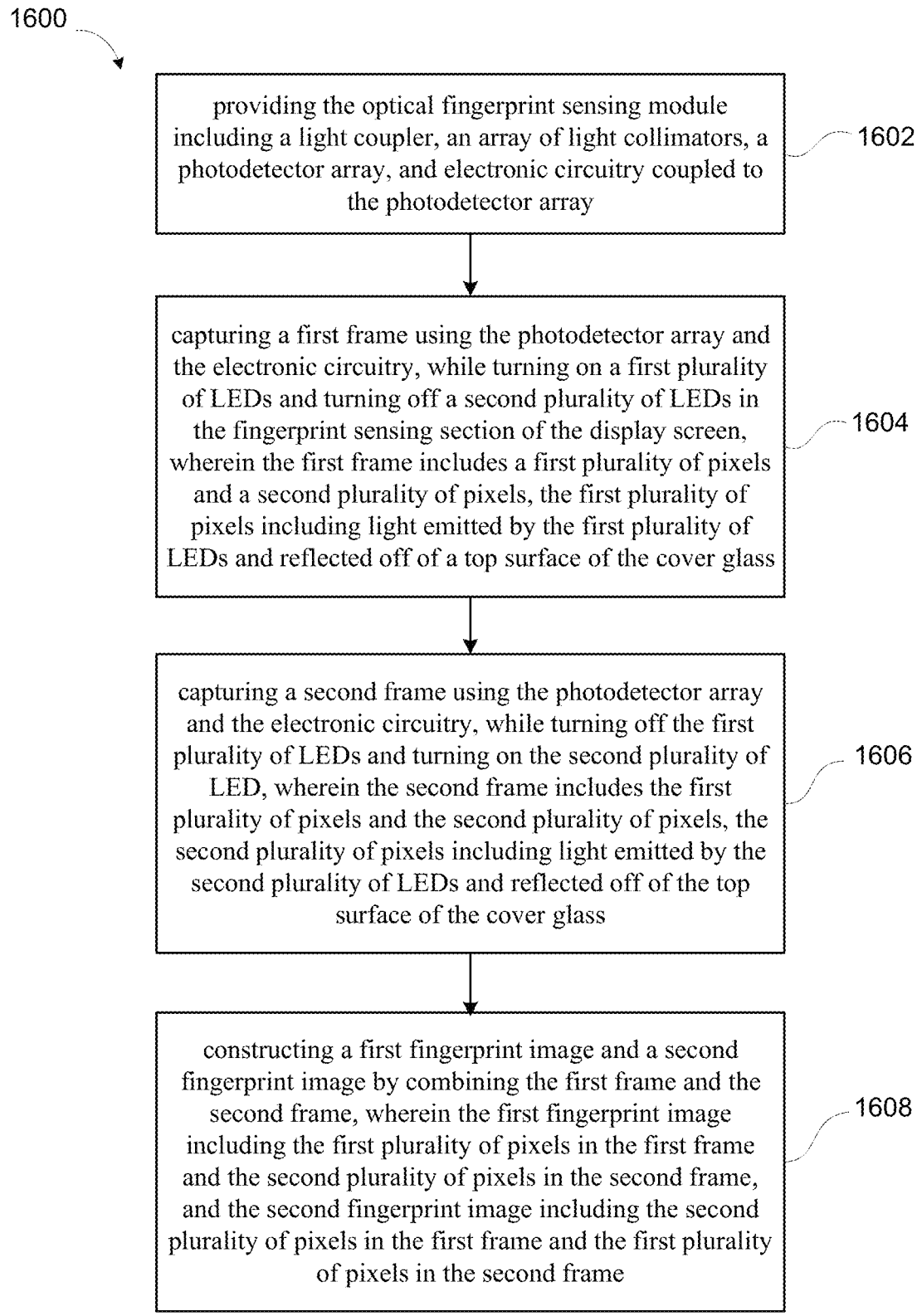
FIG. 16 shows a flowchart illustrating an exemplary method 1600 of fingerprint sensing using an optical fingerprint sensing module disposed under a display screen according to some embodiments.

FIG. 16 shows a flowchart illustrating an exemplary method 1600 of fingerprint sensing using an optical fingerprint sensing module disposed under a display screen according to some embodiments. The display screen includes a cover glass and an array of light-emitting diodes (LEDs) disposed under the cover glass.

At 1602, the optical fingerprint sensing module is provided. The optical fingerprint sensing module may include a light coupler disposed under a fingerprint sensing section of the display screen, and an array of light collimators disposed under the light coupler. An optical axis of each of the array of light collimators forms a tilting angle with respect to a normal of the display screen. The tilting angle is greater than zero degree and less than 90 degrees. The optical fingerprint sensing module may further include a photodetector array coupled to the array of light collimators. The photodetector array includes an array of pixels. Each pixel is configured to detect light transmitted through one or more corresponding light collimators among the array of light collimators. The optical fingerprint sensing module may further include electronic circuitry coupled to the photodetector array for capturing fingerprint frames formed by light intensities detected by the photodetector array.

At 1604, a first frame is captured using the photodetector array and the electronic circuitry, while turning on a first plurality of LEDs and turning off a second plurality of LEDs in the fingerprint sensing section of the display screen. The first frame includes a first plurality of pixels and a second plurality of pixels. The first plurality of pixels includes light emitted by the first plurality of LEDs and reflected off of a top surface of the cover glass.

At 1606, a second frame is captured using the photodetector array and the electronic circuitry, while turning off the first plurality of LEDs and turning on the second plurality of LED. The second frame includes the first plurality of pixels and the second plurality of pixels. The second plurality of pixels includes light emitted by the second plurality of LEDs and reflected off of the top surface of the cover glass.

At 1608, a first fingerprint image and a second fingerprint image are constructed by combining the first frame and the second frame. The first fingerprint image includes the first plurality of pixels in the first frame and the second plurality of pixels in the second frame. The second fingerprint image includes the second plurality of pixels in the first frame and the first plurality of pixels in the second frame.

It should be appreciated that the specific steps illustrated in FIG. 16 provide a particular method of fingerprint sensing according to some embodiments. Other sequences of steps may also be performed according to alternative embodiments. For example, alternative embodiments of the present invention may perform the steps outlined above in a different order. Moreover, the individual steps illustrated in FIG. 16 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 17:
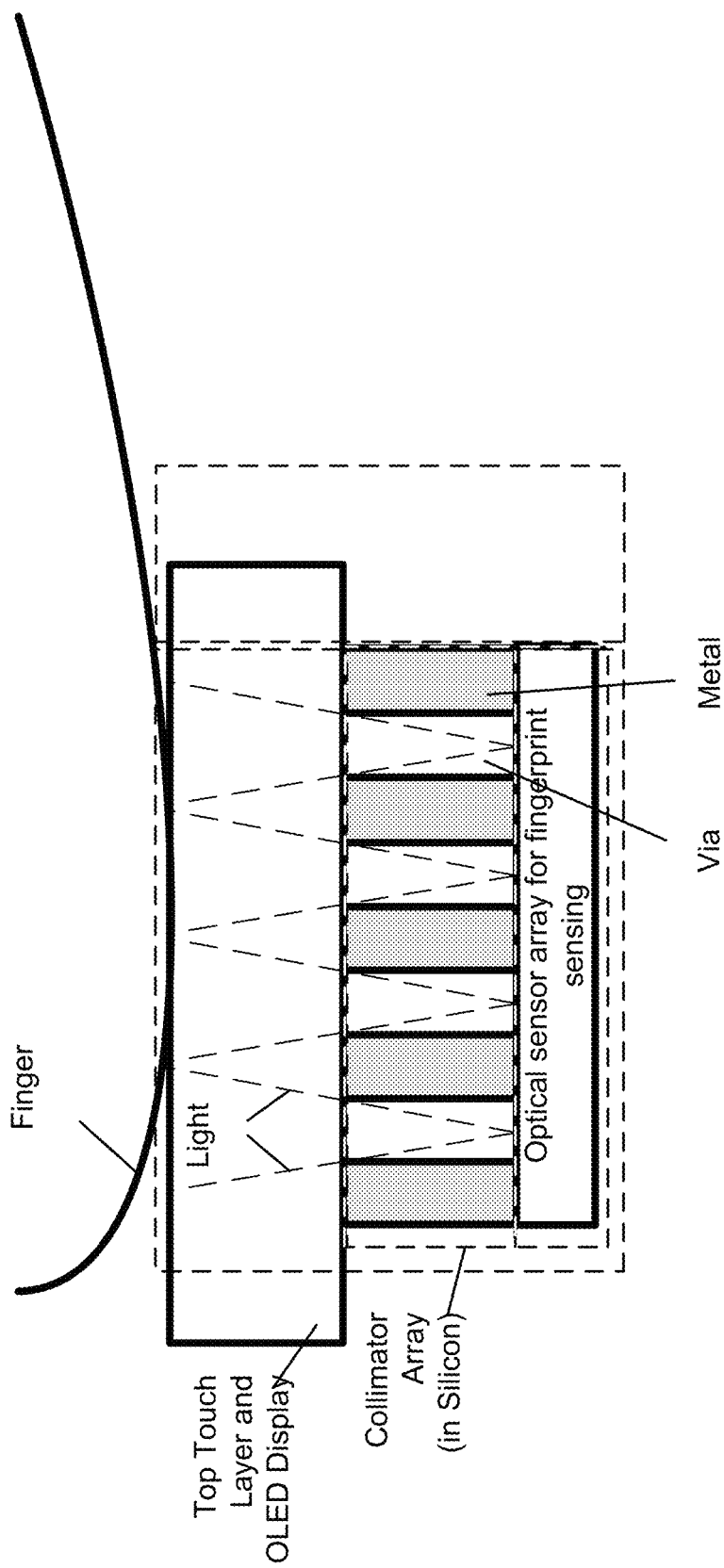
FIGS. 17 and 18 show examples of under-screen optical fingerprint sensor modules with optical collimators according to some embodiments.

FIG. 17 shows an example of a collimator design that is part of the CMOS structure by using aligned holes in two different metal layers in the CMOS structure. Each collimator in the array is an elongated channel along a direction that is perpendicular to the display panel.

Figure 18:
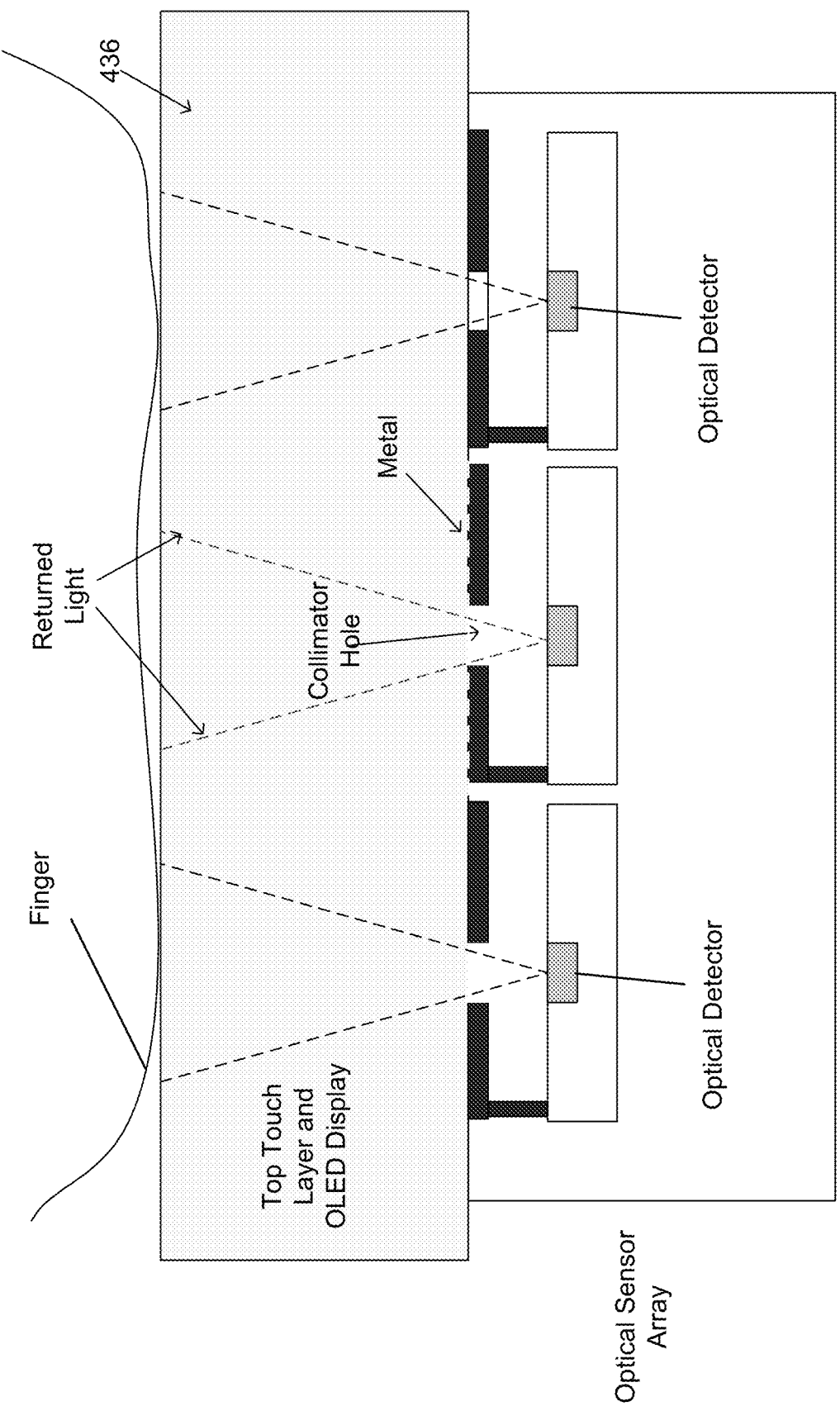

FIG. 18 shows an example of an optical fingerprint sensor module under the OLED display structure that incorporates an optical fingerprint sensor array and an integrated collimator array for each optical fingerprint sensor pixel in capturing fingerprint information. The optical fingerprint sensor array includes an array of photodetectors and a collimator array is disposed over the photodetector array to include optically transparent vias as optical collimators and optically opaque metal structures between the vias as shown. The OLED display pixels emit light to illuminate the touched portion of a finger and the light reflected off the finger is directed through the collimator array to reach the photodetector array which captures a part of the fingerprint image of the finger. The collimator array can be implemented using one or more metal layer(s) with holes or openings integrated via the CMOS process.

Such optical collimators in the under-screen optical fingerprint sensor module can be structured to provide direct point to point imaging. For example, the dimensions of the optical collimator array and individual collimators can be designed to closely match the dimensions of the photodetector array and the dimensions of individual photodetectors, respectively, to achieve one to one imaging between optical collimators and photodetectors. The entire image carried by the light received by the optical fingerprint sensor module can be captured by the photodetector array at individual photodetectors simultaneously without stitching.

The spatial filtering operation of the optical collimator array can advantageously reduce the amount of the background light that enters the photodetector array in the optical fingerprint sensor module. In addition, one or more optical filters may be provided in the optical fingerprint sensor module to filter out the background light and to reduce the amount of the background light at the photodetector array for improved optical sensing of the returned light from the fingerprint sensing area due to the illumination by emitted light from the OLED pixels. For example, the one or more optical filters can be configured, for example, as bandpass filters to allow transmission of the light at emitted by the OLED pixels while blocking other light components such as the IR light in the sunlight. This optical filtering can be an effective in reducing the background light caused by sunlight when using the device outdoors. The one or more optical filters can be implemented as, for example, optical filter coatings formed on one or more interfaces along the optical path to the photodetector array in the optical fingerprint sensor module or one or more discrete optical filters.

Figure 19:
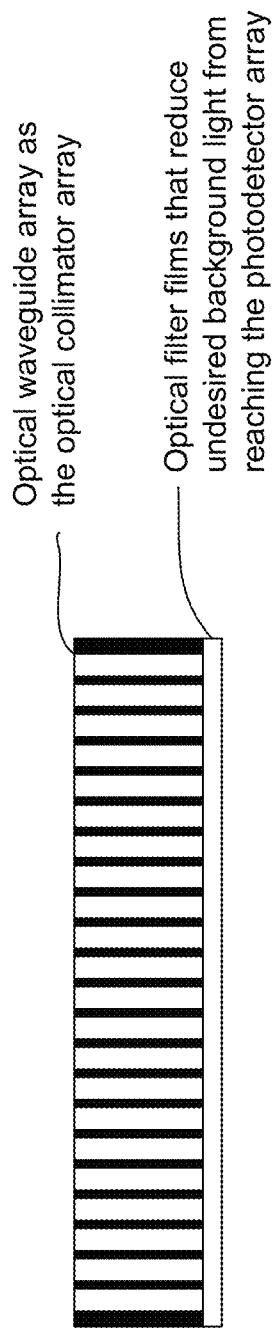
FIG. 19 shows an example an optical collimator array with optical filtering to reduce background light that reaches the photodetector array in the under-screen optical fingerprint sensor module according to some embodiments.

FIG. 19 shows an example an optical collimator array with optical filtering to reduce background light that reaches the photodetector array in the under-screen optical fingerprint sensor module. This example uses an array of optical waveguides as the optical collimators and one or more optical filter films are coupled to the optical waveguide array to reduce undesired background light from reaching the photodetector array coupled to the optical waveguide array, e.g. the IR light from the sunlight while transmitting desired light in a predetermined spectral band for the probe light that is used to illuminate the finger. The optical waveguide can include a waveguide core with or without an outside waveguide cladding. The optical waveguide may also be formed by a coreless fiber bundle with different fibers where each unit collimator is a piece of fiber without a fiber core structure. When the coreless fibers are made into bundle, the filling material between the fibers may include a light absorbing material so as to increase the absorption of stray light that is not guided by the coreless fibers. The final collimator may be assembled with multiple layers of sub-collimator arrays.

The following sections provide examples of various optical collimator designs and their fabrication.

Figures 20A, 20B:
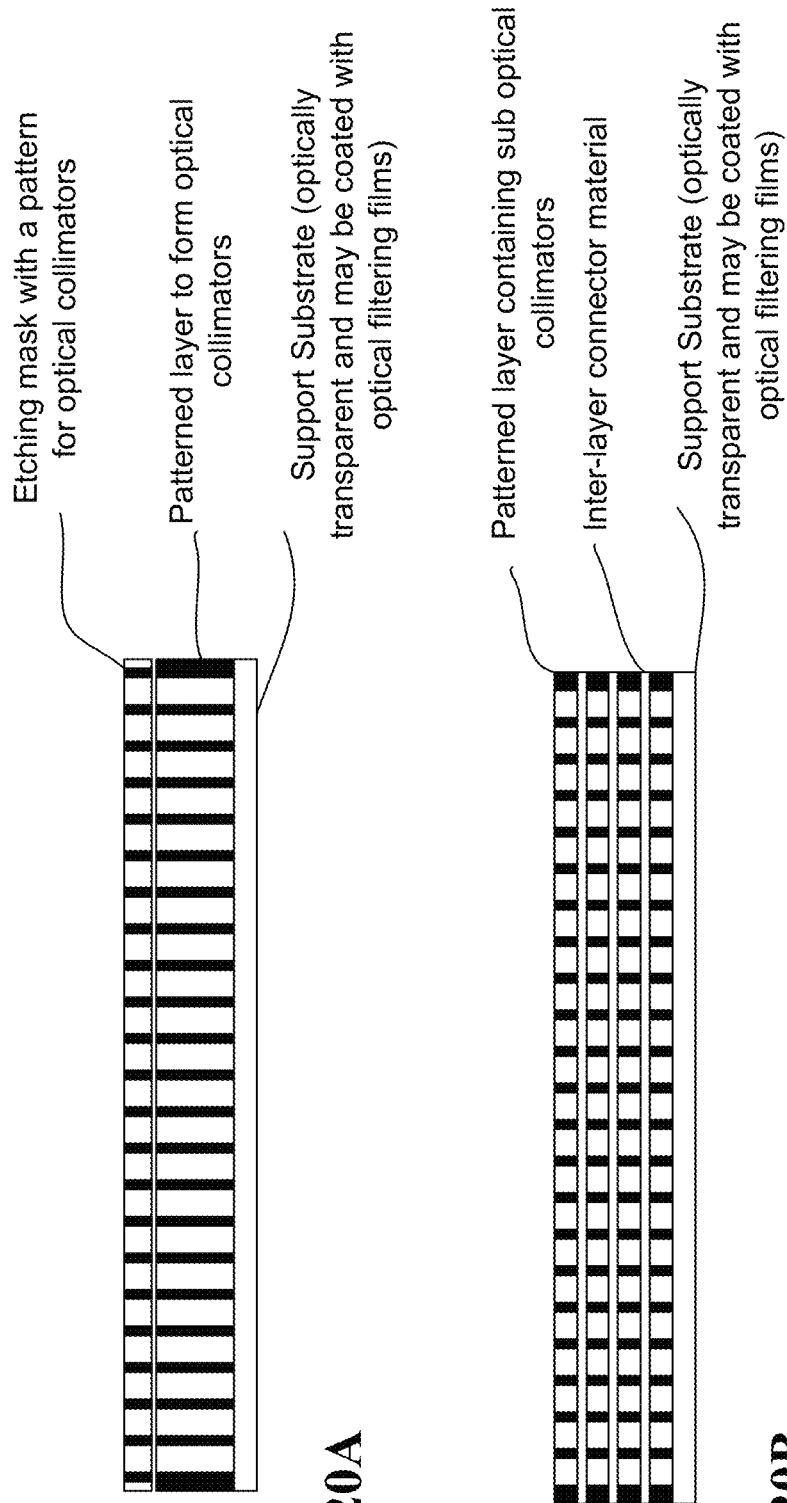
FIGS. 20A, 20B, 21 and 22 show examples of optical collimator designs for the optical sensing under the OLED display screen according to some embodiments.

FIGS. 20A and 20B show examples of fabricating collimators by etching. In FIG. 20A, a layer of a suitable material for forming optical collimators in the collimator array is formed on or supported by a support substrate which is optically transparent. An etching mask is formed over the layer and has a pattern for etching the underlying layer to form the optical collimators. A suitable etching process is performed to form the optical collimators. The support substrate may be bound with the collimator array and may be formed from various optical transparent materials including, e.g., silicon oxide.

FIG. 20B shows an example of an optical collimator array that is assembled by stacking multiple layers of sub-collimator arrays via an inter-layer connector material which may be an adhesive, a glass, or a suitable optically transparent material. In some implementations, different layers of sub-collimator arrays may be stacked over one another without the inter-layer connector material. This stacking allows fabrication of optical collimators with desired lengths or depths along the collimator axis to achieve desired optical numerical apertures. The holes of the collimators geometrically limit the viewing angle. The transmitting numeral aperture is decided by the thickness of the collimator and the hole aperture. The holes may be filled with an optically transparent material in some applications and may be void in some designs.

In implementations, the support substrate may be coated with one or more optical filter films to reduce or eliminate background light such as the IR light from the sunlight while transmitting desired light in a predetermined spectral band for the probe light that is used to illuminate the finger.

Figure 21:
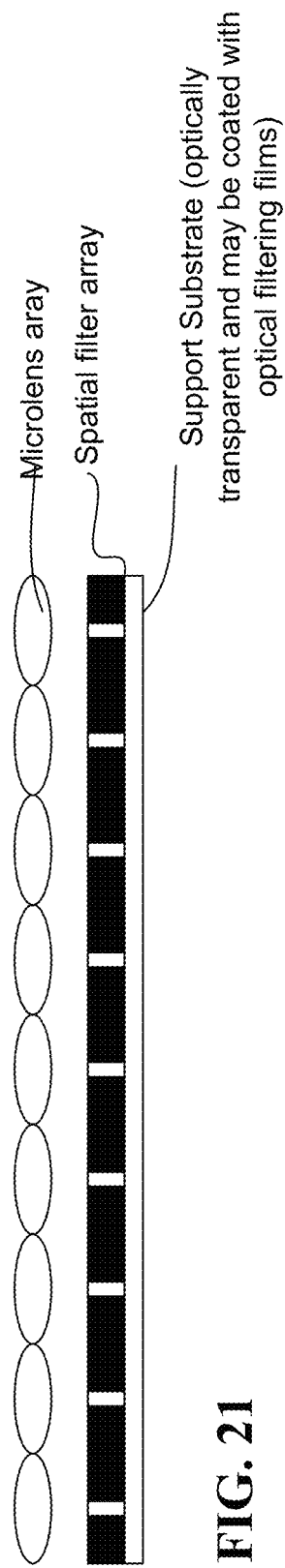

FIG. 21 shows an array of optical spatial filters coupled with micro lens array where each microlens is located with respect to a corresponding through hole of an optical spatial filter so that each unit collimator includes a micro lens and a micro spatial filter, such as a micro hole. Each micro lens is structured and positioned to focus received light to the corresponding micro spatial filter without imaging the received light. The micro hole limits the effective receiving numerical aperture. The spatial filter may be printed on an optically transparent substrate, or etched on a piece of silicon wafer. The micro lens array may be etched by MEMS processing or chemical processing. The micro lens may also be made of a gradient refractive index material, e.g., cutting a piece of gradient refractive index glass fiber to a quarter pitch of length. The focal length of the micro lenses and the diameter of the spatial filter hole can be used to control the transmitting numerical aperture of each unit. Like in other designs, the collimator board may be coated with filter films to reduce or eliminate the light band not used in the sensor such as the IR light from the sunlight.

Figure 22:
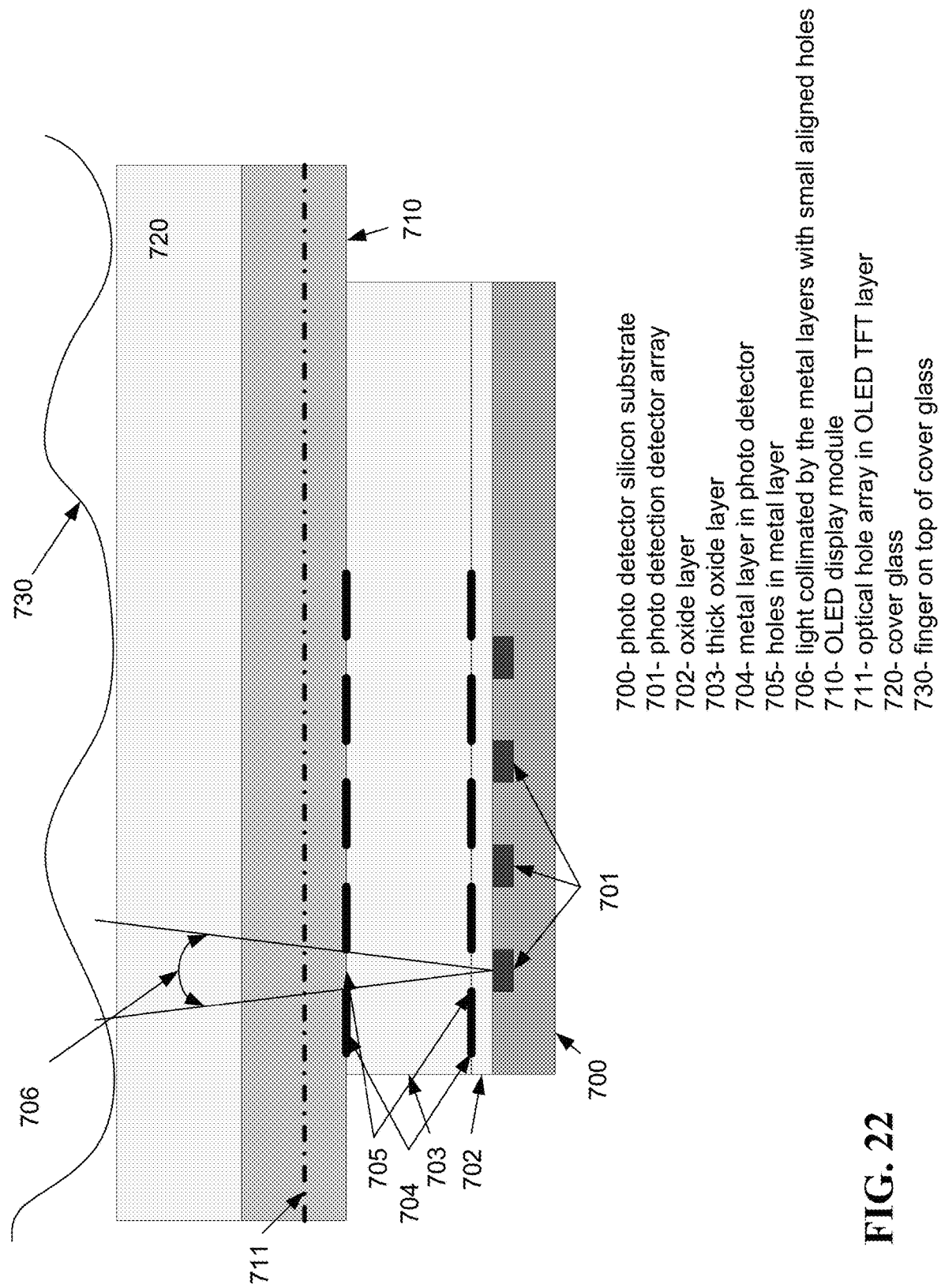

FIG. 22 shows an example of an integrated CMOS photo detection array sensor, with built-in collimation of light. The collimator is built by combing an array of aligned holes (705) in different metal layers (704) and oxide layers (702, 703) which are interleaved between metal layers to provide separation. These holes can be aligned with photo sensitive elements (701) in the optical fingerprint sensor array. Optical fingerprint imager is implemented with this integrated CMOS photo detection array sensor with built-in collimation of light under the OLED display module (710) and cover glass. The fingerprint of the user's finger touch the sensor window area of the cover glass can be imaged by detection of the light reflected off the fingerprint valley and ridges, with the light emitting from the OLED display pixels of the window area. The light from a fingerprint ridge area would be reduced, because the light is absorbed in fingerprint tissue at the ridge area while the light from the fingerprint valley area stronger by comparison. This difference in the light levels between the ridges and valleys of a fingerprint produces a fingerprint pattern at the optical fingerprint sensor array.

In the above optical fingerprint sensor module designs based on collimators, the thickness or length of each collimator along the collimator can be designed to be large to deliver imaging light to a small area on the optical detector array or to be small to deliver imaging light to a large area on the optical detector array. When the thickness or length of each collimator along the collimator in a collimator array decreases to a certain point, e.g., tens of microns, the field of the optical view of each collimator may be relatively large to cover a patch of adjacent optical detectors on the optical detector array, e.g., an area of 1 mm by 1 mm. In some device designs, optical fingerprint sensing can be achieved by using an array of pinholes with each pinhole having a sufficiently large field of optical view to cover a patch of adjacent optical detectors in the optical detector array to achieve a high image resolution at the optical detector array in sensing a fingerprint. In comparison with a collimator design, a pinhole array can have a thinner dimension and a smaller number of pinholes to achieve a desired high imaging resolution without an imaging lens. Also, different from the imaging via optical collimators, imaging with the array of pinholes uses each pinhole as a pinhole camera to capture the image and the image reconstruction process based on the pinhole camera operation is different that by using the optical collimator array: each pinhole establishes a sub-image zone and the sub image zones by different pinholes in the array of pinholes are stitched together to construct the whole image. The image resolution by the optical fingerprint sensor module with a pinhole array is related to the sensitive element size of the detector array and thus the sensing resolution can be adjusted or optimized by adjusting the detector dimensions.

A pinhole array can be relatively simple to fabricate based on various semiconductor patterning techniques or processes or other fabrication methods at relatively low costs. A pinhole array can also provide spatial filtering operation to advantageously reduce the amount of the background light that enters the photodetector array in the optical fingerprint sensor module. Similar to designing the optical fingerprint sensor modules with optical collimators, one or more optical filters may be provided in the optical fingerprint sensor module with a pinhole array to filter out the background light and to reduce the amount of the background light at the photodetector array for improved optical sensing of the returned light from the fingerprint sensing area due to the illumination by emitted light from the OLED pixels. For example, the one or more optical filters can be configured, for example, as bandpass filters to allow transmission of the light at emitted by the OLED pixels while blocking other light components such as the IR light in the sunlight. This optical filtering can be an effective in reducing the background light caused by sunlight when using the device outdoors. The one or more optical filters can be implemented as, for example, optical filter coatings formed on one or more interfaces along the optical path to the photodetector array in the optical fingerprint sensor module or one or more discrete optical filters.

Figure 23:
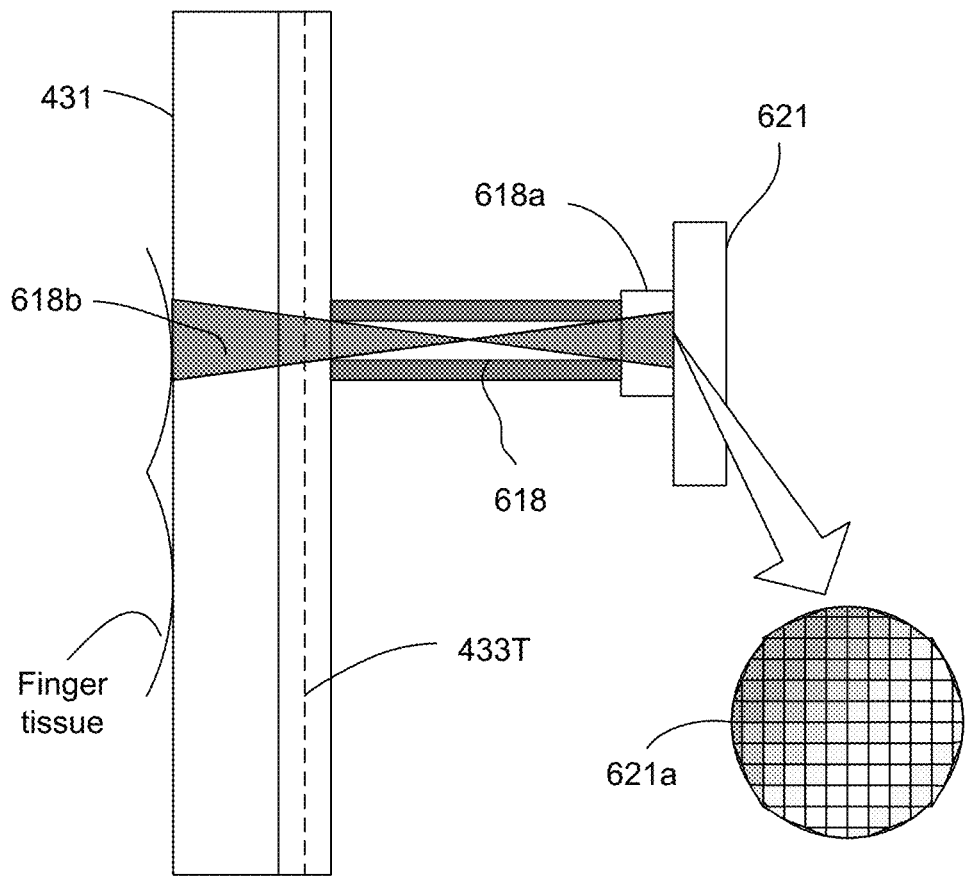
FIGS. 23-25 illustrate improved optical imaging resolution based on a pinhole camera effect in designing the optical fingerprint sensor module according to some embodiments.

In an optical fingerprint sensor module based on optical collimators, the optical imaging resolution at the optical fingerprint sensor array can be improved by configuring the optical collimators in a way to provide a pinhole camera effect. FIG. 23 shows an example of such a design.

In FIG. 23, a collimator unit 618 of an array of such optical collimators guides the light from the corresponding detection area unit to the photo detector array 621. The aperture of the collimator unit forms a small field of view (FOV) 618b. If the detector in the photo detector array 621 does not capture the details in each unit FOV, the imaging resolution is decided by the FOV of each collimator unit. To improve the detection resolution, the FOV of each collimator unit needs to be reduced. However, when a gap 618a is provided between each photo detector in the photo detector array 621 and the corresponding collimator 618, the small aperture of the collimator unit acts as a pinhole. This pinhole camera effect provides a higher imaging resolution in the image of each unit of FOV. When there are multiple detector elements in a unit FOV, such as shown in the insert 621a, the images details in the unit FOV can be recognized. This means that the detection resolution is improved. In implementations, such a gap can be provided in various ways, including, e.g., adding optical filter films 618a between the collimators 618 and the optical fingerprint sensor array 621.

With the help of the pinhole camera effect, the fill factor of the collimator board, may be optimized. For example, to detect an area of 10 mm×10 mm in size, if each unit FOV covers an area of 1 mm×1 mm, a 10×10 collimator array can be used. If in each unit FOV the detector can get 20×20 definition image, the overall detection resolution is 200× 200, or 50 micron, or 500 psi. This method can be applied for all types of collimator approaches.

Figure 24:
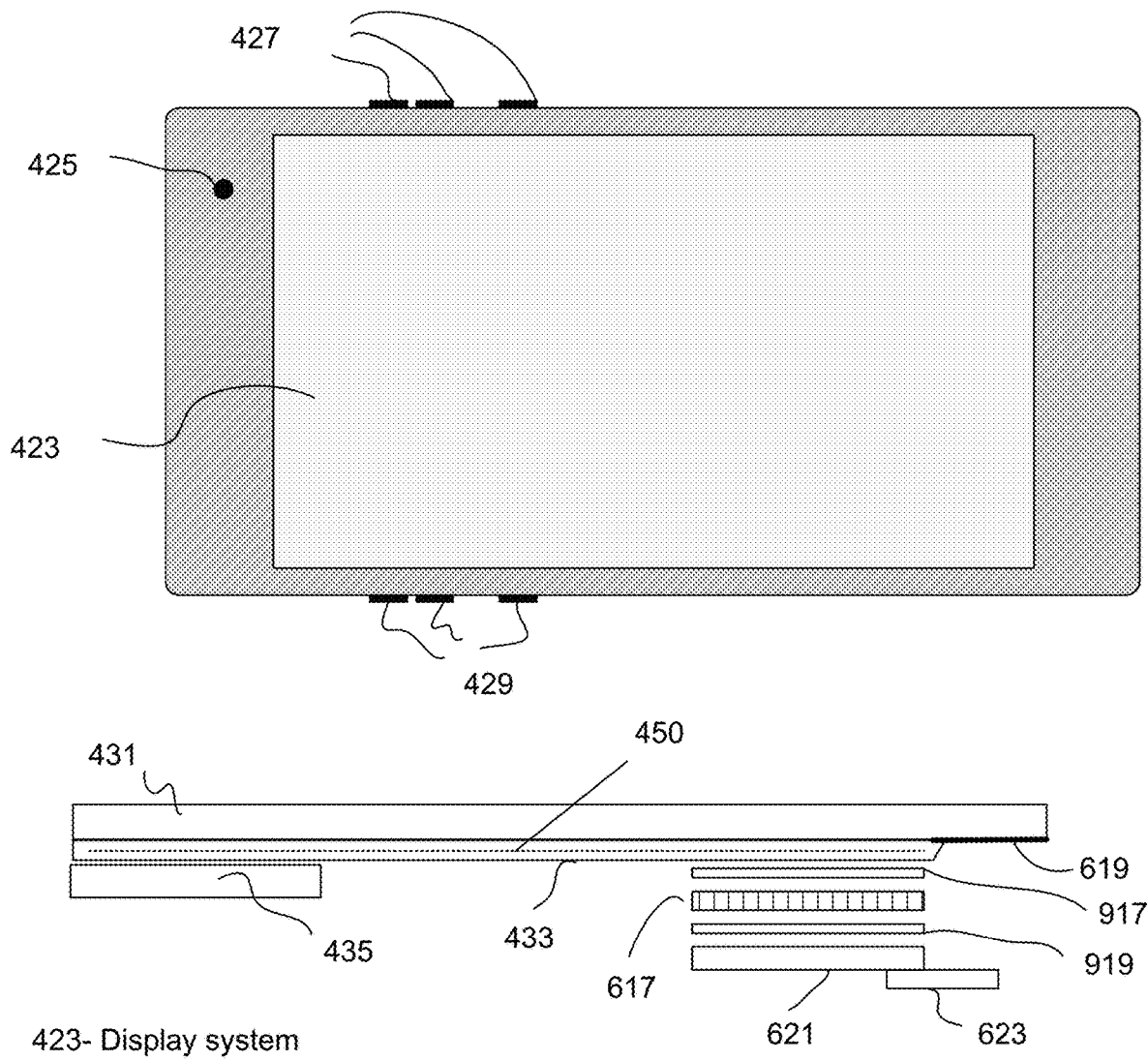

FIG. 24 shows another example for using the pinhole camera effect to improve the optical imaging resolution. In this example, the optical fingerprint sensor module includes several layers: a spacer 917, a pinhole array 617, a protection material 919, a photo detector array 621, and a circuit board 623. The object optical distance is decided by the total material thickness from sensing surface to the pinhole plane, including the optical thickness of the display module 433 thickness, the spacer 917 thickness, any filter coating thickness, any air gap thickness, and any glue material thickness. The image optical distance is decided by the total material thickness from the pinhole plane to the photo detector array, including the protection material thickness, any filter coating thickness, any air gaps thickness, any glue material thickness. The image magnification is decided by the image optical distance comparing with the object optical distance. The detection mode can be optimized by setting a proper magnification. For example, the magnification may be set to be less than 1, such as, 0.7, or 0.5 etc. In some device designs, the spacer and the pinhole array layer may be combined into a single component. In other designs, the pinhole array and the protection layer may be combined to a single component so as to pre-define the center co-ordinates of each pinhole.

Figure 25:
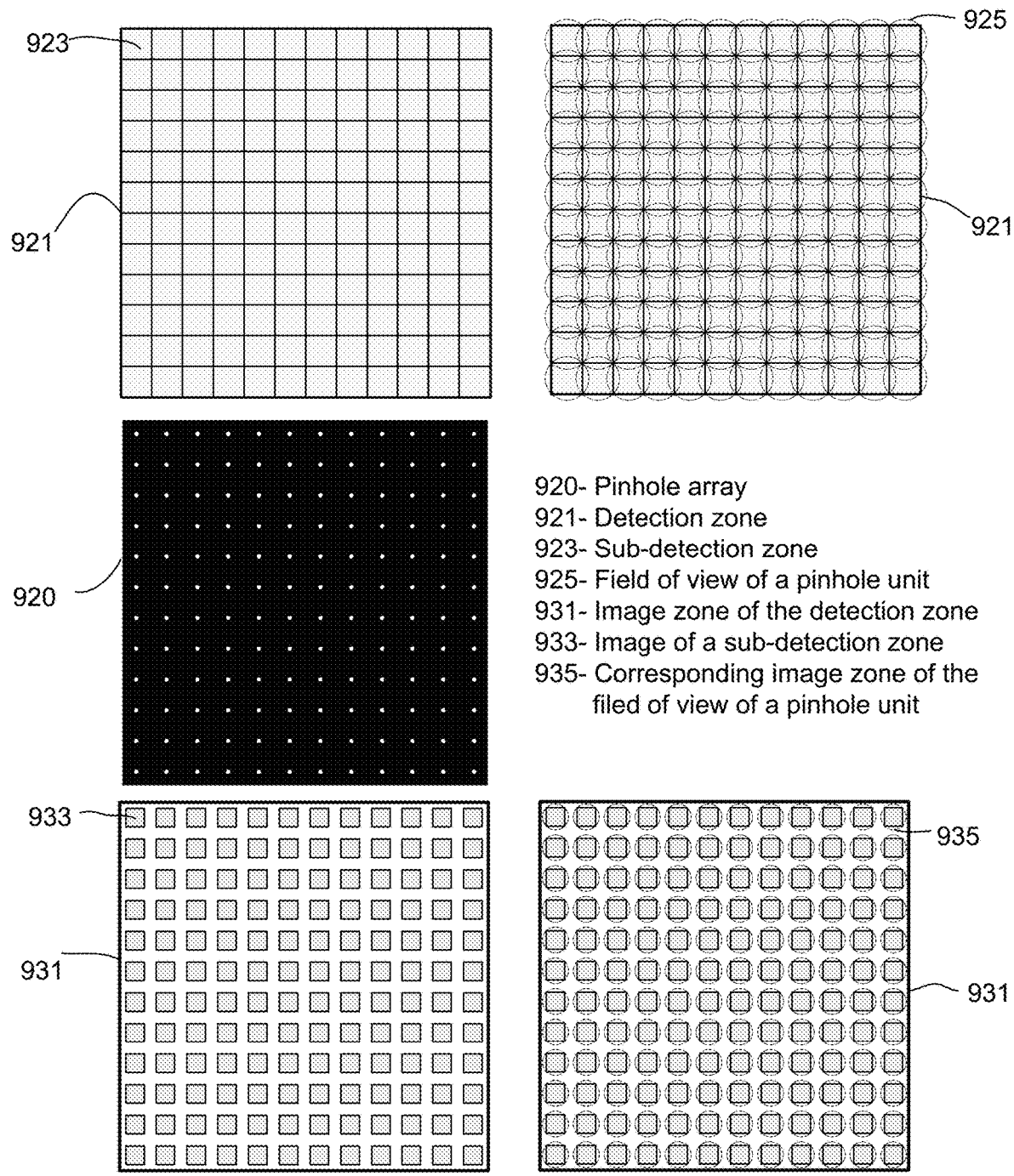

FIG. 25 shows an example of the optical imaging based on the pinhole camera effect. On the object side, the whole detection zone 921 on the OLED display panel is divided into multiple sub-detection zones 923. A pinhole array 920 is provided for imaging the detection zone 921. Each pinhole unit in the pinhole array 920 is responsible for a small field of view (FOV) 925. Each small FOV 925 covers a sub-detection zone 923. As shown in FIG. 25, each small FOV of one pinhole can overlap with small FOVs of its neighboring pinholes. On the image side, each sub-detection zone 923 in the optical fingerprint sensor array captures an image 933. Also shown in FIG. 25, each small FOV 925 of a pinhole has a corresponding image zone 935. The magnification of this system can be optimized so that the images of each sub-detection zone can be separately distinguished. In other words, the images of the small FOVs do not overlap each other. In this detection mode, the central co-ordinates of each pinhole are pre-defined and the image spot co-ordinates of each OLED display pixel can be pre-calibrated. All the display pixels in the detection zone can be lit on simultaneously because each pixel has only one corresponding image position. Because the image of the pinhole camera is inversed, the signal processing can recover the whole image based on the calibration table.

In the above illustrated examples for optical collimators, the direction of the optical collimators for directing light from a finger on the top of the display screen into the optical fingerprint sensor array for fingerprint sensing may be either perpendicular to the top touch surface of OLED display screen to collect returned probe light from the finger for fingerprint sensing, a majority of which is in a light direction perpendicular to the top touch surface. In practice, when a touched finger is dry, the image contrast in the detected images in the optical fingerprint sensor array by sensing such returned probe light that is largely perpendicular to the top touch surface is lower than the same image obtained from returned probe light that is at an angle with respect to the perpendicular direction of the top touch surface. This is in part because optical sensing of angled returned light spatially filters out the strong returned light from the top touch surface that is mostly perpendicular to the top touch surface. In consideration of this aspect of the optical sensing of the returned probe light from the top touch surface, the optical collimators may be oriented so that the axis of each collimator unit may be slanted with respect to the top touch surface as shown in the example in FIG. 11B.

In fabrication, however, it is more complex and costly to fabricate slanted collimators. One way to use perpendicular optical collimators as shown in FIGS. 9 and 10B while still achieving a higher contrast in the optical sensing by selectively detecting angled returned light from the top touch surface is to provide an optical deflection or diffraction device or layer between the perpendicular optical collimators and the returned light from the top touch surface prior to entering the perpendicular optical collimators. This optical deflection or diffraction device or layer can be, in some implementations, between the OLED display panel and the perpendicular optical collimators to select only returned probe light that is at some slanted angle to enter the perpendicular optical collimators for optical detection by the optical detector array on the other end of the perpendicular optical collimators while blocking or reducing the amount of the returned probe light from the top touch surface that is perpendicular to the top touch surface from entering the optical collimators. This optical deflection or diffraction device or layer may be implemented in various forms, including, e.g., an array of prisms, an optical layer with a diffraction pattern, or other devices located between the optical collimators and the display panel to select angled probe light returned from the display panel to enter the optical collimators while reducing an amount of the returned probe light that is perpendicular to the display panel and enters the optical collimators.

FIGS. 26A and 26B show an example of an optical fingerprint sensor under an OLED display panel having an optical deflection or diffraction device or layer.

As shown in FIG. 26A, each collimator 2001 in the collimator array may be an extended channel along an axis vertical or perpendicular to the display surfaces. A viewing angle adaptor optical layer 2210 is used to adjust the viewing angle of the returned probe light from the display panel and is located between the optical collimators 2001 and the display panel to select angled probe light returned from the display panel to enter the optical collimators 2001 while reducing an amount of the returned probe light that is perpendicular to the display panel and enters the optical collimators 2001.

FIG. 26B shows more detail of the viewing angle adaptor optical layer 3210 and the major probe light paths. For example, the viewing angle adaptor optical layer 3210 may be implemented as a diffraction pattern layer such as a prism structure 3210a. Only the returned probe light 82a and 82b from the finger with proper incident angles out of the display panel can be bent to transmit through the collimator 2001. In comparison, the returned probe light that is perpendicular to the display panel is directed by the viewing angle adaptor optical layer 2210 to be away from the original direction that is perpendicular to the display panel and thus becomes off-axis incident light to the optical collimator 2001. This reduces the amount of the returned probe light that is perpendicular to the display panel and that can enter the optical collimator 2001.

When the viewing angle is adjusted properly, the receiving light from different places 63a and 63b of the fingerprint valley carried the fingerprint information. For example, under same illumination, light 82a may be stronger than light 82b because of the viewing angel and the fingerprint profiles of the fingertip skin. In other words, the detection can see some level of fingerprint shade. This arrangement improves the detection when the finger is dry.

Portable devices such as mobile phones or other devices or systems based on the optical sensing disclosed in this document can be configured to provide additional operation features.

For example, the OLED display panel can be controlled to provide a local flash mode to illuminate the fingerprint sensing area 613 by operating selected OLED display pixels underneath the sensing area 613. This can be provided in an optical fingerprint sensor module under the OLED display panel, e.g., FIGS. 4A and 4B based on an optical imaging design or FIGS. 10A and 10B based on optical imaging via an optical collimator array. In the event of acquiring a fingerprint image, the OLED display pixels in the window area 613 can be turned on momentarily to produce high intensity illumination for optical sensing of a fingerprint, and, at the same time, the photo detection sensor array 621 is turned on to capture the fingerprint image in sync with the turning on of the OLED pixels underneath the sensing area 613. The time to turn on these OLED pixels can be relatively short but the emission intensity can be set to be higher than the normal emission for displaying images on the OLED display panel. For this reason, this mode for optical fingerprint sensing is a flash mode that enable the photo detector sensor array 621 to detect a larger amount of light to improve the image sensing performance.

For another example, the optical fingerprint sensor module can be designed to meet the total internal reflection condition at the top sensing surface of the OLED display panel to achieve a flash wakeup function where a part of the OLED pixels in the viewing zone 613 are turned on to flash while other OLED pixels are tuned off and are in a sleep mode to save power when the device is not in use. In response to the flashing of the OLED pixels in the viewing zone 613, the corresponding photo sensors in the optical fingerprint sensor array 621 are operated to receive and detect light signals. When a finger touches the sensing zone 613 during this flash wakeup mode, the finger causes returned light to be totally reflected to produce strong returned probe light which is detected at the optical fingerprint sensor array and the detection of the presence of light can be used to wake up the device in the sleep mode. In addition to using the part of OLED pixels in the viewing zone 613, one or more extra light sources may be provided near the optical fingerprint sensor module to provide the flash mode illumination at the viewing zone 613 for the flash wakeup function. When a non-finger object touches the viewing zone 613 on the top surface above the OLED display panel, the total internal reflection condition may not occur because other materials rarely have finger skin properties. Therefore, even a non-finger object touches the sensing zone 613, the lack of the total internal reflection at the touch location may cause insufficient returned probe light to reach the optical fingerprint sensor array to trigger flash wakeup operation.

The optical fingerprint sensors for sensing optical fingerprints disclosed above can be used to capture high quality images of fingerprints to enable discrimination of small changes in captured fingerprints that are captured at different times. Notably, when a person presses a finger on the device, the contact with the top touch surface over the display screen may subject to changes due to changes in the pressing force. When the finger touches the sensing zone on the cover glass, changes in the touching force may cause several detectable changes at the optical fingerprint sensor array: (1) fingerprint deforming, (2) a change in the contacting area, (3) fingerprint ridge widening, and (4) a change in the blood flow dynamics at the pressed area. Those changes can be optically captured and can be used to calculate the corresponding changes in the touch force. The touch force sensing adds more functions to the fingerprint sensing.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An optical fingerprint sensing module disposed under a display screen, the display screen including a cover glass and an array of light-emitting diodes (LEDs) disposed under the cover glass, the optical fingerprint sensing module comprising:
    a light coupler disposed under a fingerprint sensing section of the display screen;
    an array of light collimators disposed under the light coupler, an optical axis of each of the array of light collimators forms a tilting angle with respect to a normal of the display screen, the tilting angle being greater than zero degree and less than 90 degrees;
    a photodetector array coupled to the array of light collimators, the photodetector array including an array of pixels, each pixel configured to detect light transmitted through one or more corresponding light collimators among the array of light collimators;
    electronic circuitry coupled to the photodetector array for capturing fingerprint frames formed by light intensities detected by the photodetector array; and
    a processor coupled to the electronic circuitry and the array of LEDs, the processor configured to, in response to a trigger for detecting fingerprints of a finger placed adjacent the fingerprint sensing section of the display screen:
        control the array of LEDs such that:
            in a first frame, a first plurality of LEDs in the fingerprint sensing section of the display screen are turned on, and a second plurality of LEDs in the fingerprint sensing section are turned off; and
            in a second frame, the first plurality of LEDs are turned off, and the second plurality of LEDs are turned on;
        cause the electronic circuitry to capture the first frame and the second frame, wherein:
            the first frame including a first plurality of pixels and a second plurality of pixels, the first plurality of pixels including light emitted by the first plurality of LEDs and reflected off of a top surface of the cover glass, the second plurality of pixels not including light emitted by the first plurality of LEDs; and
            the second frame including the first plurality of pixels and the second plurality of pixels, the second plurality of pixels including light emitted by the second plurality of LEDs and reflected off of the top surface of the cover glass, the first plurality of pixels not including light emitted by the second plurality of LEDs;
        construct a first fingerprint image and a second fingerprint image by combining the first frame and the second frame, wherein:
            the first fingerprint image includes the first plurality of pixels in the first frame and the second plurality of pixels in the second frame wherein the first plurality of pixels includes light emitted by the first plurality of LEDs, and the second plurality of pixels includes light emitted by the second plurality of LEDs; and
            the second fingerprint image includes the second plurality of pixels in the first frame and the first plurality of pixels in the second frame, wherein the first plurality of pixels and the second plurality of pixels do not include light emitted by the first plurality of LEDs and light emitted by the second plurality of LEDs.

2. The optical fingerprint sensing module of claim 1, wherein the first plurality of LEDs forms one or more first columns of LEDs, and the second plurality of LEDs forms one or more second columns of LEDs alternating with the one or more first columns of LEDs, each first column and each second column extending along a direction substantially perpendicular to an azimuthal plane of each light collimator.

3. The optical fingerprint sensing module of claim 2, wherein the one or more first columns of LEDs comprise a plurality of first columns of LEDs arranged as a periodic array of first columns with a period, and the one or more second columns of LEDs comprise a plurality of second columns of LEDs arranged as a periodic array of second columns with the period.

4. The optical fingerprint sensing module of claim 3, wherein the period is selected based on the tilting angle of the light collimators such that:
- the light emitted by the first plurality of LEDs that is included in the first plurality of pixels of the first frame, after being reflected off of the top surface of the cover glass, is transmitted through sections of the display screen in which the first plurality of LEDs is disposed; and
- the light emitted by the second plurality of LEDs that is included in the second plurality of pixels of the second frame, after being reflected off of the top surface of the cover glass, is transmitted through sections of the display screen in which the second plurality of LEDs is disposed.

5. The optical fingerprint sensing module of claim 4, wherein:
- light detected by the second plurality of pixels in the first frame does not pass through sections of the display screen in which the first plurality of LEDs is disposed; and
- light detected by the first plurality of pixels in the second frame does not pass through sections of the display screen in which the second plurality of LEDs is disposed.

6. The optical fingerprint sensing module of claim 3, wherein the period is selected based on the tilting angle of the light collimators such that:
- the light emitted by the first plurality of LEDs that is included in the first plurality of pixels of the first frame, after being reflected off of the top surface of the cover glass, is transmitted through sections of the display screen in which the second plurality of LEDs is disposed; and
- the light emitted by the second plurality of LEDs that is included in the second plurality of pixels of the second frame, after being reflected off of the top surface of the cover glass, is transmitted through sections of the display screen in which the first plurality of LEDs is disposed.

7. The optical fingerprint sensing module of claim 6, wherein:
- light detected by the second plurality of pixels in the first frame passes through sections of the display screen in which the first plurality of LEDs is disposed; and
- light detected by the first plurality of pixels in the second frame passes through sections of the display screen in which the first plurality of LEDs is disposed.

8. The optical fingerprint sensing module of claim 2, wherein the array of light collimators is arranged as a plurality of columns of light collimators, and wherein the light coupler comprises:
- a first planar surface coupled to a bottom surface of the display screen; and
- a second surface including a plurality of slanted facets, each slanted facet of the plurality of slanted facets coupled to a respective column of light collimators of the array of light collimators.

9. The optical fingerprint sensing module of claim 8, wherein each slanted facet has a slanting angle with respect to a normal of the display screen, the slanting angle being selected based on the tilting angle of the light collimators so that light incident on the light coupler at a desired angle of incidence is transmitted through the light collimators to be detected by the photodetector array.

10. The optical fingerprint sensing module of claim 1, wherein the tilting angle of the light collimators is less than 45 degrees.

11. A method of fingerprint sensing using an optical fingerprint sensing module disposed under a display screen, the display screen including a cover glass and an array of light-emitting diodes (LEDs) disposed under the cover glass, the method comprising:
- providing the optical fingerprint sensing module, the optical fingerprint sensing module including:
  - a light coupler disposed under a fingerprint sensing section of the display screen;
  - an array of light collimators disposed under the light coupler, an optical axis of each of the array of light collimators forms a tilting angle with respect to a normal of the display screen, the tilting angle being greater than zero degree and less than 90 degrees;
  - a photodetector array coupled to the array of light collimators, the photodetector array including an array of pixels, each pixel configured to detect light transmitted through one or more corresponding light collimators among the array of light collimators; and
  - electronic circuitry coupled to the photodetector array for capturing fingerprint frames formed by light intensities detected by the photodetector array;
- capturing a first frame using the photodetector array and the electronic circuitry, while turning on a first plurality of LEDs and turning off a second plurality of LEDs in the fingerprint sensing section of the display screen, wherein the first frame includes a first plurality of pixels and a second plurality of pixels, the first plurality of pixels including light emitted by the first plurality of LEDs and reflected off of a top surface of the cover glass, the second plurality of pixels not including light emitted by the first plurality of LEDs;
- capturing a second frame using the photodetector array and the electronic circuitry, while turning off the first plurality of LEDs and turning on the second plurality of LED, wherein the second frame includes the first plurality of pixels and the second plurality of pixels, the second plurality of pixels including light emitted by the second plurality of LEDs and reflected off of the top surface of the cover glass, the first plurality of pixels not including light emitted by the second plurality of LEDs; and
- constructing a first fingerprint image and a second fingerprint image by combining the first frame and the second frame, wherein:
- the first fingerprint image includes the first plurality of pixels in the first frame and the second plurality of pixels in the second frame, wherein the first plurality of pixels includes light emitted by the first plurality of LEDs, and the second plurality of pixels includes light emitted by the second plurality of LEDs; and
- the second fingerprint image includes the second plurality of pixels in the first frame and the first plurality of pixels in the second frame, wherein the first plurality of pixels and the second plurality of pixels do not include light emitted by the first plurality of LEDs and light emitted by the second plurality of LEDs.

12. The method of claim 11, wherein the first plurality of LEDs forms one or more first columns of LEDs, and the second plurality of LEDs forms one or more second columns of LEDs alternating with the one or more first columns of LEDs, each first column and each second column extending along a direction substantially perpendicular to an azimuthal plane of each light collimator.

13. The method of claim 12, wherein the one or more first columns of LEDs comprise a plurality of first columns of LEDs arranged as a periodic array of first columns with a period, and the one or more second columns of LEDs comprise a plurality of second columns of LEDs arranged as a periodic array of second columns with the period.

14. The method of claim 13, wherein the period is selected based on the tilting angle of the light collimators such that:
the light emitted by the first plurality of LEDs that is included in the first plurality of pixels of the first frame, after being reflected off of the top surface of the cover glass, is transmitted through sections of the display screen in which the first plurality of LEDs is disposed; and
the light emitted by the second plurality of LEDs that is included in the second plurality of pixels of the second frame, after being reflected off of the top surface of the cover glass, is transmitted through sections of the display screen in which the second plurality of LEDs is disposed.

15. The method of claim 14, wherein:
light detected by the second plurality of pixels in the first frame does not pass through sections of the display screen in which the first plurality of LEDs is disposed; and
light detected by the first plurality of pixels in the second frame does not pass through sections of the display screen in which the second plurality of LEDs is disposed.

16. The method of claim 13, wherein the period is selected based on the tilting angle of the light collimators such that:
the light emitted by the first plurality of LEDs that is included in the first plurality of pixels of the first frame, after being reflected off of the top surface of the cover glass, is transmitted through sections of the display screen in which the second plurality of LEDs is disposed; and
the light emitted by the second plurality of LEDs that is included in the second plurality of pixels of the second frame, after being reflected off of the top surface of the cover glass, is transmitted through sections of the display screen in which the first plurality of LEDs is disposed.

17. The method of claim 16, wherein:
light detected by the second plurality of pixels in the first frame passes through sections of the display screen in which the first plurality of LEDs is disposed; and
light detected by the first plurality of pixels in the second frame passes through sections of the display screen in which the first plurality of LEDs is disposed.

18. The method of claim 12, wherein the array of light collimators is arranged as a plurality of columns of light collimators, and wherein the light coupler comprises:
a first planar surface coupled to a bottom surface of the display screen; and
a second surface including a plurality of slanted facets, each slanted facet of the plurality of slanted facets coupled to a respective column of light collimators of the array of light collimators.

19. The method of claim 18, wherein each slanted facet has a slanting angle with respect to a normal of the display screen, the slanting angle being selected based on the tilting angle of the light collimators so that light incident on the light coupler at a desired angle of incidence is transmitted through the light collimators to be detected by the photo-detector array.

20. The method of claim 11, wherein the tilting angle of the light collimators is less than 45 degrees.

* * * * *